(12) United States Patent
Vanecek

(10) Patent No.: US 10,558,240 B2
(45) Date of Patent: Feb. 11, 2020

(54) APPARATUS FOR CONVERTING MOBILE DEVICE INTO WEARABLE

(71) Applicant: PADPAC, LLC, Fort Worth, TX (US)

(72) Inventor: Russell Hughes Vanecek, Fort Worth, TX (US)

(73) Assignee: PADPAC, LLC, Fort Worth, TX (US)

( * ) Notice: Subject to any disclaimer, the term of this patent is extended or adjusted under 35 U.S.C. 154(b) by 0 days.

(21) Appl. No.: 15/943,290

(22) Filed: Apr. 2, 2018

(65) Prior Publication Data
US 2018/0284838 A1    Oct. 4, 2018

Related U.S. Application Data

(60) Provisional application No. 62/481,495, filed on Apr. 4, 2017.

(51) Int. Cl.
*G06F 1/16* (2006.01)
*H05K 5/00* (2006.01)
*H05K 7/00* (2006.01)

(52) U.S. Cl.
CPC ............ *G06F 1/163* (2013.01); *G06F 1/1633* (2013.01)

(58) Field of Classification Search
CPC ............................... G06F 1/163; G06F 1/1633
USPC ........................................ 361/679.01–679.03
See application file for complete search history.

(56) References Cited

U.S. PATENT DOCUMENTS

| | | | | |
|---|---|---|---|---|
| 5,762,250 A * | 6/1998 | Carlton | ..................... | A45C 9/00 108/43 |
| 5,975,392 A * | 11/1999 | Miller | ........................ | A45F 3/04 224/153 |
| 6,381,127 B1 * | 4/2002 | Maddali | .................. | G06F 1/163 224/257 |
| 9,690,327 B2 * | 6/2017 | Kielland | .................... | A45F 3/02 |
| 9,983,624 B2 * | 5/2018 | Daley, III | ............... | G06F 1/163 |
| 2003/0075578 A1 * | 4/2003 | Abelow | .................. | G06F 1/163 224/666 |
| 2006/0037987 A1 * | 2/2006 | Lin | .......................... | A45C 5/00 224/646 |
| 2007/0164987 A1 * | 7/2007 | Graham | ..................... | A45F 5/00 345/156 |
| 2013/0038995 A1 * | 2/2013 | Fang | ...................... | F16M 11/10 361/679.03 |
| 2013/0214022 A1 * | 8/2013 | Harvey | ................. | F16M 11/041 224/623 |
| 2014/0085814 A1 * | 3/2014 | Kielland | .................... | A45F 3/02 361/679.55 |
| 2015/0124385 A1 * | 5/2015 | Mak | ....................... | F16M 11/08 361/679.03 |
| 2016/0147254 A1 * | 5/2016 | Daley, III | ............... | G06F 1/163 348/725 |
| 2016/0154426 A1 * | 6/2016 | Daley, III | ............... | G06F 1/163 361/679.03 |

* cited by examiner

*Primary Examiner* — Anthony M Haughton

(57) ABSTRACT

This disclosure relates to an apparatus for converting a mobile device into a wearable. The apparatus comprises a body including an area configured to couple to a mobile device, and one or more flexible members coupled to the body, wherein the one or more flexible members are capable of retracting to a first position and capable of expanding to a second position, wherein the second position allows a user to wear the apparatus.

19 Claims, 85 Drawing Sheets

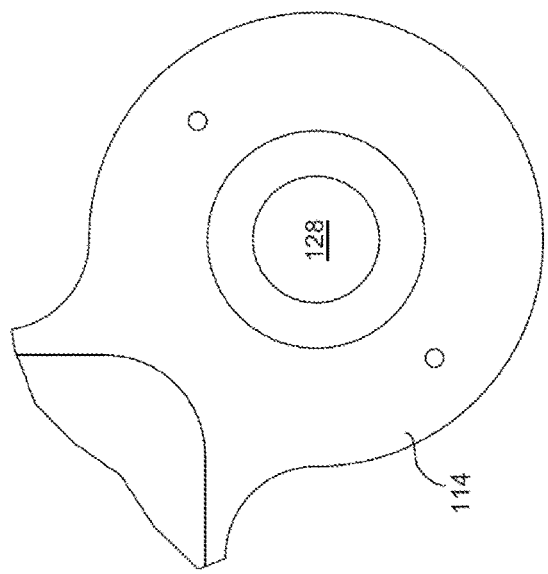
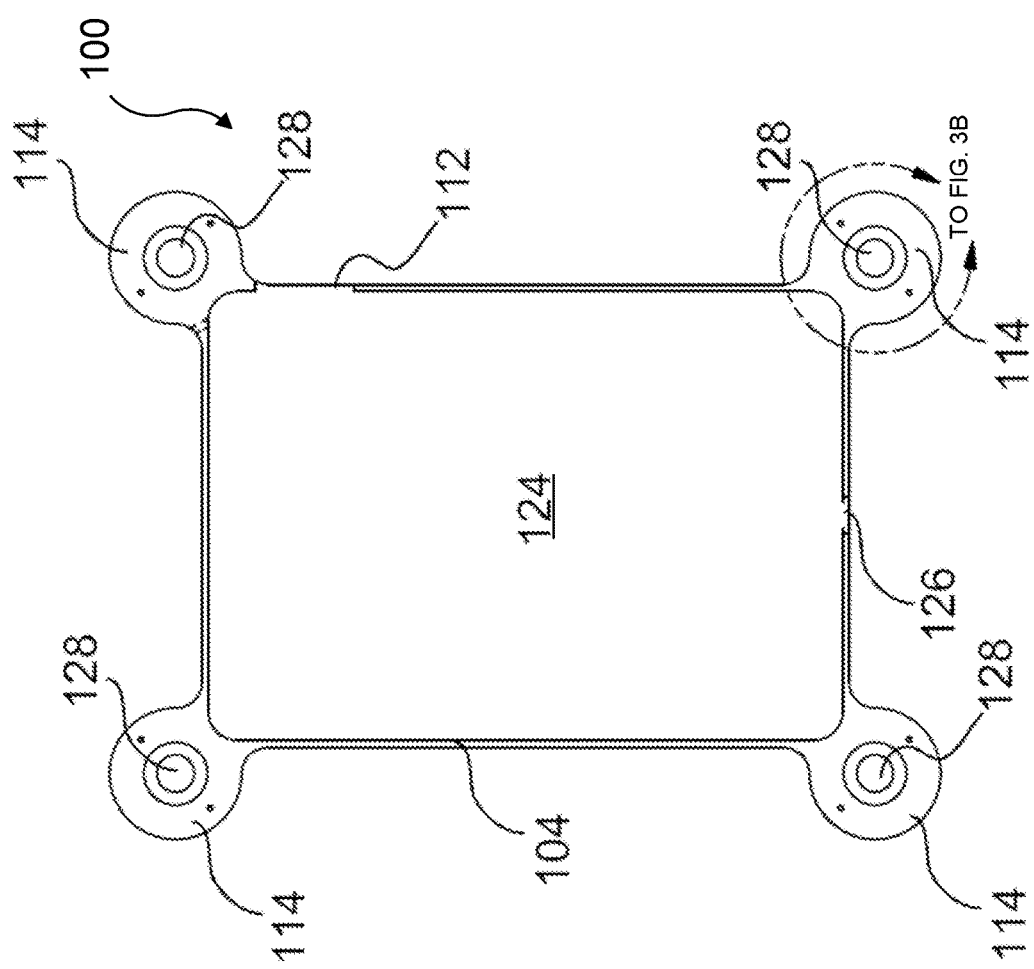
FIG. 3B
FIG. 3A

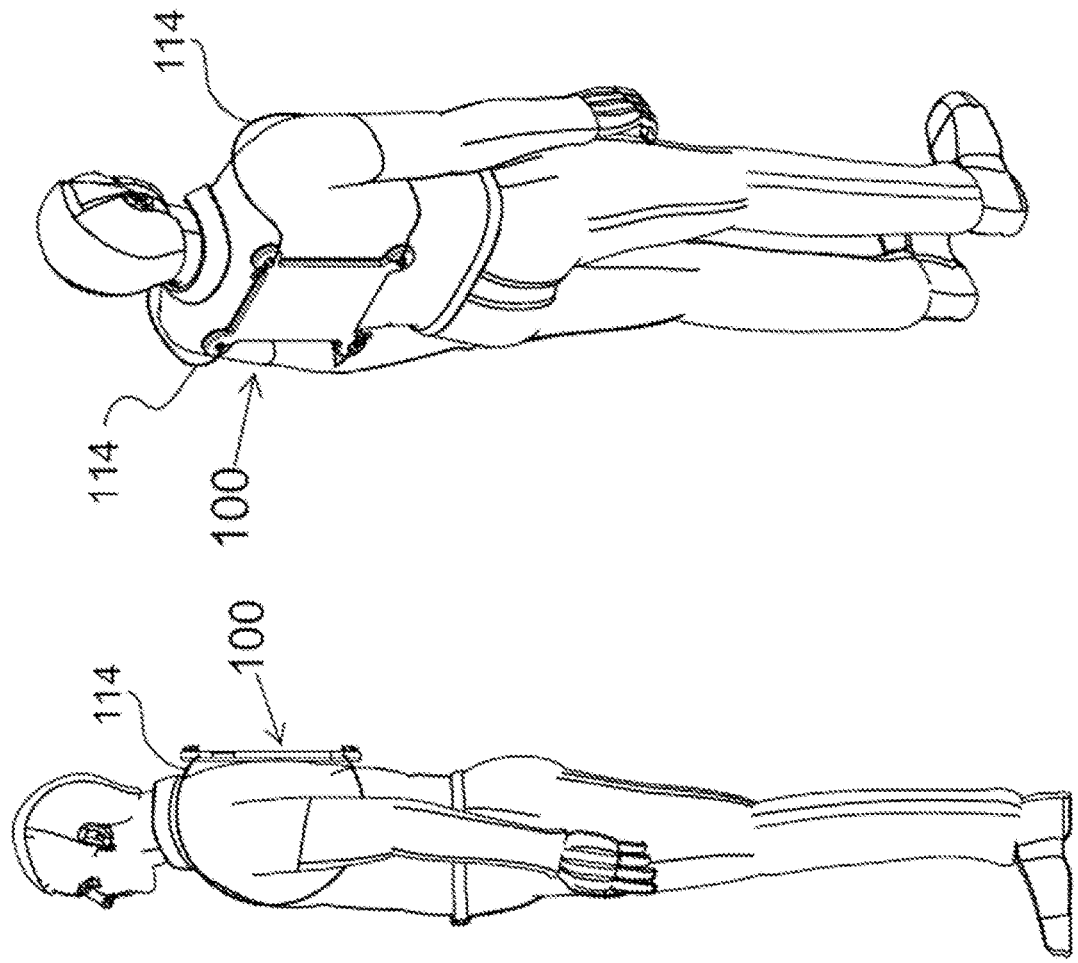
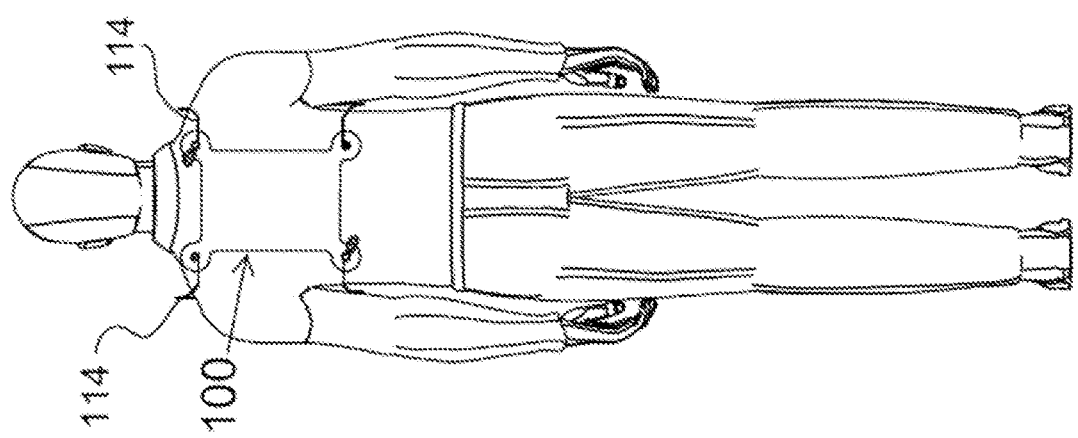

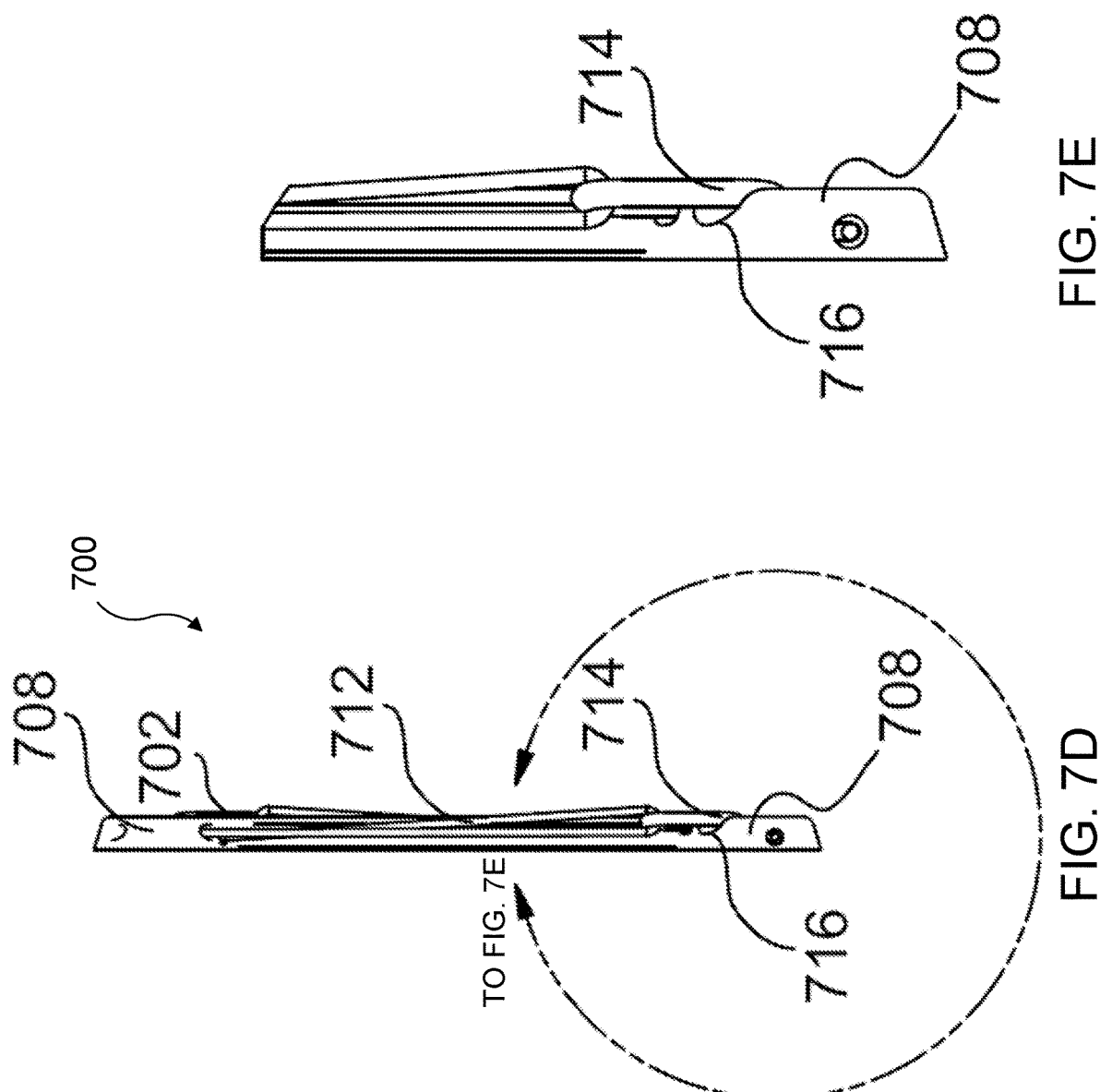

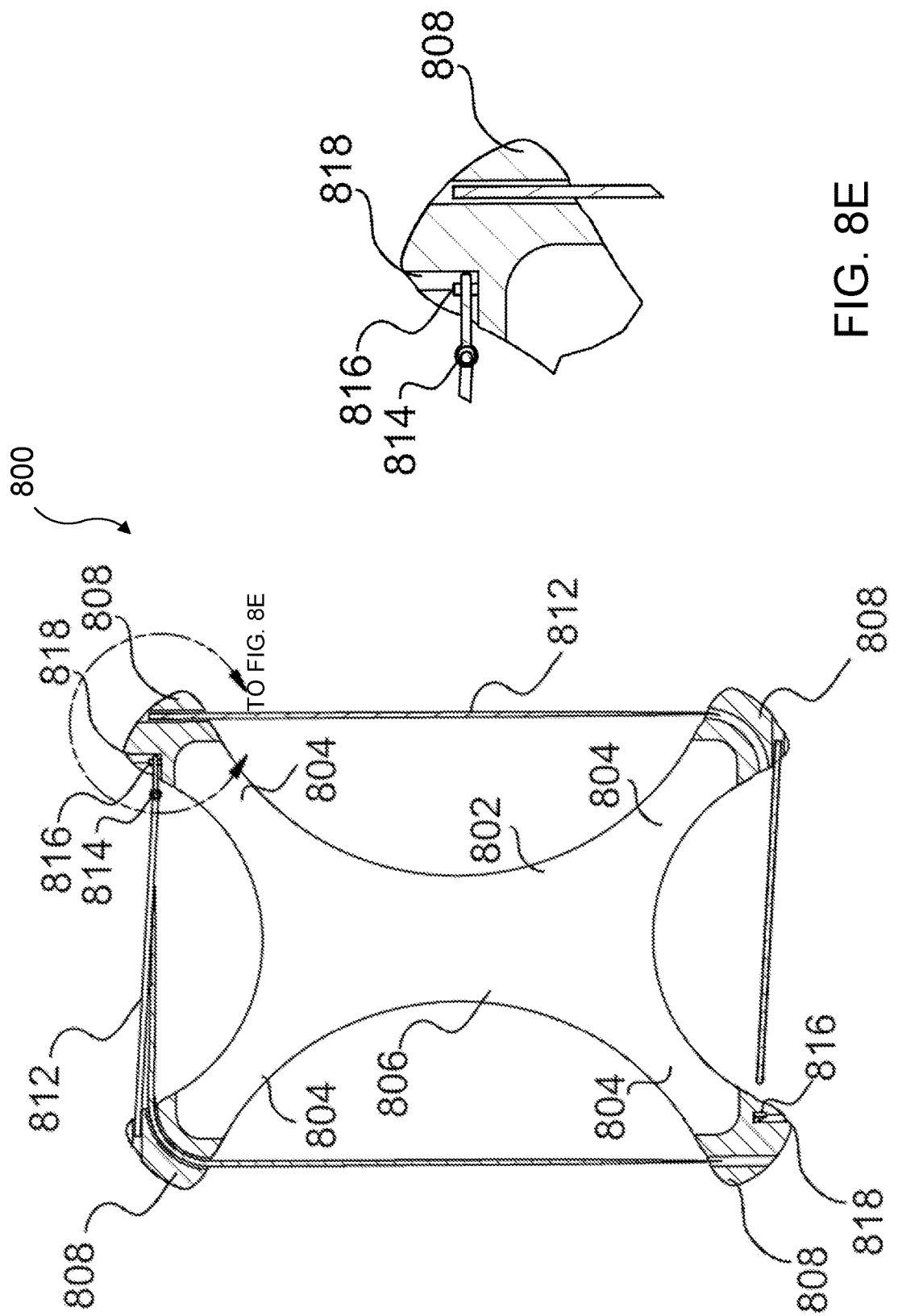

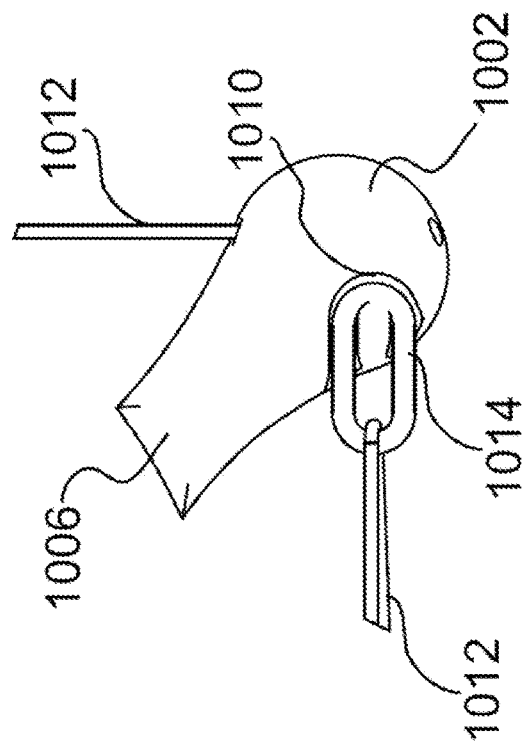
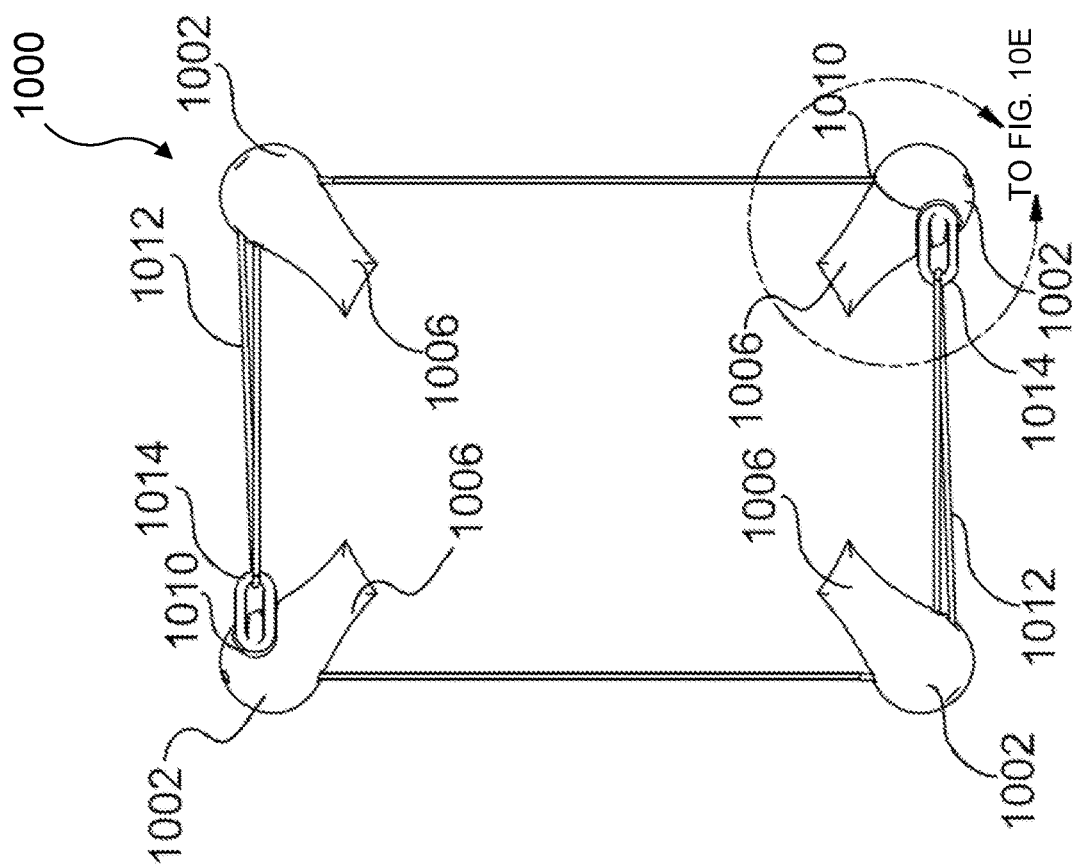
FIG. 10E
FIG. 10D

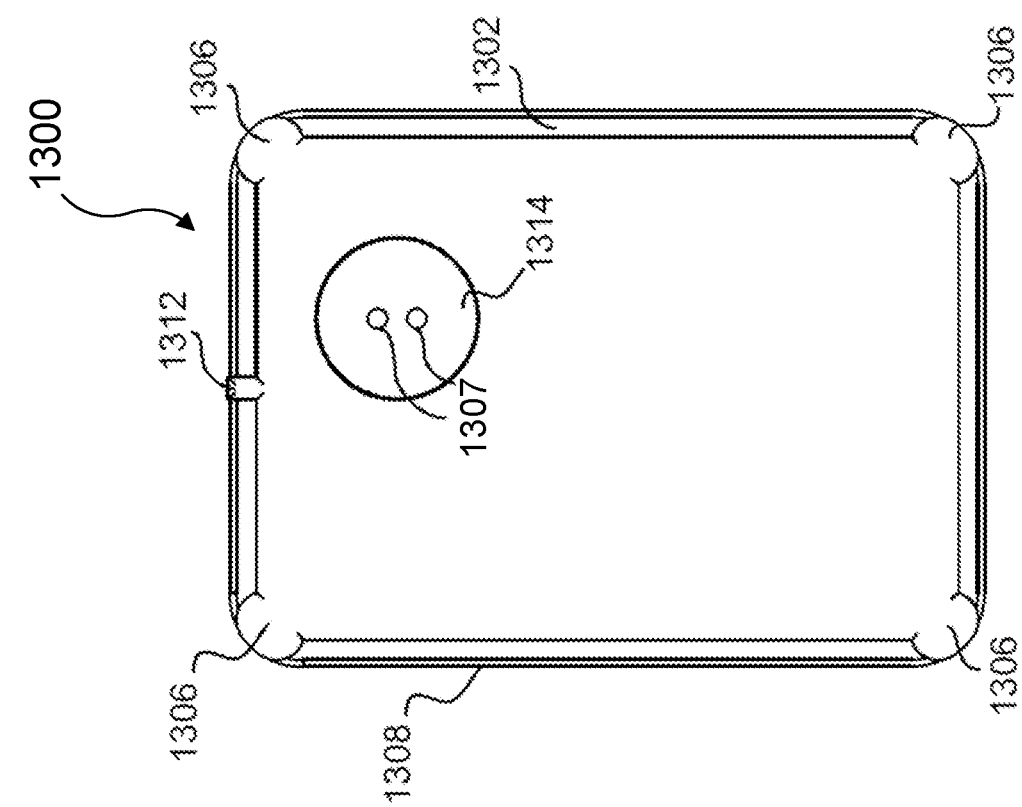
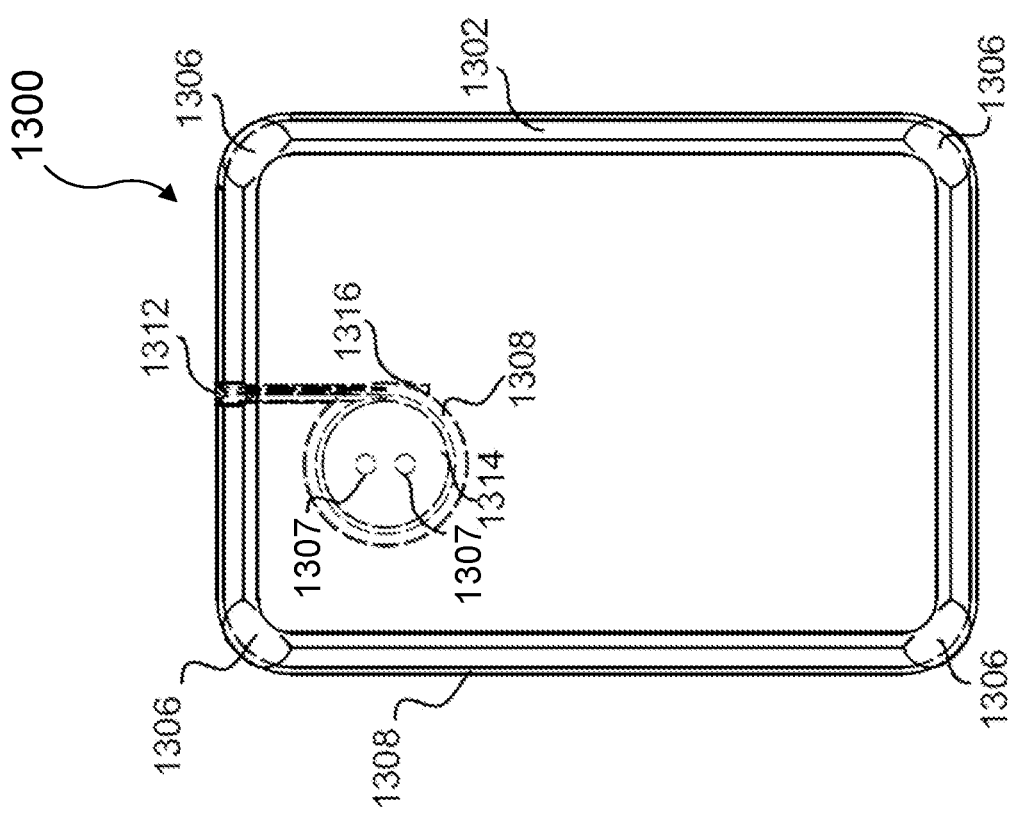
FIG. 13C
FIG. 13D

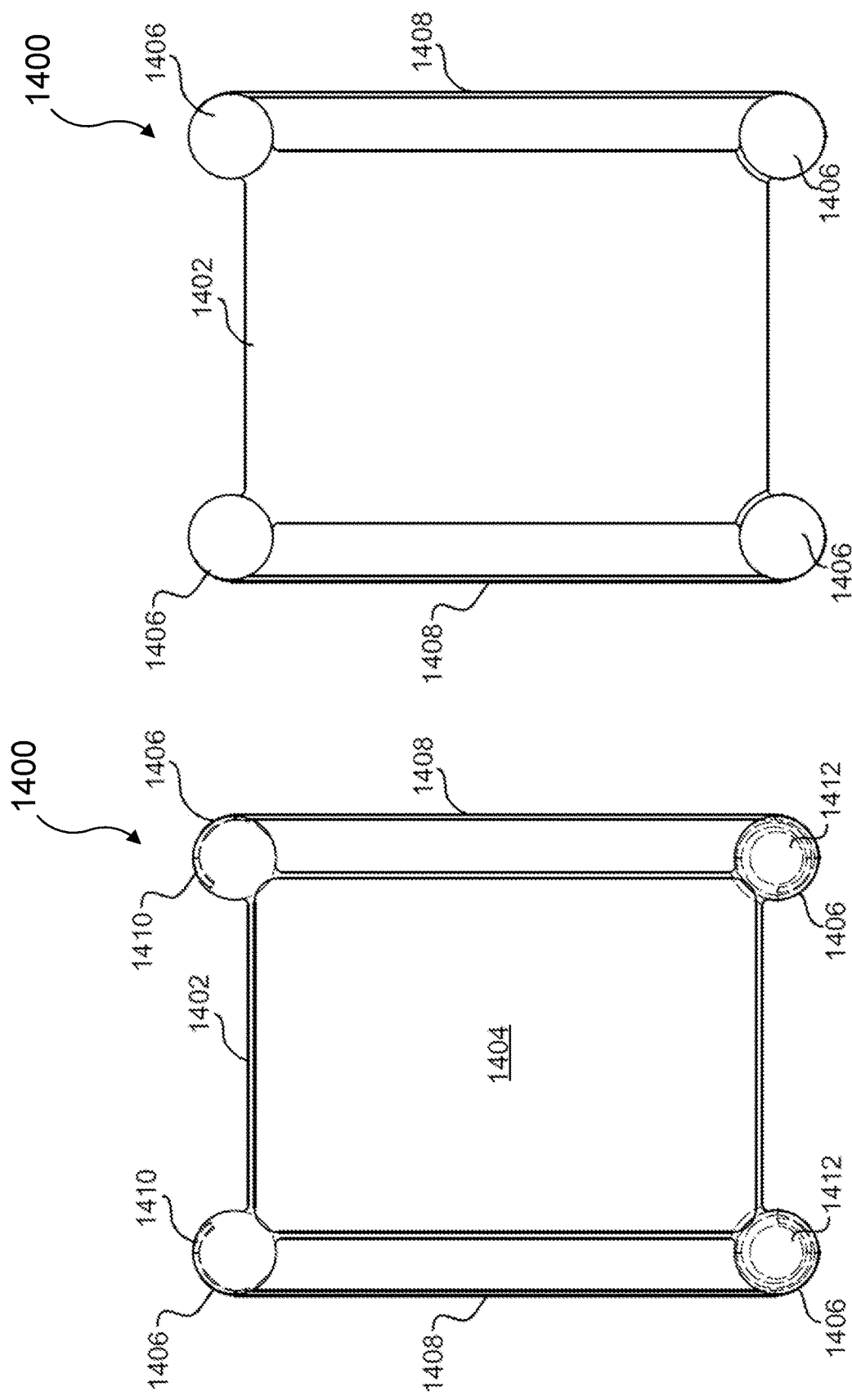

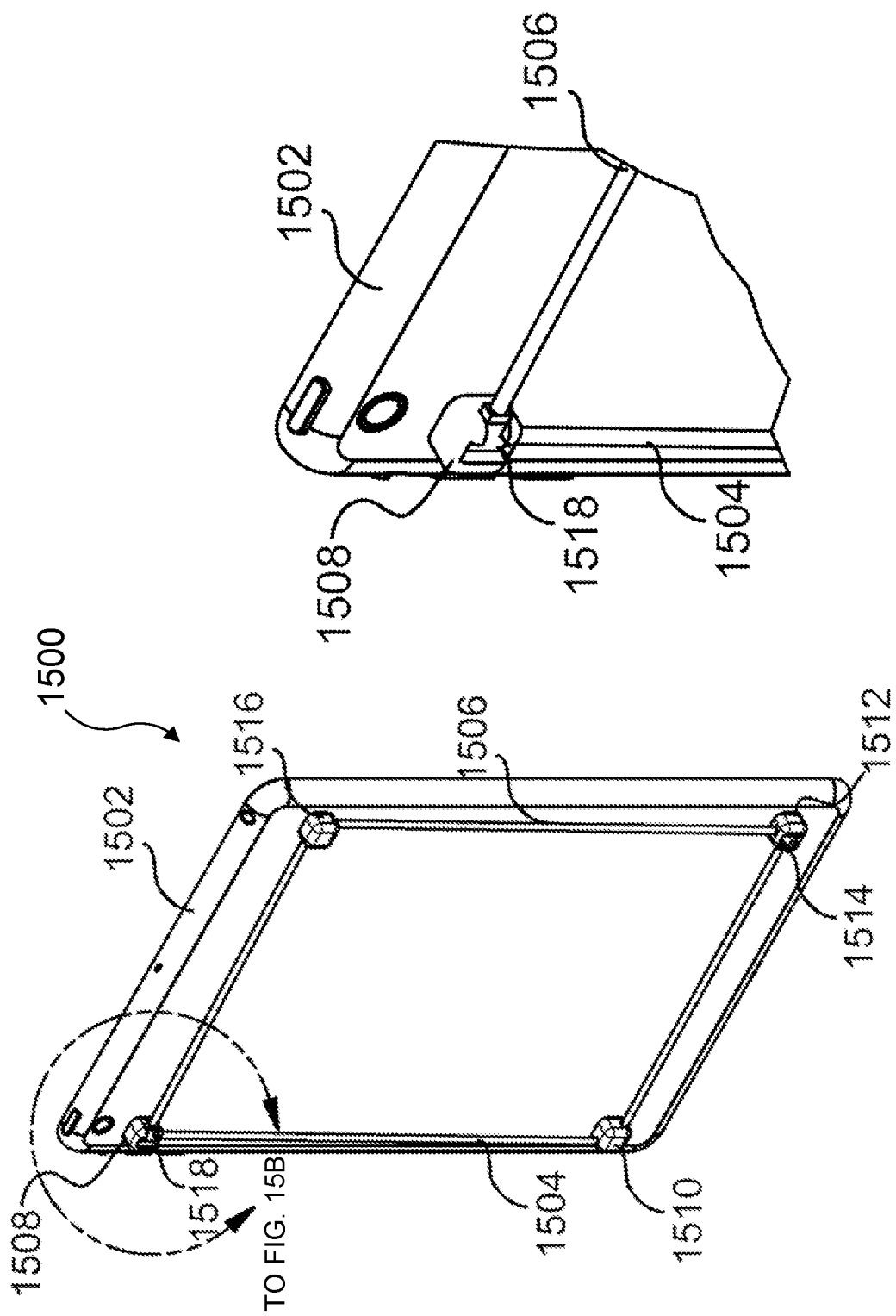

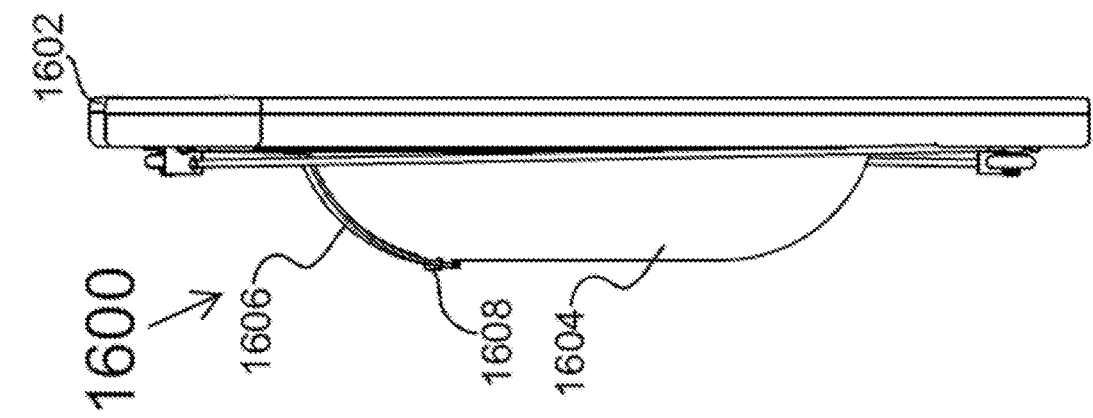
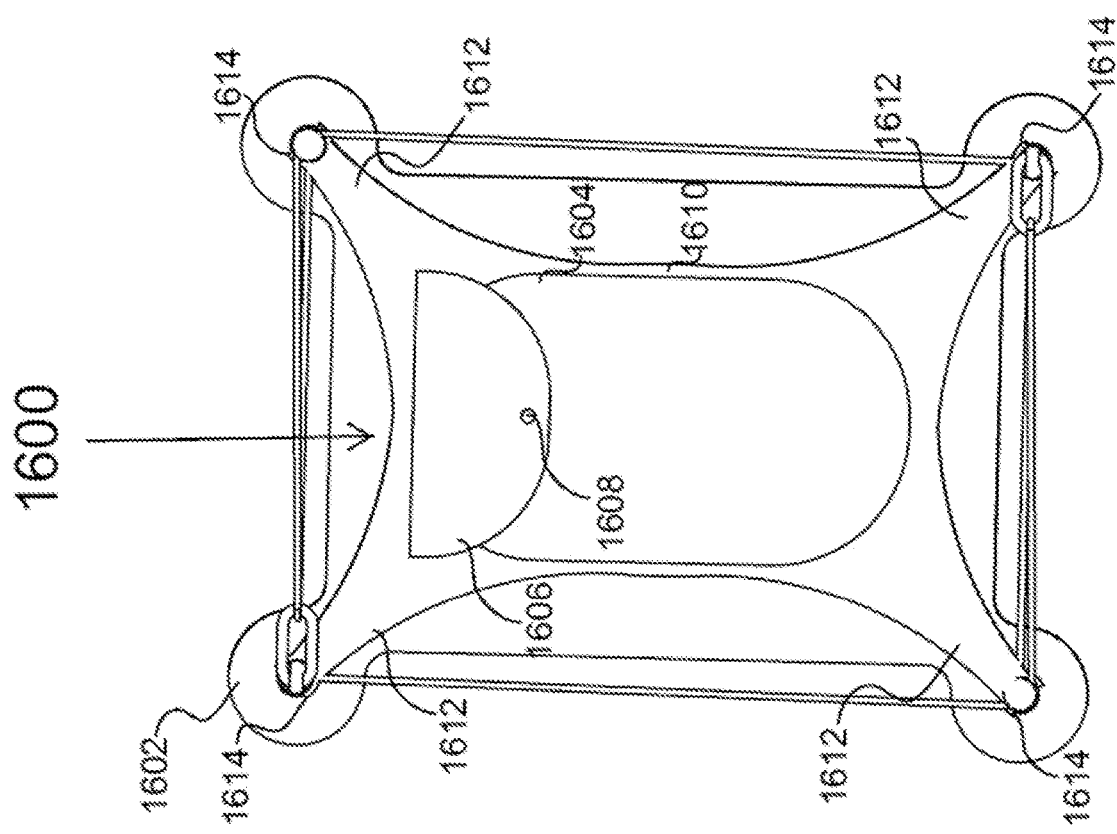
FIG. 16B
FIG. 16A

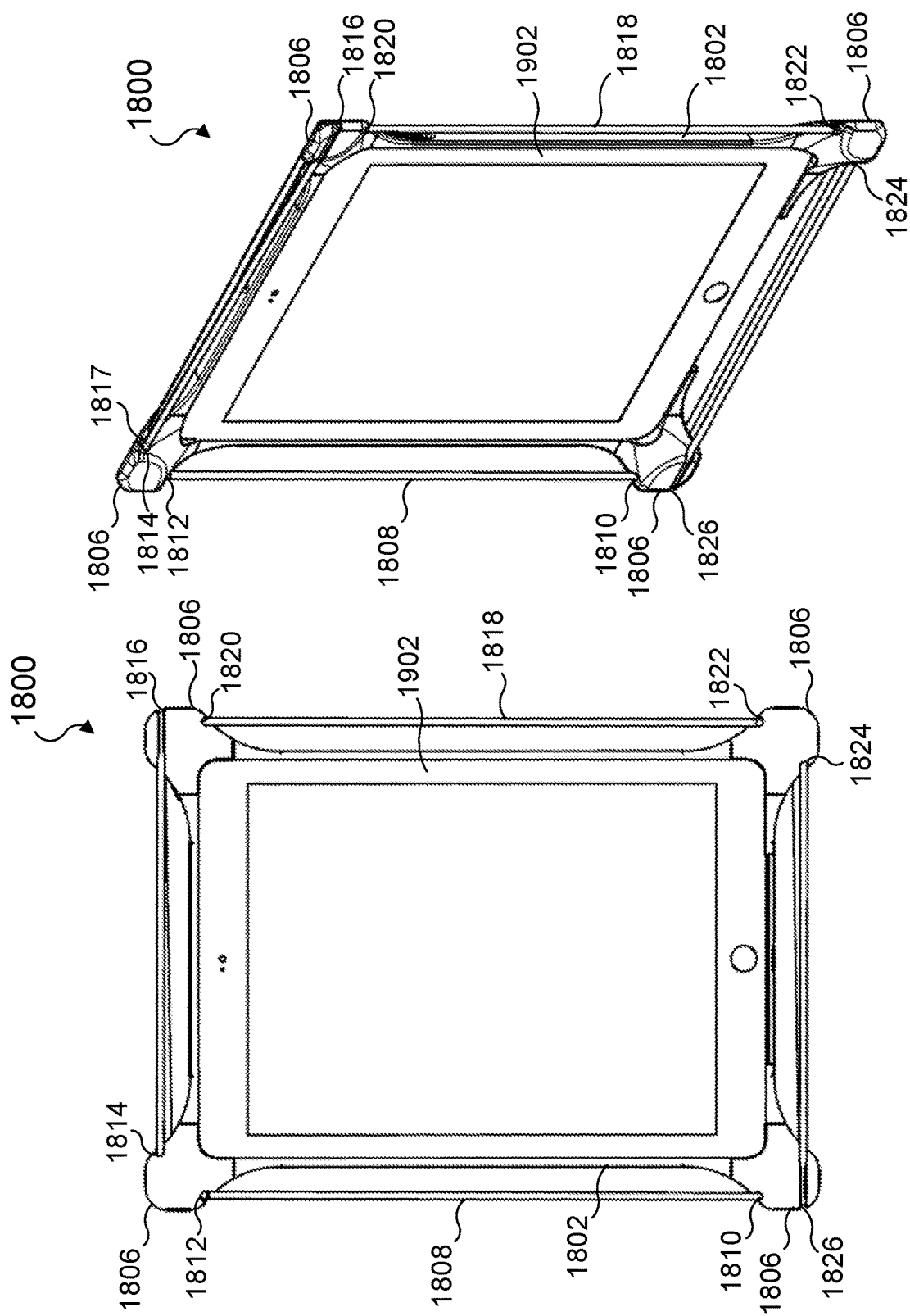

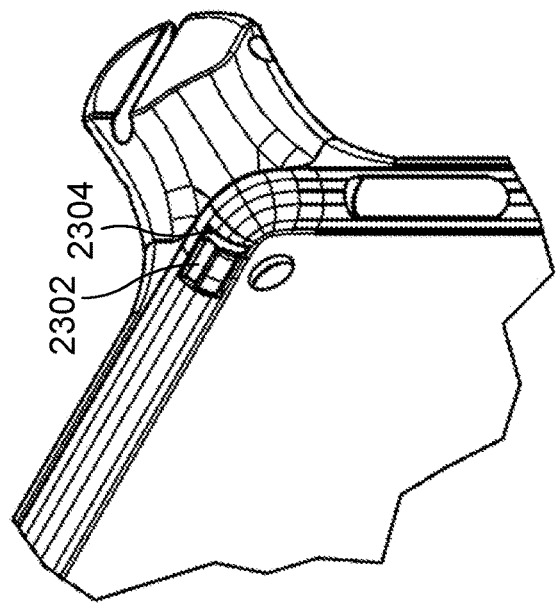
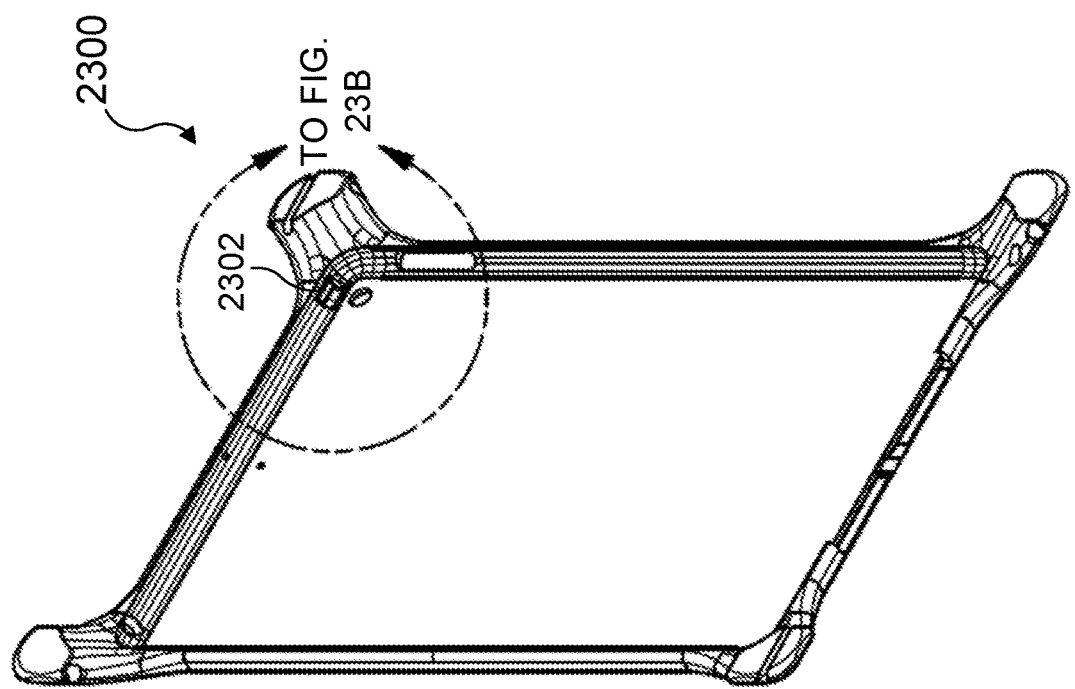
FIG. 23B
FIG. 23A

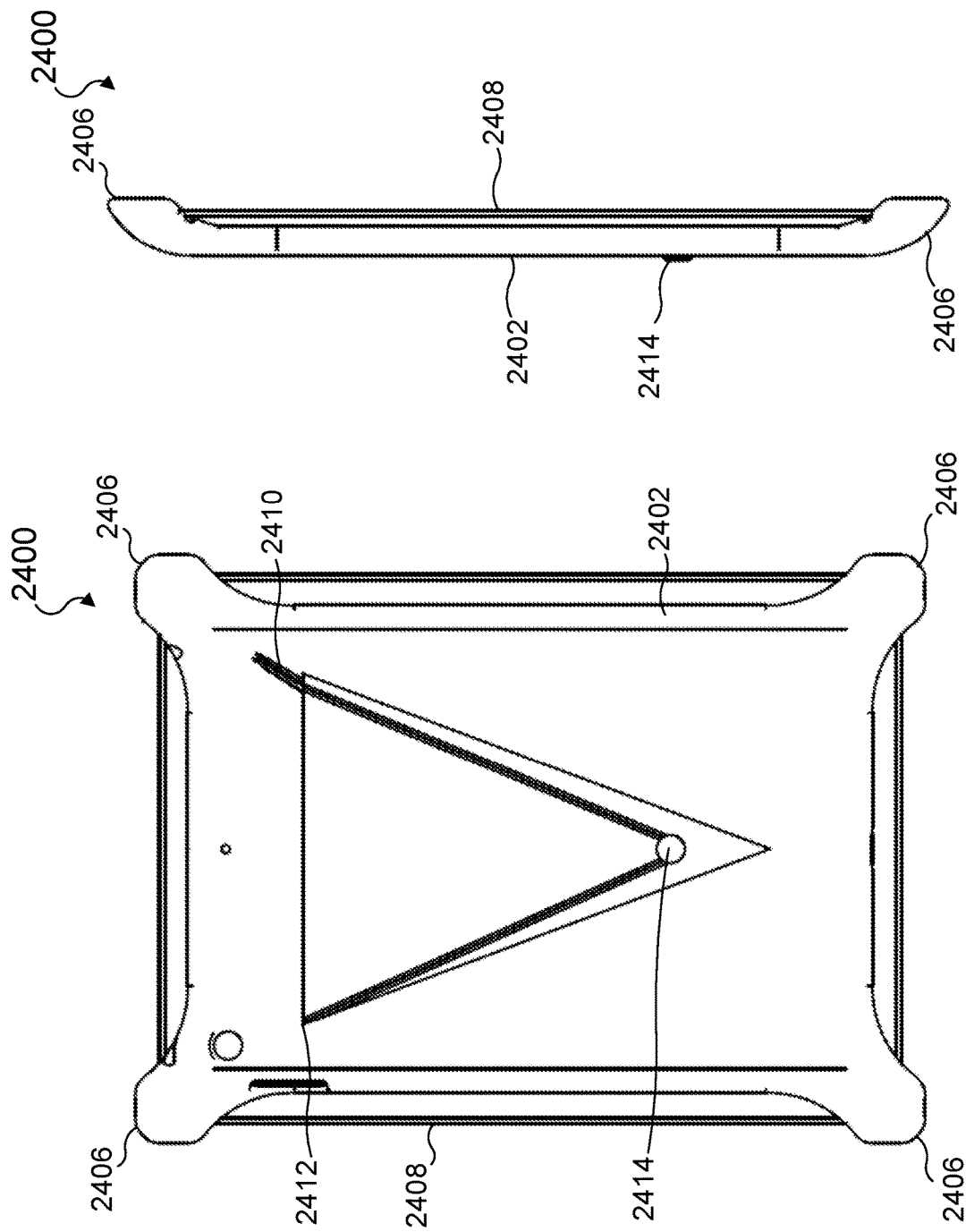

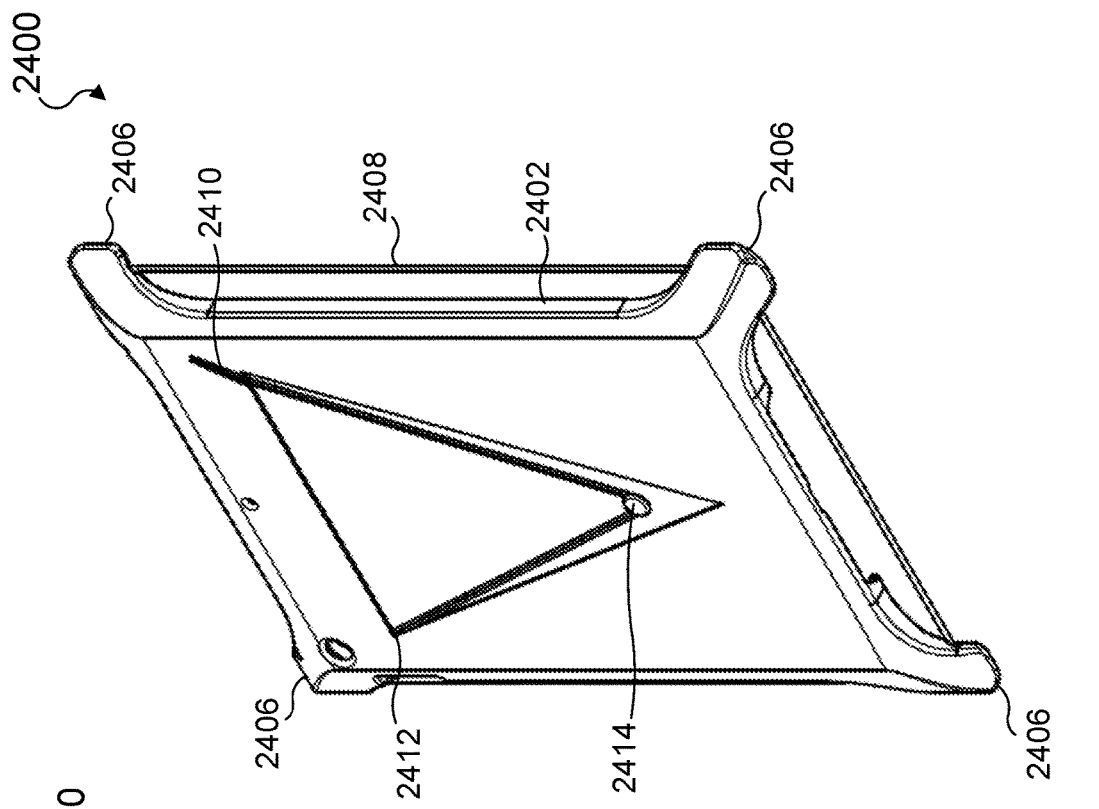
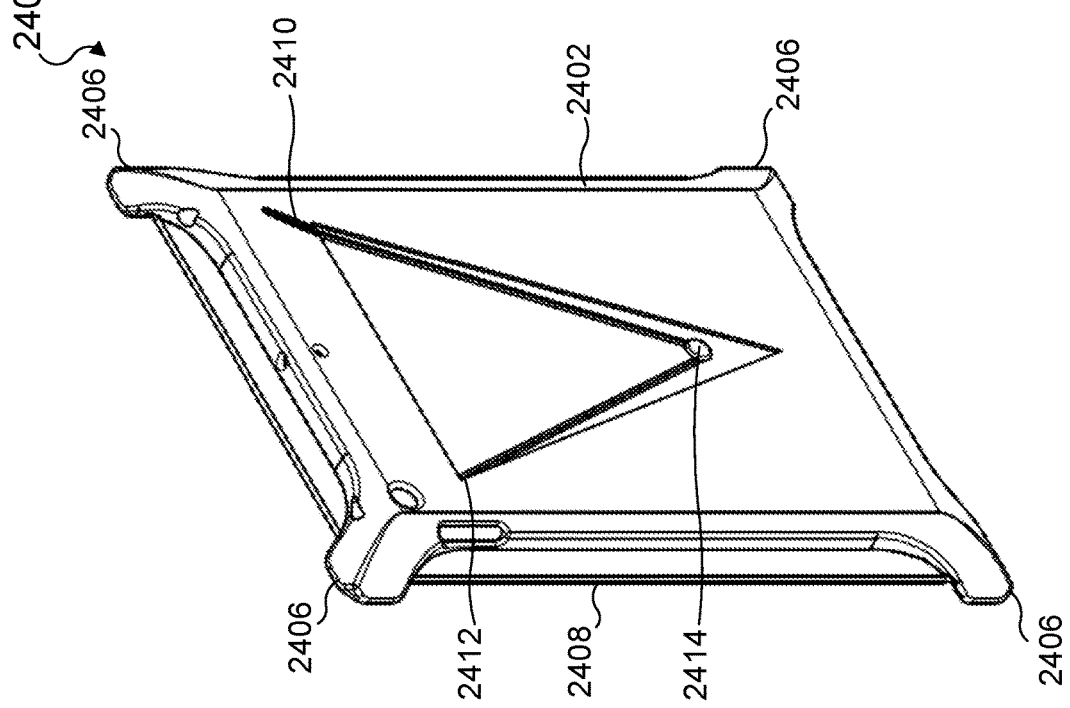
FIG. 24D
FIG. 24C

APPARATUS FOR CONVERTING MOBILE DEVICE INTO WEARABLE

CROSS-REFERENCE TO RELATED APPLICATIONS

This application claims benefit of U.S. Provisional Patent Application Ser. No. 62/481,495, filed on Apr. 4, 2017, and entitled MOBILE DEVICE CASE OR FACTORY INSTALLED FEATURE CAPABLE OF CONVERTING INTO WEARABLE APPARATUS, the entire contents of which are incorporated by reference herein in their entirety.

TECHNICAL FIELD

The following disclosure relates generally to mobile device cases and more specifically to an apparatus for converting a mobile device into a wearable.

SUMMARY

In one aspect thereof, an apparatus for converting a mobile device into a wearable is provided. The apparatus includes a body including an area configured to couple to a mobile device, and one or more flexible members coupled to the body, wherein the one or more flexible members are capable of retracting to a first position and capable of expanding to a second position, wherein the second position allows a user to wear the apparatus.

In one embodiment, the flexible members are coupled to a rear of the body.

In one embodiment, a first end of at least one flexible member of the flexible members is secured to the rear of the body at a first position on the body.

In one embodiment, when the at least one flexible member is in the first position, a second end of the at least one flexible member is removeably coupled at a second position on the body.

In one embodiment, the second end of the at least one flexible member is coupled to a link, and wherein, when the at least one flexible member is in the first position, the link coupled to the second end of the at least one flexible member is removeably coupled to a hook disposed at the first position on the body.

In one embodiment, when the at least one flexible member is in the second position, the second end of the at least one flexible member is decoupled from the second position on the body and the at least one flexible member is extended from the body.

In one embodiment, to move the at least one flexible member to the second position, the at least one flexible member slides through a slot at a third position of the body.

In one embodiment, the first position and second position are disposed at diagonally opposite corners of the body, and wherein the third position is disposed at another corner of the body adjacent to the first position and the second position.

In one embodiment, at least a part of each of the flexible members is disposed within a portion of the body when in the first position.

In one embodiment, the flexible members are configured to be pulled from within the portion of the body to extend the flexible members to the second position.

In one embodiment, the at least a part of each of the flexible members is wrapped around a spool within the portion of the body.

In one embodiment, the area of the body configured to couple to the mobile device is a recessed portion of the body.

In one embodiment, the body includes two or more separate portions that each couple to the mobile device at different positions on the mobile device.

In one embodiment, the two or more separate portions are adhesively coupled to the mobile device.

In one embodiment, the apparatus further includes a pouch coupled to a rear of the body.

In one embodiment, the apparatus further includes a harness coupled to a rear of the body configured to receive a toy.

In another aspect thereof, a method for operating an apparatus for converting a mobile device into a wearable is provided. The method includes expanding one or more flexible members coupled to a body of the apparatus from a first position to a second position, and inserting a portion of a body of a user between the expanded one or more flexible members and the body of the apparatus.

In one embodiment, expanding the one or more flexible members from the first position to the second position includes sliding the one or more flexible members through a slot disposed at a position of the body.

In one embodiment, the method further includes returning the one or more flexible members to the first position, including retracting the one or more flexible members and securing the one or more flexible members to the body of the apparatus.

In one embodiment, securing the one or more flexible members to the body of the apparatus includes coupling one end of each of the one or more flexible members to one or more snaps.

BRIEF DESCRIPTION OF THE DRAWINGS

For a more complete understanding, reference is now made to the following description taken in conjunction with the accompanying Drawings in which:

FIG. 3A illustrates a front view of a rear body portion of a wearable device case in accordance with various embodiments of the present disclosure;

FIG. 3B illustrates an enlarged view of a bottom right circular body portion of a rear body portion of a wearable device case in accordance with various embodiments of the present disclosure;

FIG. 6A illustrates a rear view of a user wearing a wearable device case in accordance with various embodiments of the present disclosure;

FIG. 6B illustrates a right side view of a user wearing a wearable device case in accordance with various embodiments of the present disclosure;

FIG. 6C illustrates a rear perspective view of a user wearing a wearable device case in accordance with various embodiments of the present disclosure;

FIG. 7D illustrates a top view of a wearable device case with the presence of a mobile device in accordance with various embodiments of the present disclosure;

FIG. 7E illustrates an enlarged top view of one of circular body portions and a link of a wearable device case with the presence of a mobile device in accordance with various embodiments of the present disclosure;

FIG. 8D illustrates a front cross-section view of a wearable device case showing slots for pins without the presence of a mobile device in accordance with various embodiments of the present disclosure;

FIG. 8E illustrates an enlarged front cross-section view of a top right circular body portion of a wearable device case showing a slot for a pin without the presence of a mobile device in accordance with various embodiments of the present disclosure;

FIG. 10D illustrates a rear view of a wearable device case in accordance with various embodiments of the present disclosure;

FIG. 10E illustrates an enlarged view of one circular body of a wearable device case in accordance with various embodiments of the present disclosure;

FIG. 13C illustrates a front view of a wearable device case in accordance with various embodiments of the present disclosure;

FIG. 13D illustrates a rear view of a wearable device case in accordance with various embodiments of the present disclosure;

FIG. 14D illustrates a front view of a wearable device case in accordance with various embodiments of the present disclosure;

FIG. 14E illustrates a rear view of a wearable device case in accordance with various embodiments of the present disclosure;

FIG. 15A illustrates a rear perspective view of a mobile device wearable conversion apparatus installed on a mobile device in accordance with various embodiments of the present disclosure;

FIG. 15B illustrates an enlarged rear perspective view of a portion of a mobile device wearable conversion apparatus showing a secured flexible member in accordance with various embodiments of the present disclosure;

FIG. 16A illustrates a rear view of a pouch or insulated lunch bag accessory installed on a back of a wearable device case in accordance with various embodiments of the present disclosure;

FIG. 16B illustrates a left side view of a pouch or insulated lunch bag accessory installed on a back of a wearable device case in accordance with various embodiments of the present disclosure;

FIG. 19A illustrates a front view of a wearable device case with a mobile device installed in accordance with various embodiments of the present disclosure;

FIG. 19B illustrates a front perspective view of a wearable device case with a mobile device installed in accordance with various embodiments of the present disclosure;

FIG. 20A illustrates a front view of a wearable device case in a wearable configuration in accordance with various embodiments of the present disclosure;

FIG. 20B illustrates a front perspective view of a wearable device case in a wearable configuration in accordance with various embodiments of the present disclosure;

FIG. 21A illustrates a front view of a wearable device case in a handheld configuration in accordance with various embodiments of the present disclosure;

FIG. 21B illustrates rear view of a wearable device case in a handheld configuration in accordance with various embodiments of the present disclosure;

FIG. 21C illustrates a front perspective view of a wearable device case in a handheld configuration in accordance with various embodiments of the present disclosure;

FIG. 21D illustrates a rear perspective view of a wearable device case in a handheld configuration in accordance with various embodiments of the present disclosure;

FIG. 21E illustrates a top view of a wearable device case in a handheld configuration in accordance with various embodiments of the present disclosure;

FIG. 21F illustrates a bottom view of a wearable device case in a handheld configuration in accordance with various embodiments of the present disclosure;

FIG. 21G illustrates a left side view of a wearable device case in a handheld configuration in accordance with various embodiments of the present disclosure;

FIG. 21H illustrates a right side view of a wearable device case in a handheld configuration in accordance with various embodiments of the present disclosure;

FIG. 22A illustrates a front view of a wearable device case in a wearable configuration in accordance with various embodiments of the present disclosure;

Figure 22A:
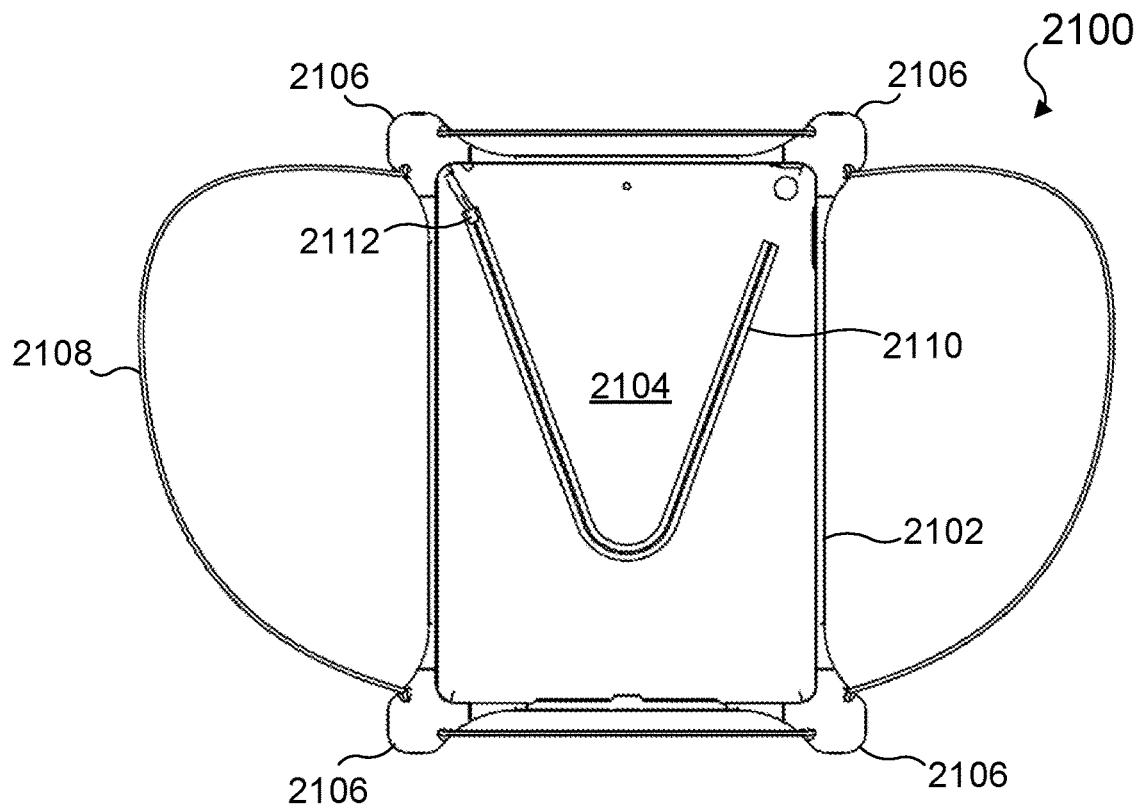
Figure 22B:
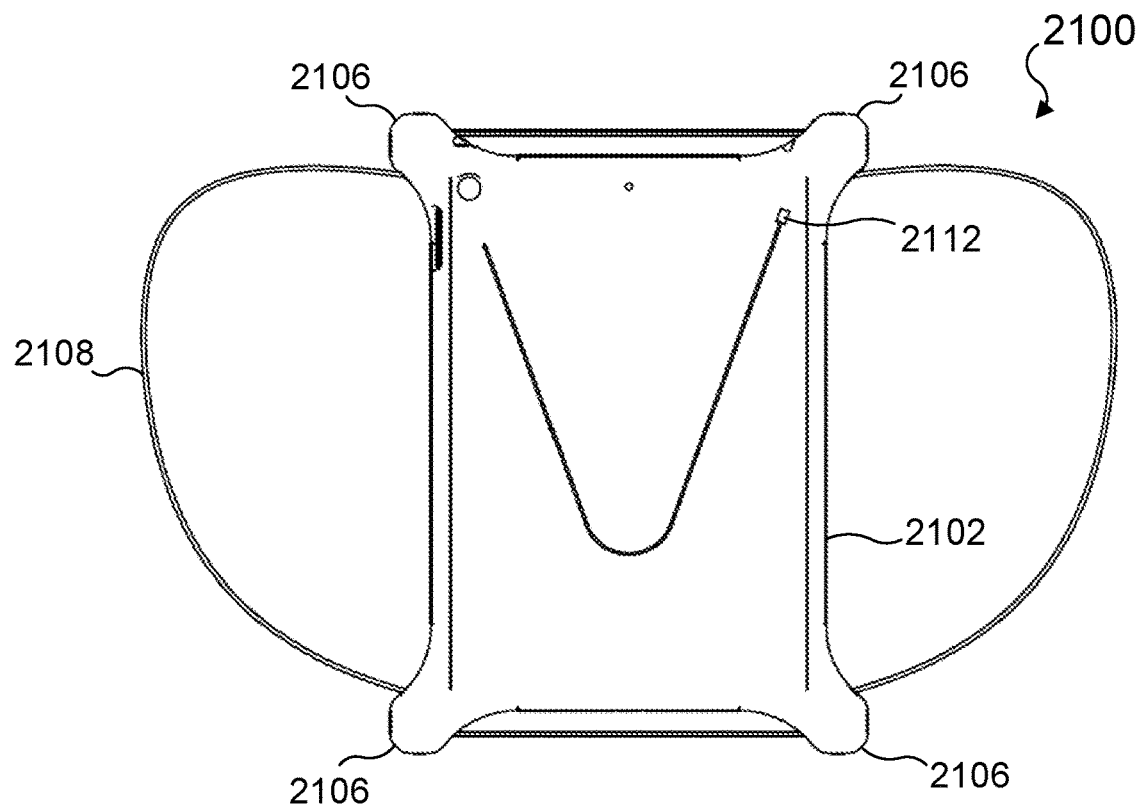
Figure 22C:
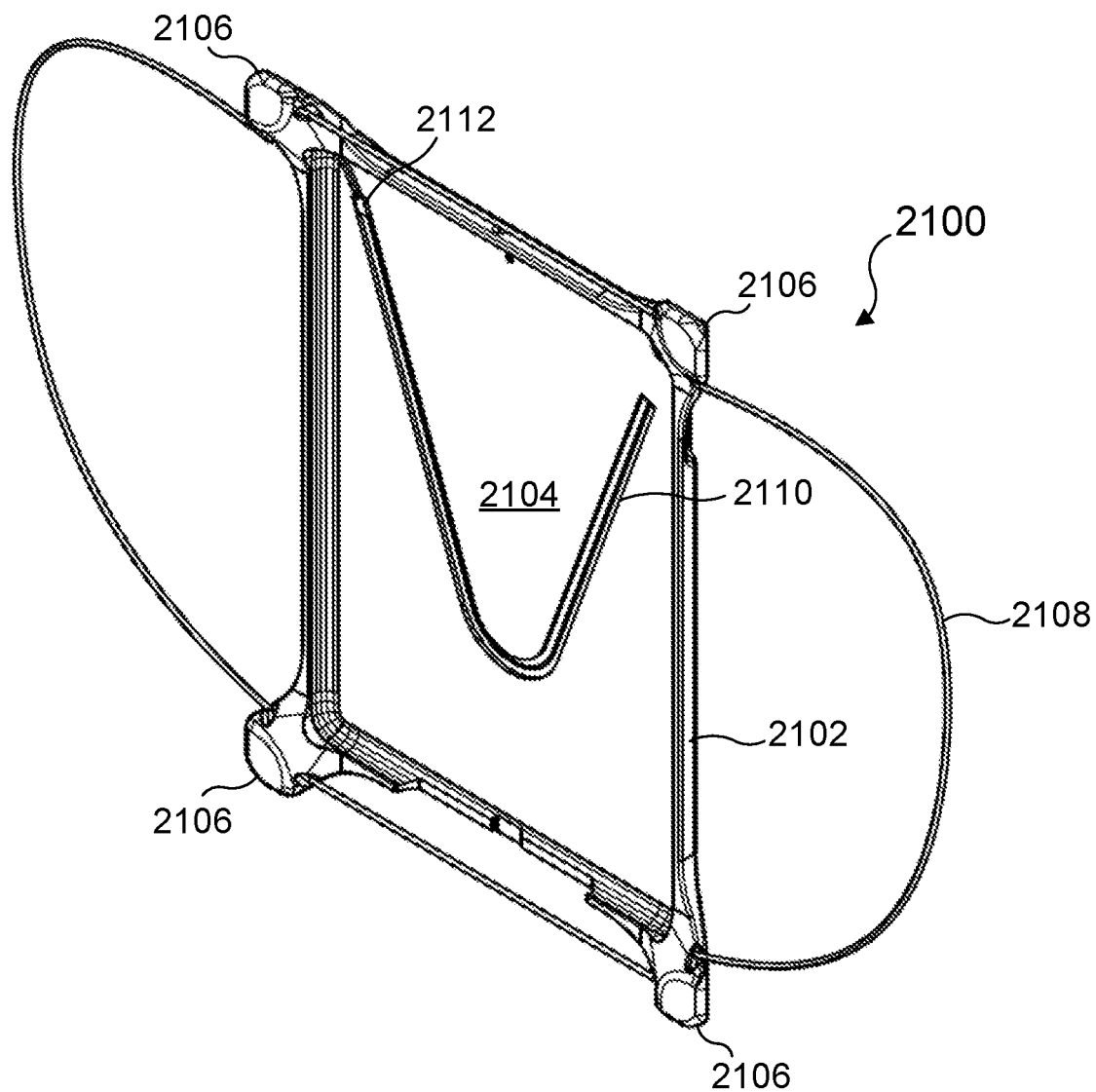
Figure 25A:
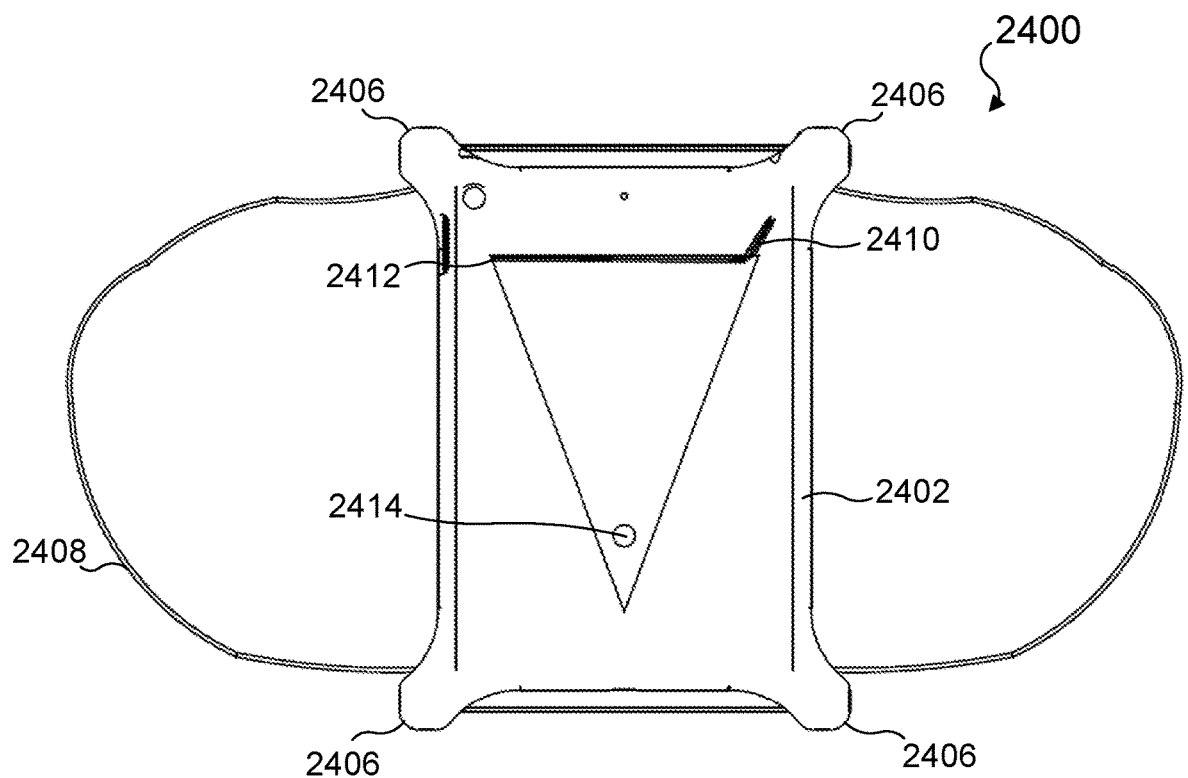
Figure 25B:
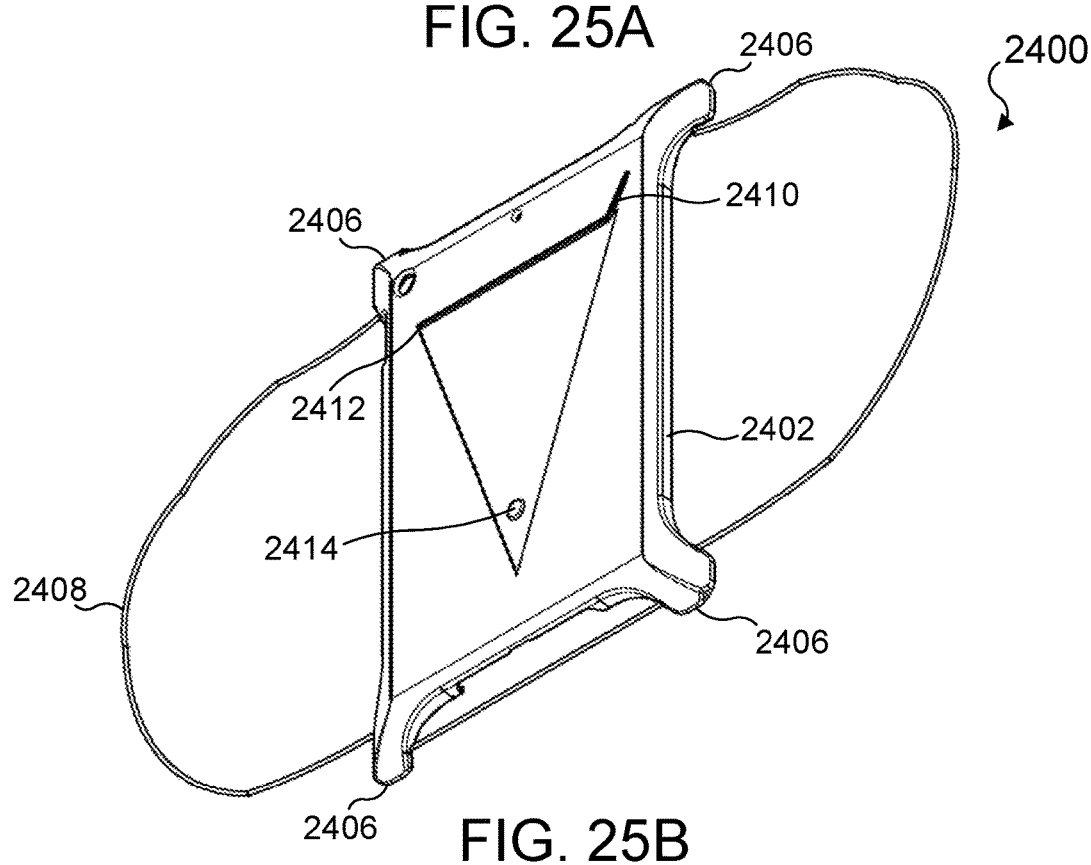

FIG. 22B illustrates rear view of a wearable device case in a wearable configuration in accordance with various embodiments of the present disclosure;

FIG. 22C illustrates a front perspective view of a wearable device case in a wearable configuration in accordance with various embodiments of the present disclosure;

FIG. 23A illustrates a front perspective view of a mobile device case including a lock button in accordance with various embodiments of the present disclosure;

FIG. 23B illustrates an enlarged view of a lock button disposed at a corner of a mobile device case in accordance with various embodiments of the present disclosure;

FIG. 24A illustrates a rear view of a mobile device case in a handheld configuration in accordance with various embodiments of the present disclosure;

FIG. 24B illustrates a left side view of a mobile device case in a handheld configuration in accordance with various embodiments of the present disclosure;

FIG. 24C illustrates a rear perspective view of a mobile device case in a handheld configuration in accordance with various embodiments of the present disclosure;

FIG. 24D illustrates a bottom perspective view of a mobile device case in a handheld configuration in accordance with various embodiments of the present disclosure;

FIG. 25A illustrates a rear view of a mobile device case in a wearable configuration in accordance with various embodiments of the present disclosure; and FIG. 25B illustrates a bottom perspective view of a mobile device case in a wearable configuration in accordance with various embodiments of the present disclosure.

DETAILED DESCRIPTION

Figure 1A:
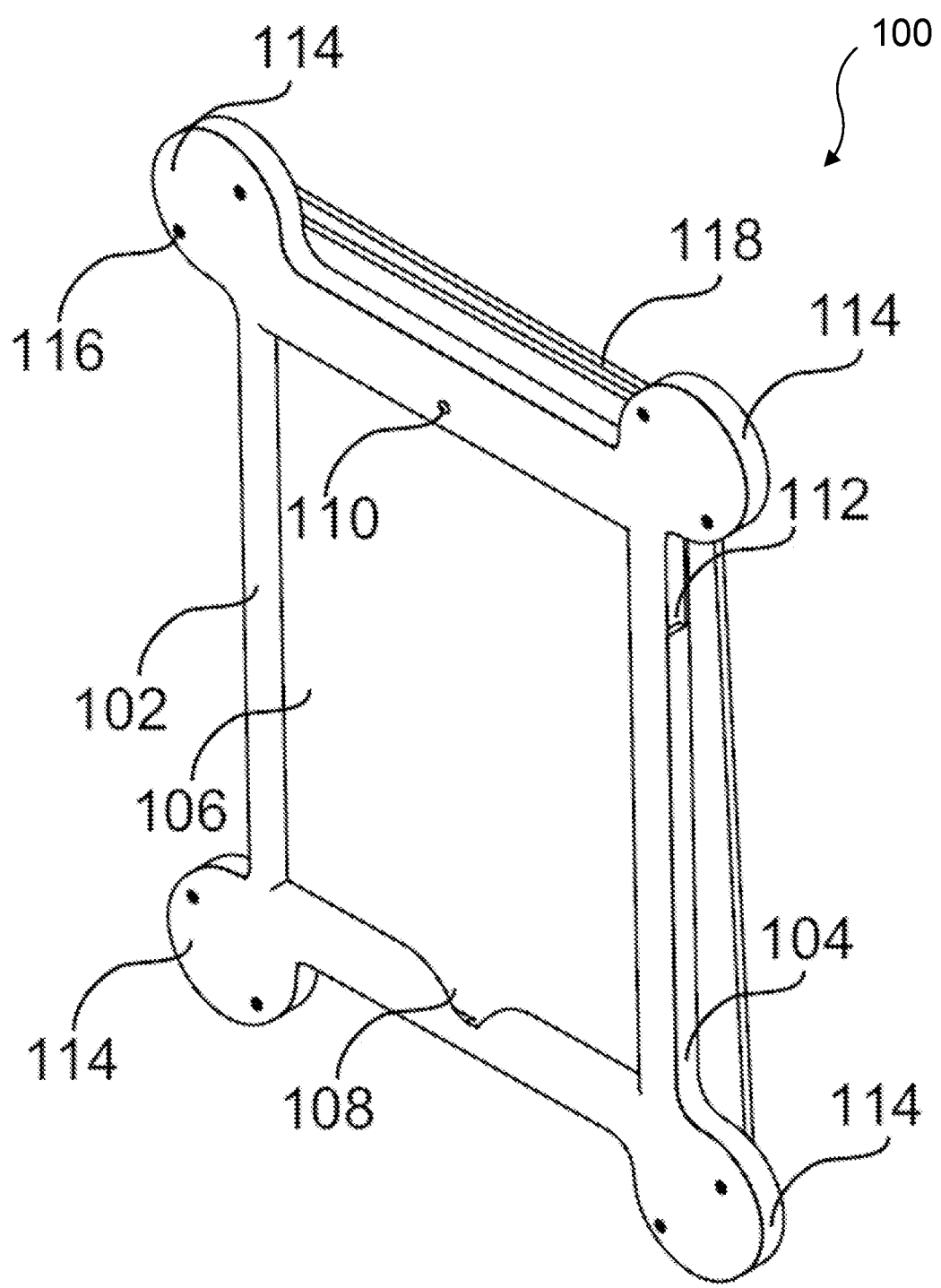
FIG. 1A illustrates a front perspective view of a wearable mobile device case in accordance with various embodiments of the present disclosure.

Referring now to FIG. 1A, there is illustrated a front perspective view of a wearable mobile device case 100 in accordance with various embodiments of the present disclosure. The case 100 includes a front body portion 102 and a rear body portion 104. The front body portion 102 and the rear body portion 104 each are of a rectangular shape, with the front body portion 102 having a window 106 for viewing a screen of a tablet or other mobile device. It will be understood that shapes other than a rectangular shape may be used for this embodiment and other embodiments and the size or proportional dimensions of the shape may be altered, to allow for different mobile device to be installed within the case 100. When no tablet or other mobile device is installed within the window, a front center portion of the rear body portion 104 can be seen through the window 106. The window 106 of the front body portion 102 has a cutout 108 near the center bottom of the window 106, allowing access to a button or buttons that may be present on a tablet or other mobile device. The front body portion 102 also has a circular cutout 110 that allows for a camera or other optical device on the tablet or other mobile device to be able to operate with the case 100 without blocking the camera, sensors, or other optical device. The rear body portion 104 also has a cutout 112 on a side thereof that allows for buttons on the tablet or other mobile device, such as audio volume buttons, to be accessed.

The front body portion 102 and the rear body portion 104 each have at each of the four corners of the rectangular shape, circular body portions 114 protruding diagonally outward from the center of the front and rear body portions 102 and 104. The front body portion 102 and the rear body portion 104 are coupled together via a plurality of fixing members 116, such as screws, at each of the circular body portions 114, to form a complete body to house the tablet or other mobile device. The circular body portions 114 may not be perfect circular shapes, but may also be oval-shaped, or some other shape. It will be understood that there will be sufficient space between the front body portion 102 and the rear body portion 104 when coupled together to allow for the tablet or other mobile device to lie between the front body portion 102 and the rear body portion 104, with the screen of the tablet or other mobile device viewable within the window 106. In some embodiments, the tablet or other mobile device is placed within the rear body portion 104, and then the front body portion 102 is placed over the tablet and coupled to the rear body portion 104 to close and secure the tablet or other mobile device within the case 100. In other embodiments, the tablet or other mobile device slide into the window 106. The case 100 further includes one or more flexible members 118 attached to the back of the rear body portion 104, providing for functionalities further described herein pertaining to easier holding of the case 100 by a user, and to allow for conversion of the case 100 into a wearable item.

Figure 1C:
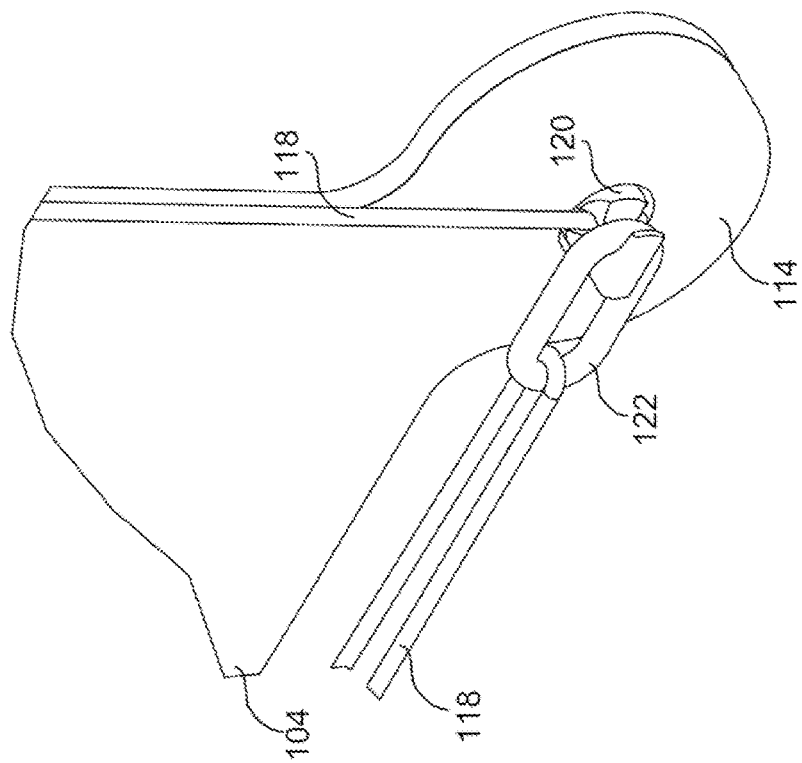
FIG. 1C illustrates an enlarged view of a bottom right circular body portion showing a means for securing a flexible member to a body portion of a wearable device case in accordance with various embodiments of the present disclosure.
Figure 1B:
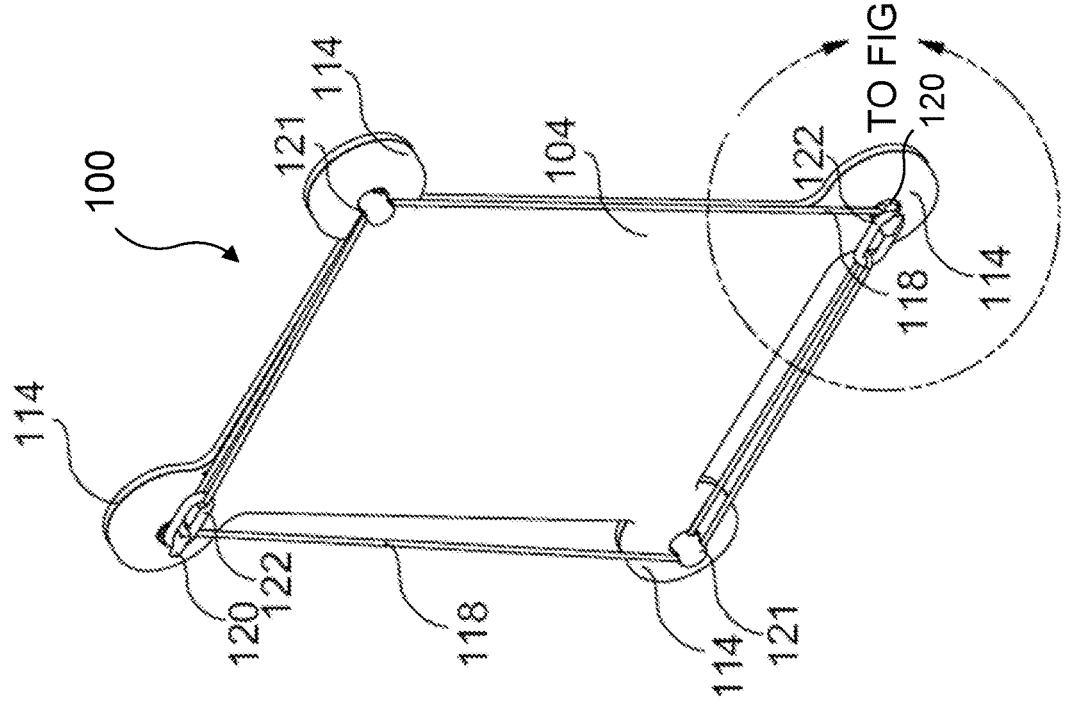
FIG. 1B illustrates a rear perspective view of a wearable device case in accordance with various embodiments of the present disclosure.

Referring now to FIGS. 1B and 1C, FIG. 1B illustrates a rear perspective view of the case 100 and FIG. 1C illustrates an enlarged view of the bottom right circular body portion 114 showing a means for securing the flexible member 118 to the rear body portion 104. There is shown the one or more flexible members 118 secured to the back of the rear body portion 104 of the case 100. The one or more flexible members 118 are held in place by one or more snaps 120 or slides 121 in a cavity of the circular body portions 114 of the rear body portion 104. The one or more snaps 120 or slides 121 have a bored center allowing for the one or more flexible members 118 to run through the center of the snap or slide. The one or more snaps 120 may apply pressure to the end of a flexible member 118 to hold it in place, the flexible member 118 may be tied off at one end to prevent the flexible member 118 from slipping through the bored center of the slide 121, or other methods of holding the flexible member in place may be used. In some embodiments, the one or more flexible members 118 may include two flexible members, secured by snaps 120 at two diagonally opposite circular body portions 114, with each of the flexible members 118 running through and out of the snaps 120 and extending to and wrapping around a link 122, the link 122 hooking into a groove or hook on another snap 120.

For example, FIG. 1B shows a flexible member 118 secured by a slide 121 at the top right circular body portion 114. The flexible member extends from the top right circular body portion to the top left circular body portion, wrapping around a link 122 at the top left circular body portion, the link hooked into a groove of the snap 120 also at the top left circular body portion. The flexible member 118 then, after wrapping around the link 122, extends back to the top right circular body portion, runs through the slide 121 at the top right circular body portion and down to and is secured by the snap at the bottom right circular body portion. Thus, tension is applied on the flexible member 118 by being tightly secured to one snap at the top left circular body portion via the link, and to the snap at the right bottom circular body portion, running therebetween, with the flexible member running around the top right circular body portion (through the slide at the top right circular body portion). Another flexible member 118 is secured by a slide 121 at the bottom left circular body portion 114. The flexible member extends from the bottom left circular body portion to the bottom right circular body portion, wrapping around a link 122 at the bottom right circular body portion, the link hooked into a groove of the snap 120 also at the bottom right circular body portion. The flexible member 118 then, after wrapping around the link 122, extends back to the bottom left circular body portion, runs through the slide 121 at the bottom left circular body portion and up to and is secured by the snap at the top left circular body portion. Thus, tension is applied on the flexible member 118 by being tightly secured to one snap at the bottom right circular body portion via the link, and to the snap at the top left circular body portion, running therebetween, with the flexible member running around the bottom left circular body portion (through the slide 121 at the bottom left circular body portion). The flexible member may be any cord, strap, or other article, such as a bungee cord, that can be wrapped around and secured in place as disclosed herein. FIG. 1C shows an enlarged view of the bottom right circular body portion 114 having a flexible member 118 secured by a snap 120 and extending upward, and another flexible member 118 wrapped around a link 122 hooked into a groove of the snap 120, the flexible member 118 extending to the left of the bottom right circular body portion 114.

Figures 1D, 1E:
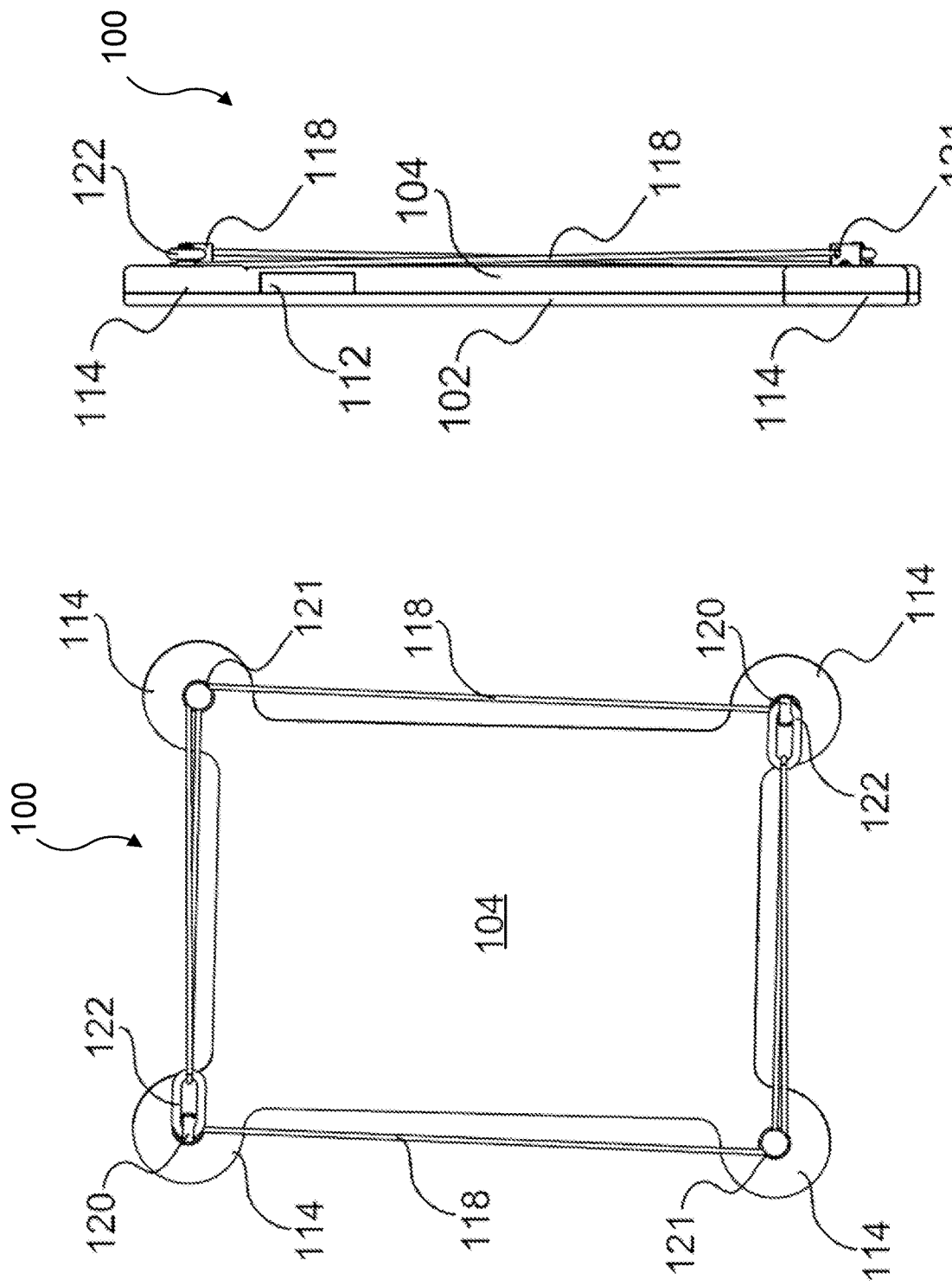
FIG. 1D illustrates a rear view of a wearable device case in accordance with various embodiments of the present disclosure.
FIG. 1E illustrates a right side view of a wearable device case in accordance with various embodiments of the present disclosure.

Referring now to FIG. 1D, there is illustrated a rear view of the case 100. There is shown the rear body portion 104 having the circular body portions 114. There is additionally shown the flexible members 118 wrapping around and between the rear body portion 104 and the circular body portions 114, secured by the snaps 120, slides 121, and the links 122.

Referring now to FIG. 1E, there is illustrated a right side view of the case 100. There is again shown the front body portion 102, the rear body portion 104 having the cutout 112, the circular body portions 114 on each of the front and rear body portions 102 and 104, the flexible members 118, the snap 120, the slide 121, and the links 122. As can be seen from FIG. 1E, the case 100 allows for a relatively thin design to allow the mobile device to be installed without increasing the width or bulkiness of the mobile device too much to be uncomfortable to the user.

Figure 1F:
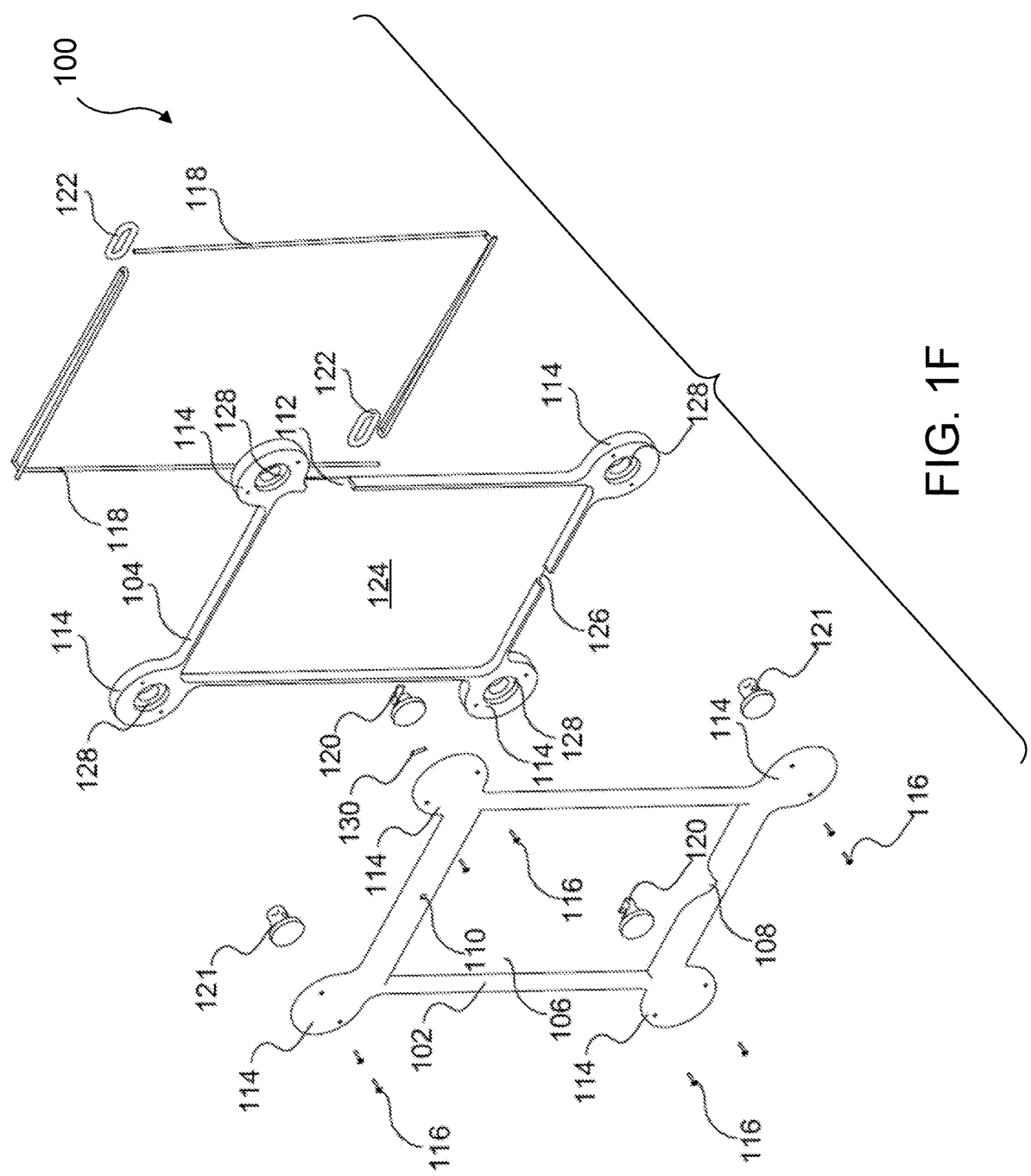
FIG. 1F illustrates an exploded front perspective view of a wearable device case in accordance with various embodiments of the present disclosure.

Referring now to FIG. 1F, there is illustrated an exploded view of the case 100. The rear body portion 104 has a recessed space 124 allowing for a mobile device to be placed within the recessed space 124. The recessed space 124 has bottom, top, and left and right side walls defining the space 124. The bottom wall has a cutout 126 that allows access to a charging port of a mobile device when a mobile device is placed within the recessed space. The circular body portions 114 on the rear body portion 104 additionally each have a cavity 128, for allowing the snaps 120 and slides 121 to be installed within. The snaps 120 may then cooperate with the flexible members 118 and the links 122 as described herein. The flexible members 118 may also be secured using other items besides links, such as a snap, a buckle, Velcro, a ball in socket, or other mechanisms. Note: the bungee could directly wrap around the snap without the use of a link. A lock button pin 130 may also be included to allow for a lock button on a mobile device to be pressed when the mobile device is within the case 100. The fixing members 116 secure the front body portion 102 to the rear body portion 104 by installing the fixing members 116 into apertures on the circular body portions 114 of the front body portion 102, and passing through to and inserting within front apertures on the circular body portions 114 on the rear body portion 104, enclosing a mobile device within the recessed space 124 and covering the cavities 128.

The rear and front body portions 102 and 104, as well as other components such as the lock button pin 130, may be built from various materials such as wood, plastic, or metal of various varieties and combinations, or other suitable materials. The fixing members 116 may be screws of various sizes and types (such as ½ inch wood screws), nails, or other suitable items. Note: The case front may snap to the back without the use of additional screws, etc. The flexible members 118 may be made of leather, nylon, materials used to make bungee cords, or other suitable materials may be used. The flexible members 118 may be of various widths and lengths as needed. The links 122 may also be made of various materials such as metal, plastic, or other suitable materials. In some embodiments, the case 100 may include a stand coupled to the body of the case 100 to allow a user to stand the case 100 on a surface during use. The stand may be a kickstand type of stand that is extendable from the rear of the case 100.

Figure 2A:
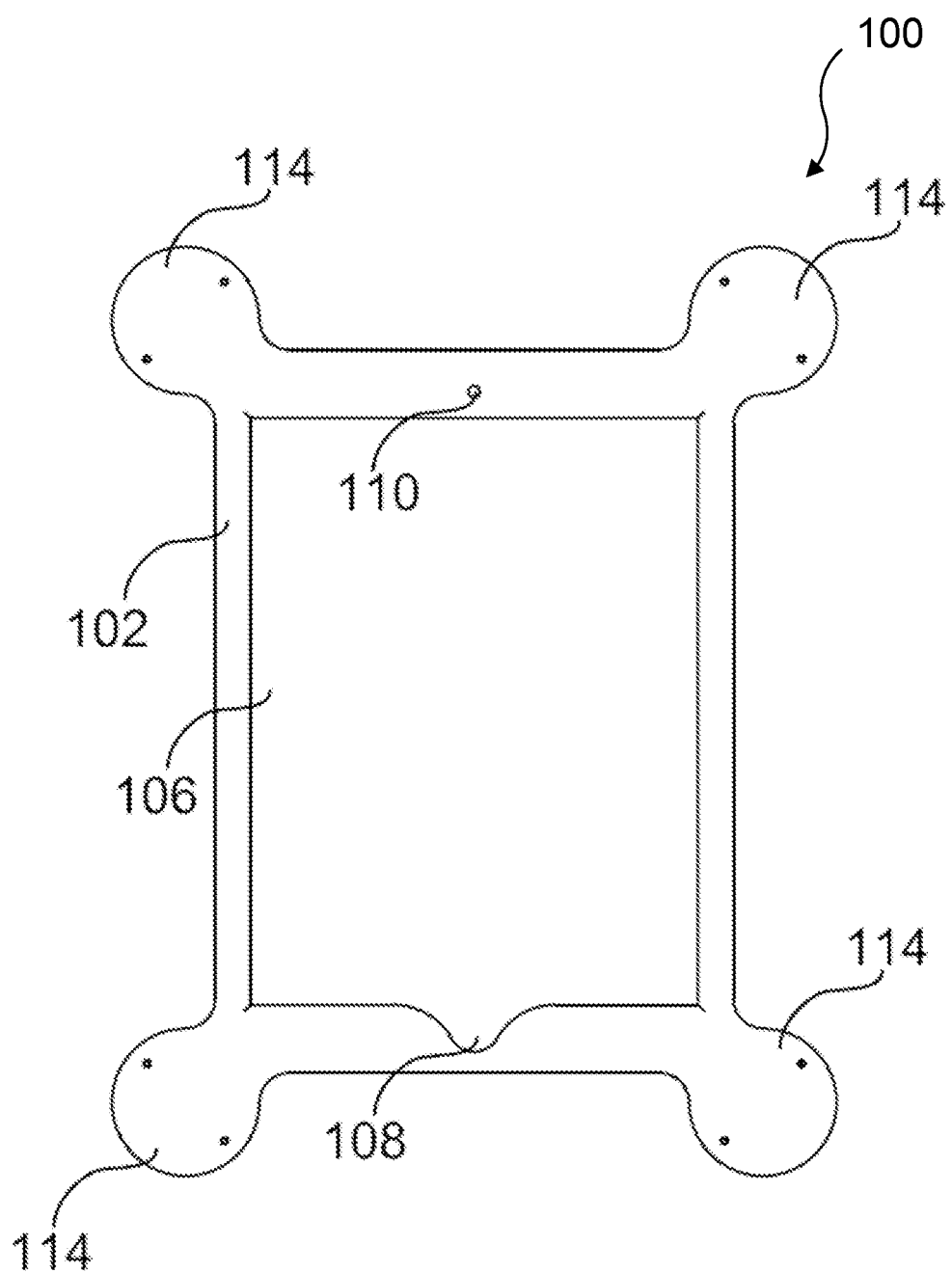
FIG. 2A illustrates a front view of a front body portion of a wearable device case in accordance with various embodiments of the present disclosure.
Figure 2C:
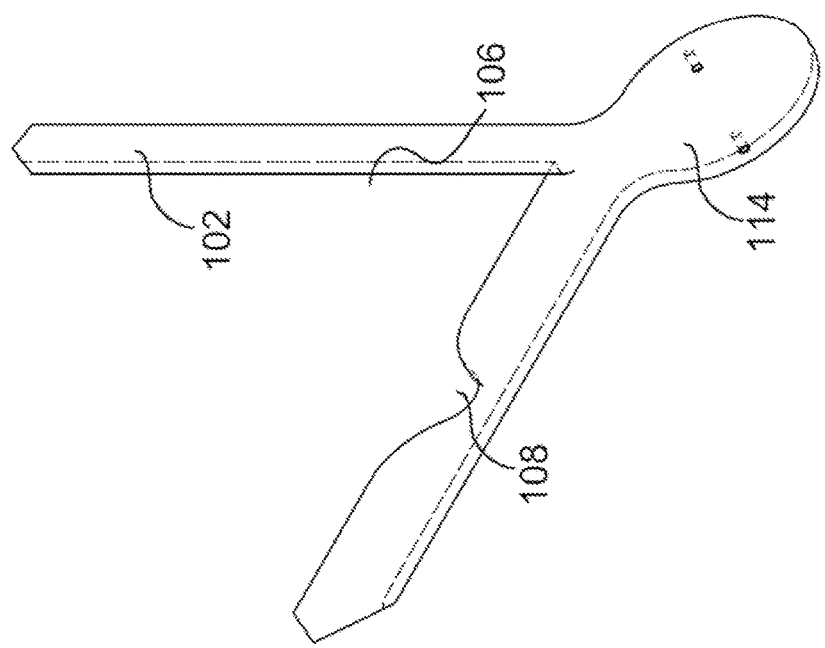
FIG. 2C illustrates an enlarged view of a bottom right circular body portion of a wearable device case in accordance with various embodiments of the present disclosure.
Figure 2B:
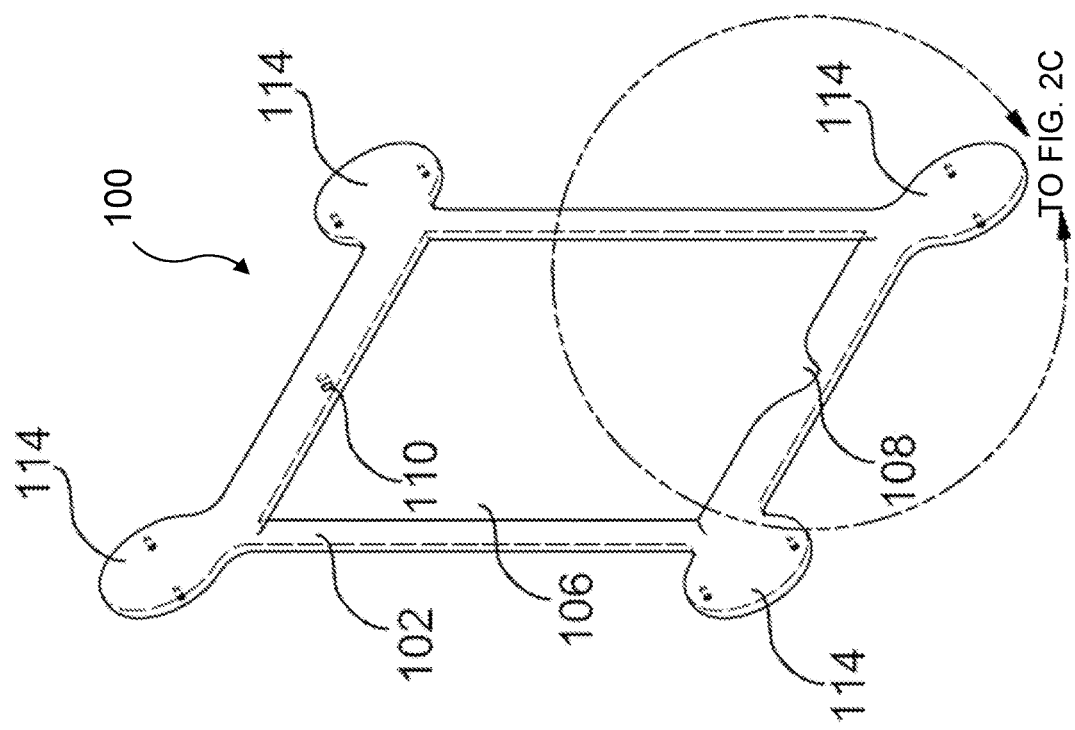
FIG. 2B illustrates a front perspective view of a front body portion of a wearable device case in accordance with various embodiments of the present disclosure.
Figure 2D:
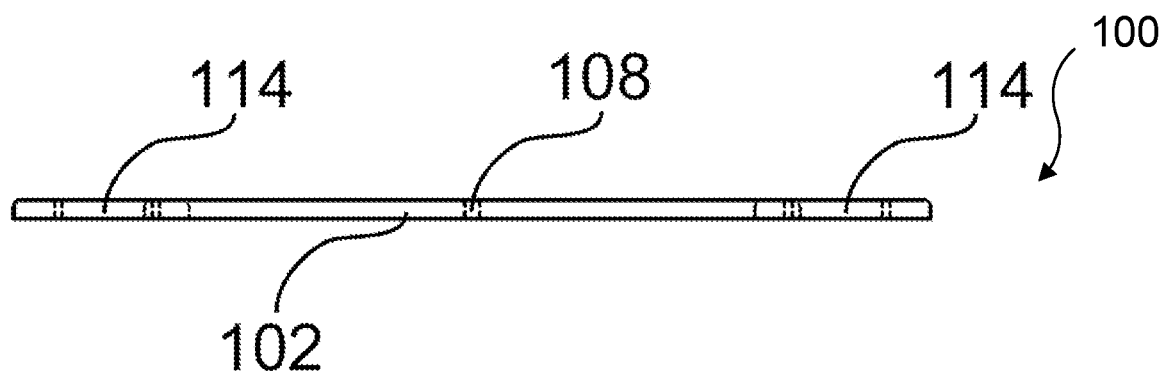
FIG. 2D illustrates a bottom view of a front body portion of a wearable device case in accordance with various embodiments of the present disclosure.
Figure 2E:
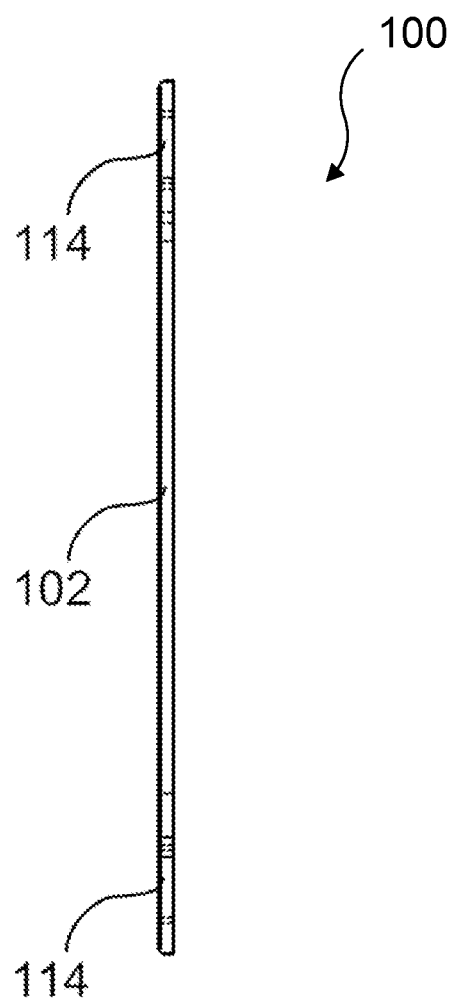
FIG. 2E illustrates a right side view of a front body portion of a wearable device case in accordance with various embodiments of the present disclosure.

Referring now to FIGS. 2A-2E, there are illustrated various views of the front body portion 102 of the case 100 when the front body portion 102 is separated and/or not attached to the rear body portion 104. FIG. 2A illustrates a front view of the front body portion 102, FIG. 2B illustrates a front perspective view of the front body portion 102, FIG. 2C illustrates an enlarged view of a bottom right circular body portion 114, FIG. 2D illustrates a bottom view of the front body portion 102, and FIG. 2E illustrates a right side view of the front body portion 102. The apertures on the circular body portions 114 of the front body portion 102 can be seen in each of the views of FIGS. 2A-2E, shown as bored holes through the circular body portions 114.

Figure 3D:
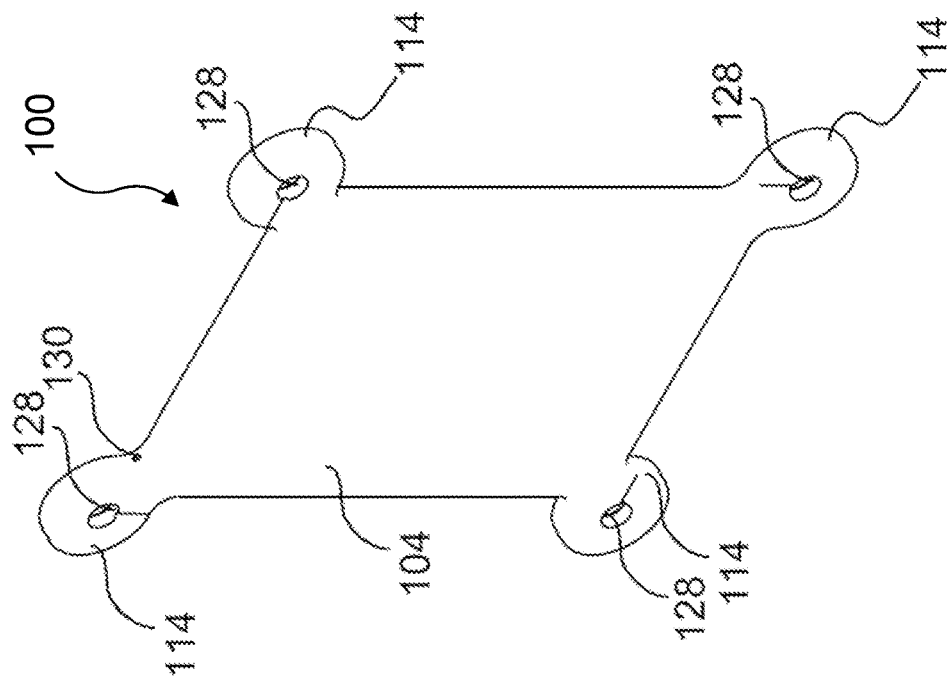
FIG. 3D illustrates a rear perspective view of a rear body portion of a wearable device case in accordance with various embodiments of the present disclosure.
Figure 3C:
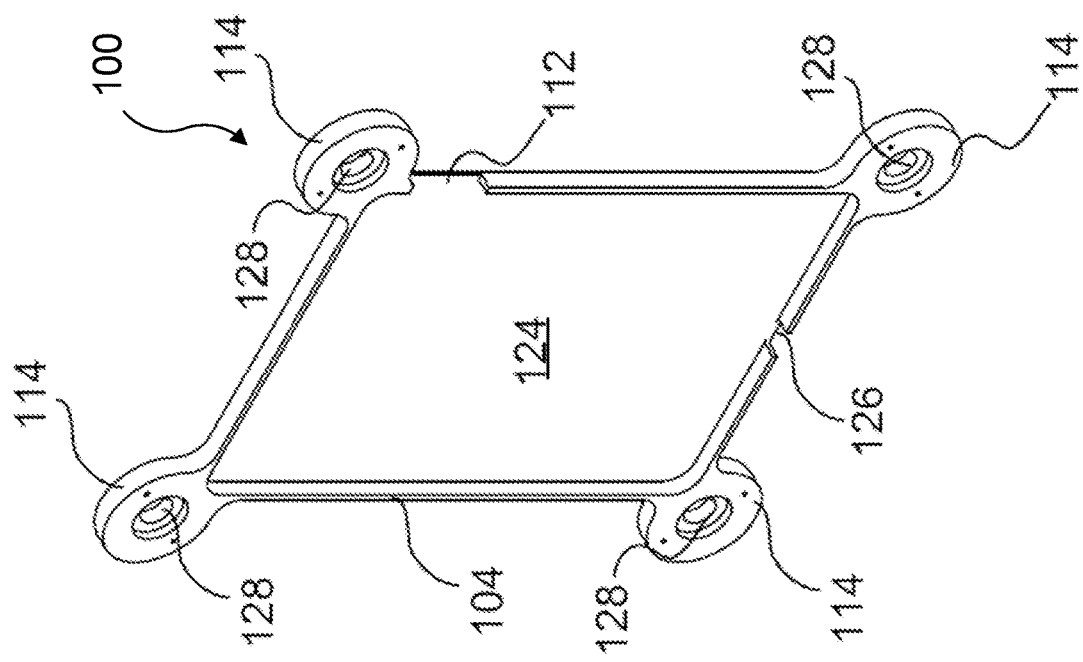
FIG. 3C illustrates a front perspective view of a rear body portion of a wearable device case in accordance with various embodiments of the present disclosure.
Figure 3E:
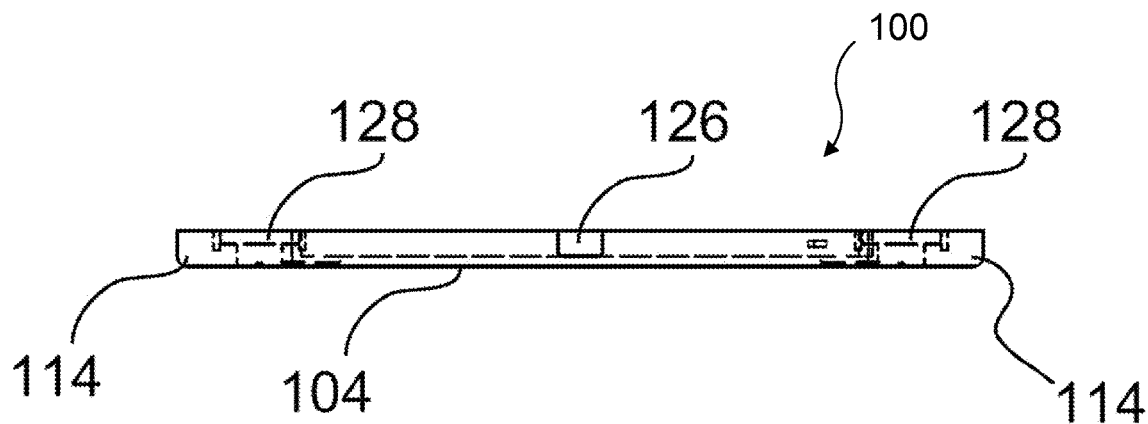
FIG. 3E illustrates a bottom view of a rear body portion of a wearable device case in accordance with various embodiments of the present disclosure.
Figure 3F:
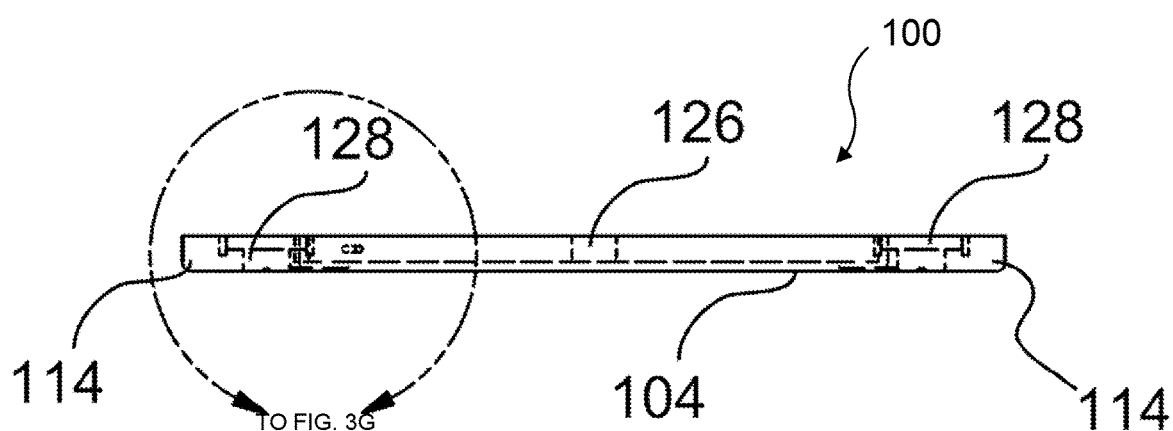
FIG. 3F illustrates a top view of a rear body portion of a wearable device case in accordance with various embodiments of the present disclosure.
Figure 3G:
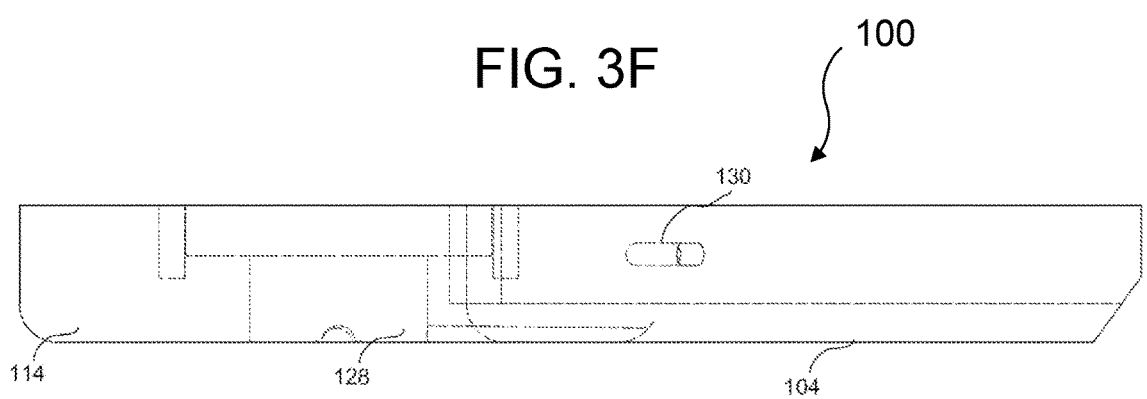
FIG. 3G illustrates an enlarged top view of a top right circular body portion of a rear body portion of a wearable device case in accordance with various embodiments of the present disclosure.

Referring now to FIGS. 3A-3G, there are illustrated various views of the rear body portion 104 of the case 100 when the rear body portion 104 is separated and/or not attached to the front body portion 102. FIG. 3A illustrates a front view of the rear body portion 104, FIG. 3B illustrates an enlarged front view of the bottom right circular body portion 114 of the rear body portion 104, FIG. 3C illustrates a front perspective view of the rear body portion 104, FIG. 3D illustrates a rear perspective view of the rear body portion 104, FIG. 3E illustrates a bottom view of the rear body portion 104, FIG. 3F illustrates a top view of the rear body portion 104, and FIG. 3G illustrates an enlarged top view of the top right circular body portion 114 of the rear body portion 104. There is shown in FIGS. 3A-3G the cavities 128 wherein the snaps 120 or slides 121 may be inserted to be used in securing the flexible members 118.

Figure 4B:
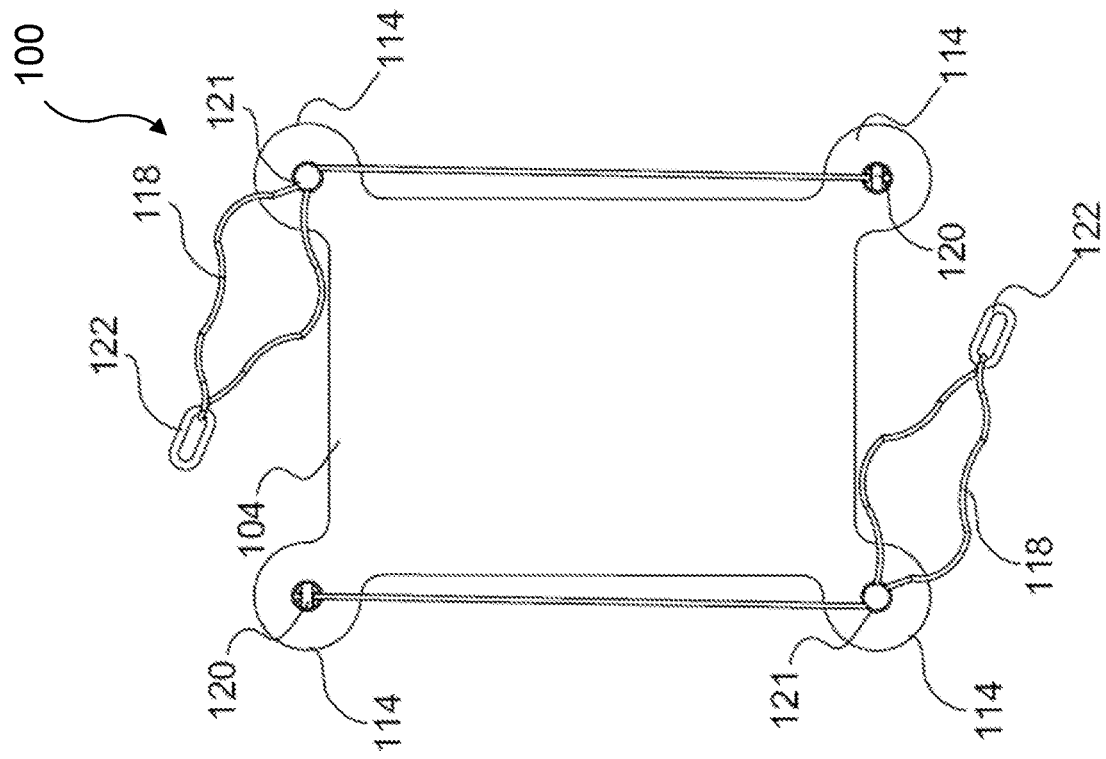
FIG. 4B illustrates a rear view of a wearable device case in a state where links have been detached from snaps in accordance with various embodiments of the present disclosure.
Figure 4A:
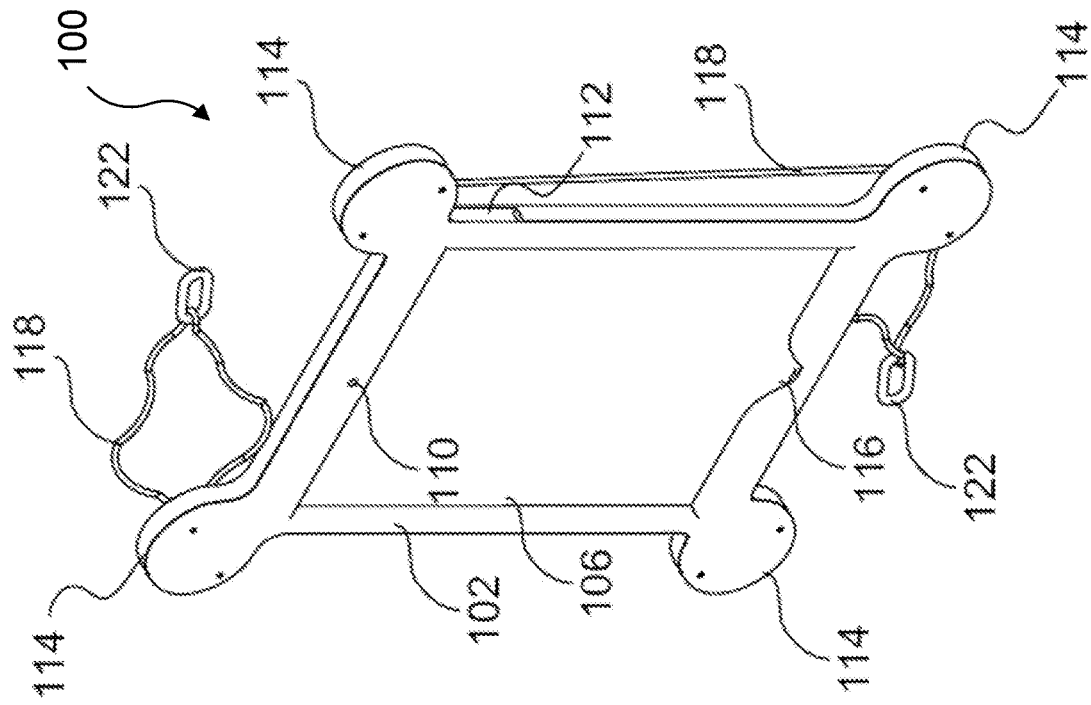
FIG. 4A illustrates a front perspective view of a wearable device case in a state where links have been detached from snaps in accordance with various embodiments of the present disclosure.
Figure 4D:
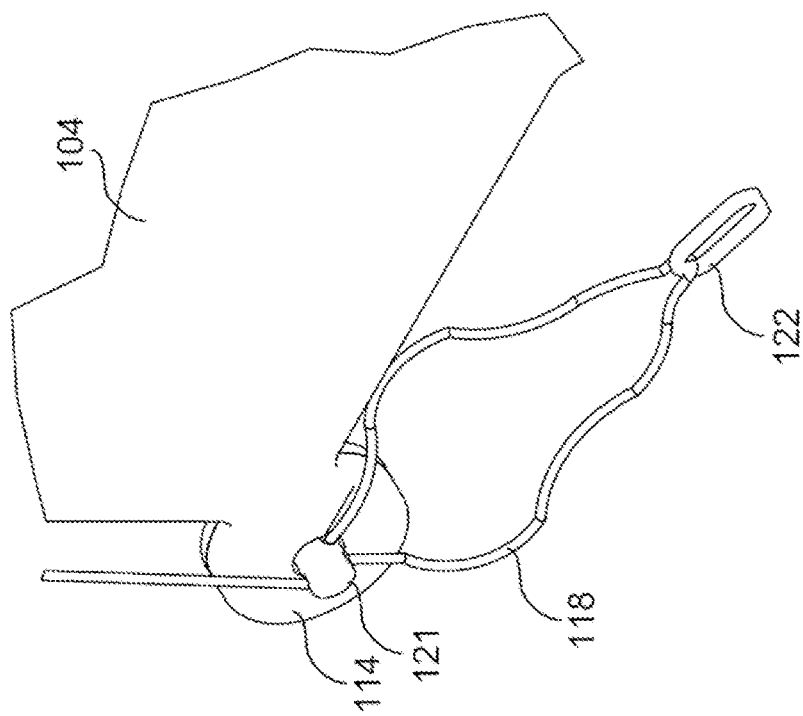
FIG. 4D illustrates an enlarged rear perspective view of a bottom left circular body portion of a wearable device case in a state where links have been detached from snaps in accordance with various embodiments of the present disclosure.
Figure 4C:
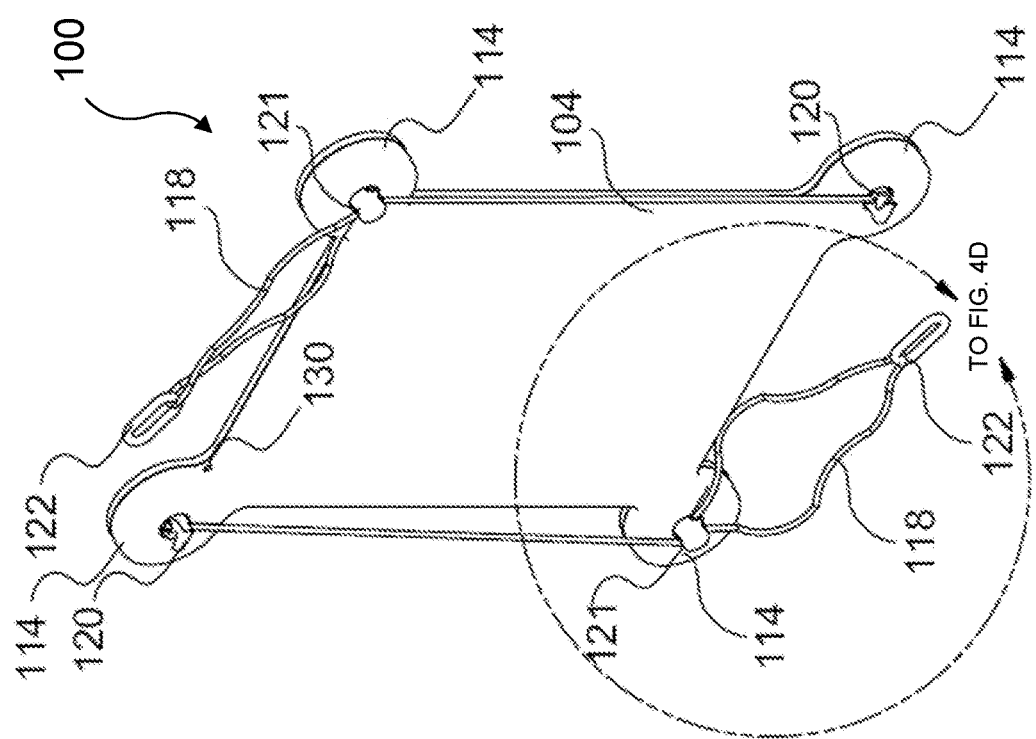
FIG. 4C illustrates a rear perspective view of a wearable device case in a state where links have been detached from snaps in accordance with various embodiments of the present disclosure.
Figure 4E:
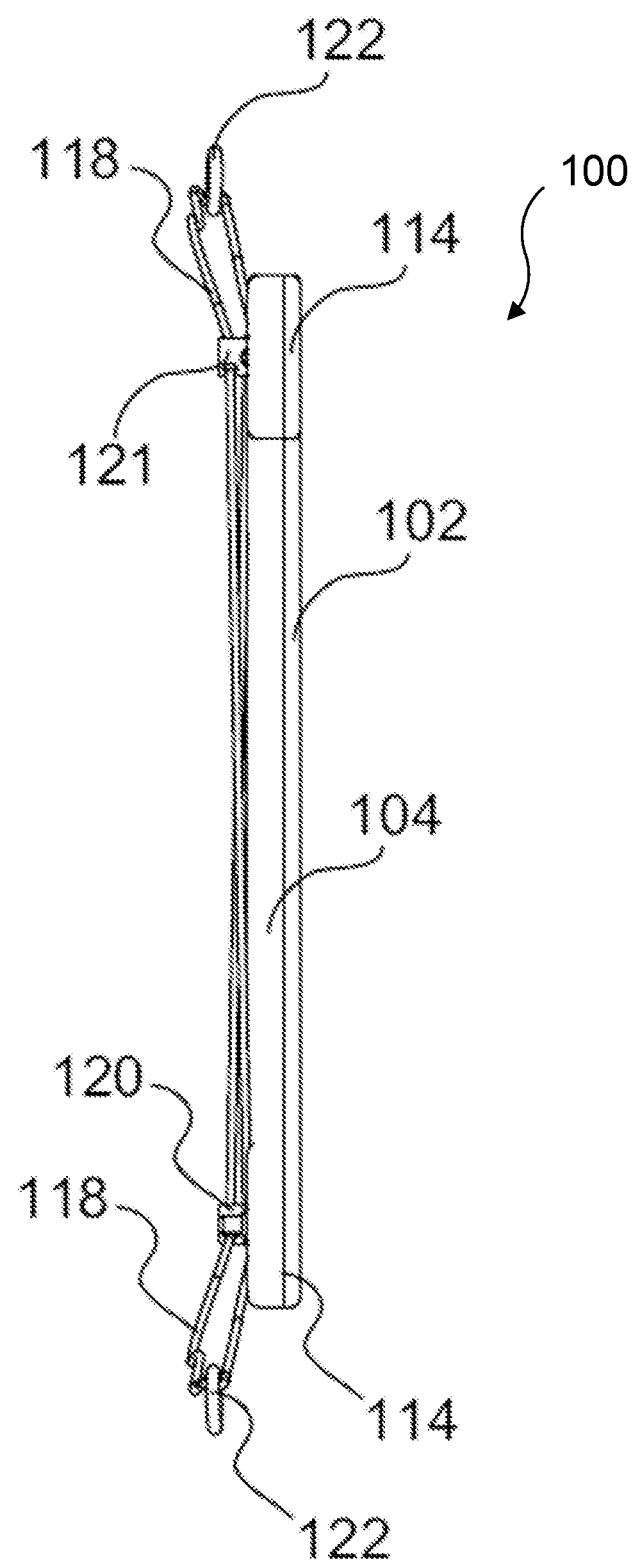
FIG. 4E illustrates a left side view of a wearable device case in a state where links have been detached from snaps in accordance with various embodiments of the present disclosure.

Referring now to FIGS. 4A-4E, there are illustrated various views of the case 100 showing the links 122 detached from the snaps 120. The case and its various embodiments disclosed herein can be converted to a wearable such as a backpack or handbag, enabling a user of a mobile device that is within the case to cease use of the mobile device, convert the case to its wearable configuration, and wear the case on via the specific means for the specific embodiment so that the mobile device can be easily taken with the user, while freeing the users hands to perform other tasks, or to simply avoid needing to carry the mobile device by hand. FIG. 4A illustrates a front perspective view of the case 100 in a state where the links 122 have been detached from the snaps 120, FIG. 4B illustrates a rear view of the case 100 in a state where the links 122 have been detached from the snaps 120, FIG. 4C illustrates a rear perspective view of the case 100 in a state where the links 122 have been detached from the snaps 120, FIG. 4D illustrates an enlarged rear perspective view of a bottom left circular body portion 114 of FIG. 4C showing a links 122 detached from a snap 120, and FIG. 4E illustrates a left side view of the case 100 in a state where the links 122 have been detached from the snaps 120. As shown in FIGS. 4A-4E, removing the links 122 from the snaps 120 causes each flexible member 118 to lose tension between its two secured points at the two circular body portions 114 where it is attached. In this way, each flexible member 118 can be pulled through the channel in the slides 121 each flexible member 118 runs through.

Figure 5A:
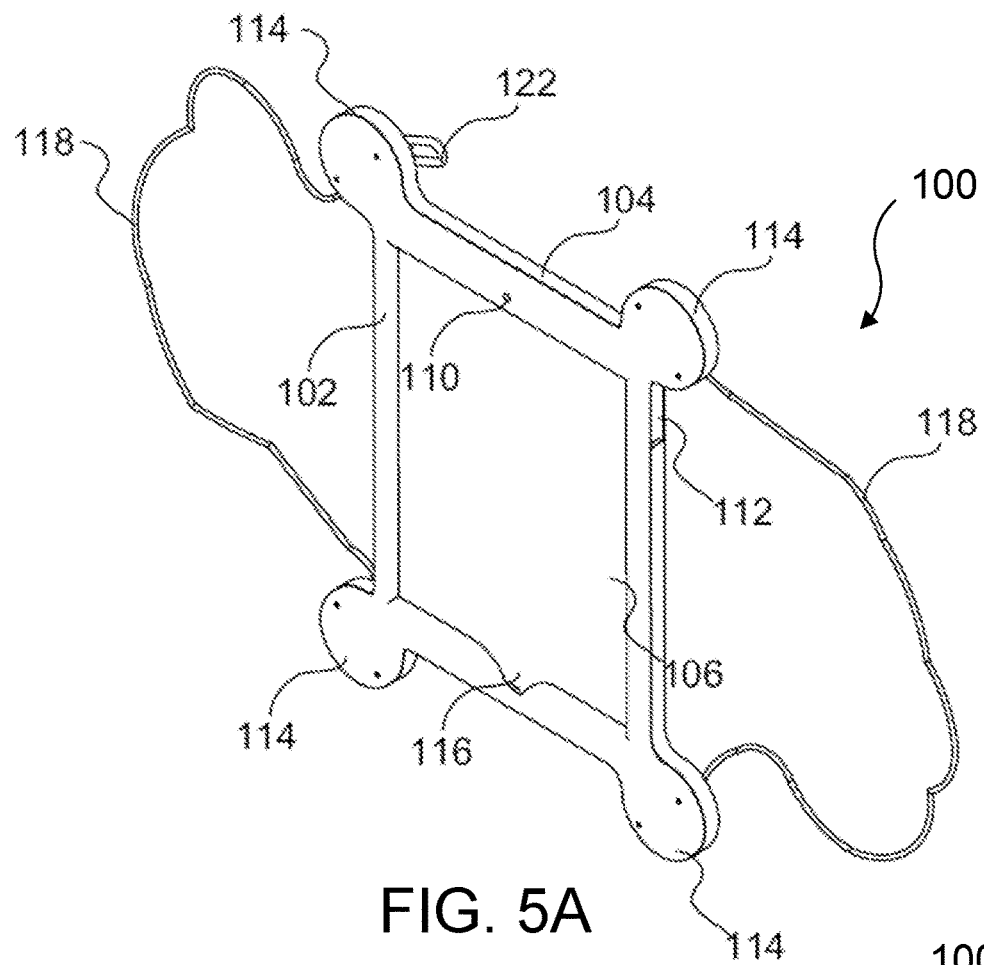
FIG. 5A illustrates a front perspective view of a wearable device case in a wearable configuration in accordance with various embodiments of the present disclosure.
Figure 5B:
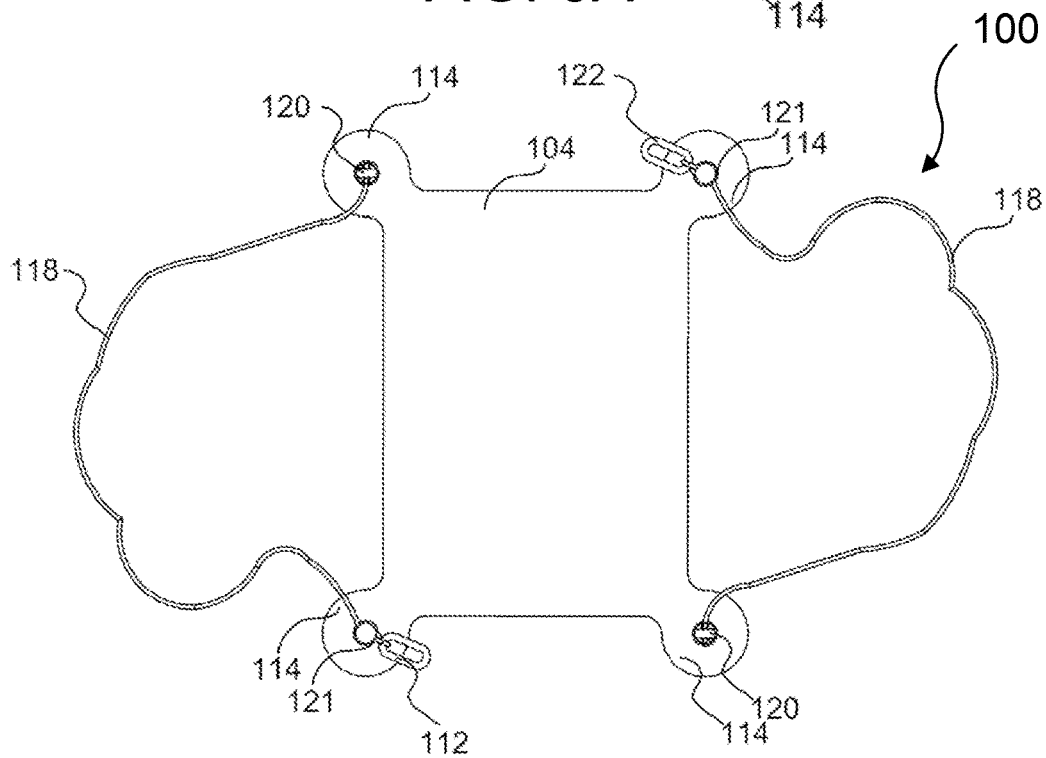
FIG. 5B illustrates a rear view of a wearable device case in a wearable configuration in accordance with various embodiments of the present disclosure.
Figure 5C:
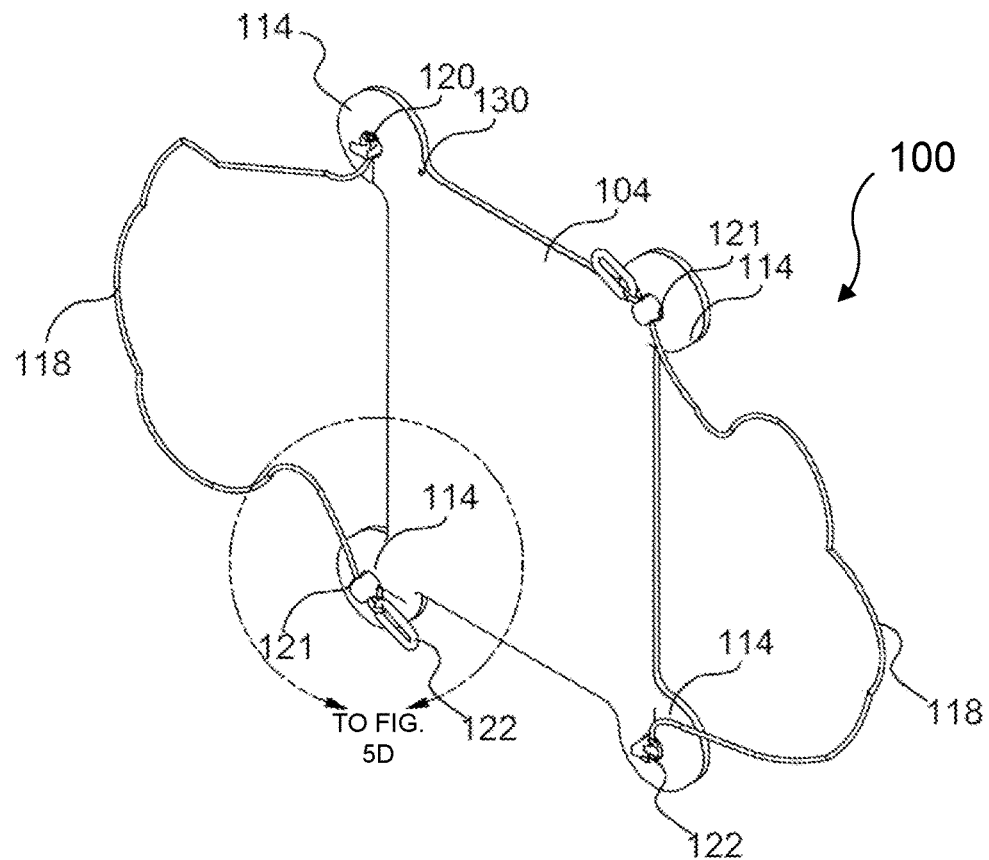
FIG. 5C illustrates a rear perspective view of a wearable device case in a wearable configuration in accordance with various embodiments of the present disclosure.
Figure 5D:
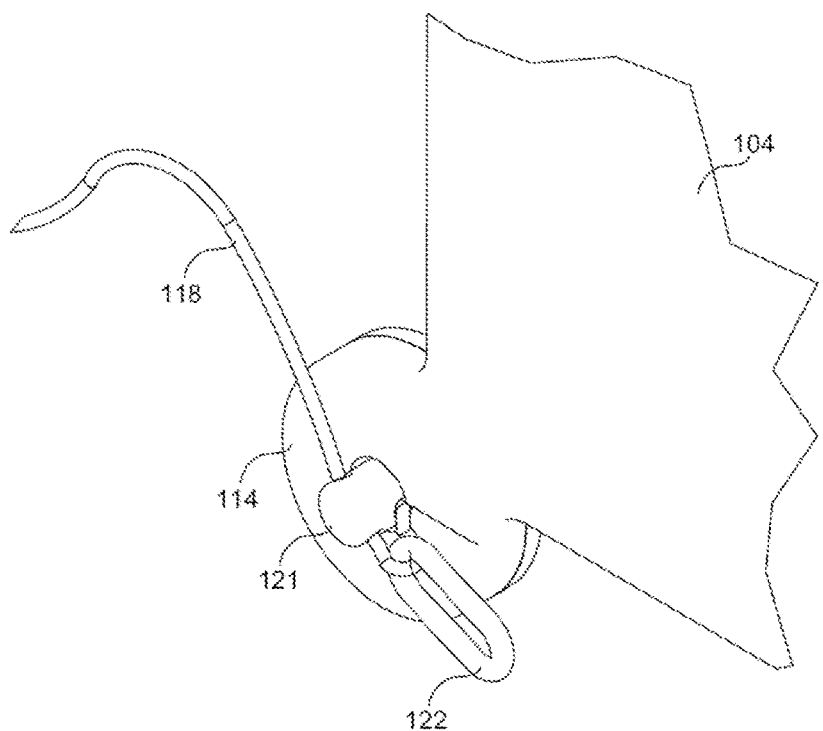
FIG. 5D illustrates an enlarged view of a bottom left circular body portion of a wearable device case in a wearable configuration in accordance with various embodiments of the present disclosure.
Figure 5E:
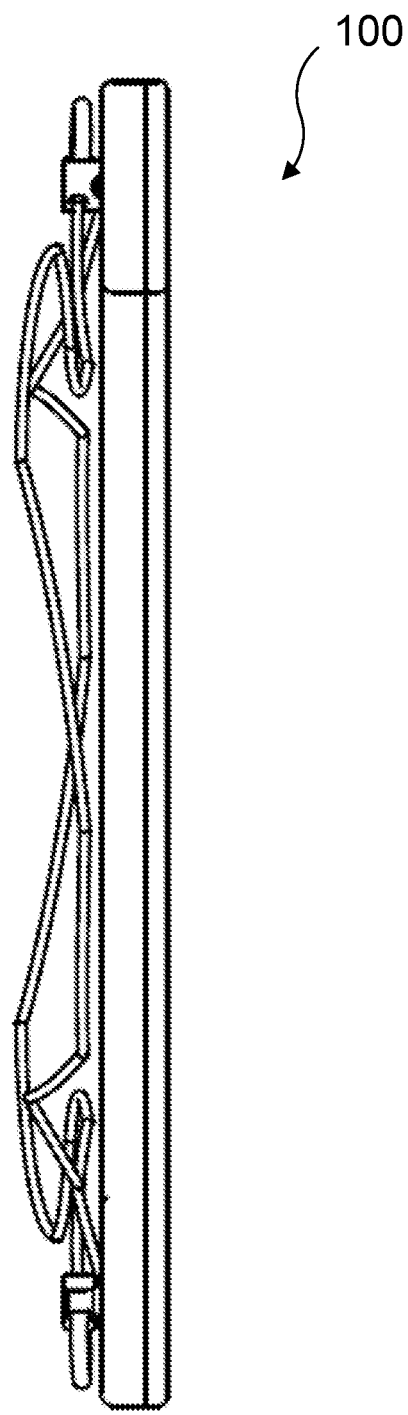
FIG. 5E illustrates a left side view of a wearable device case in a wearable configuration in accordance with various embodiments of the present disclosure.

Referring now to FIG. 5A-5E, there is illustrated various views of the case 100 in a configuration where the flexible members 118 have been fully pulled through the slides 121 and fully extended. FIG. 5A illustrates a front perspective view of the case 100 in this configuration. FIG. 5B illustrates a rear view of the case 100 in this configuration. FIG. 5C illustrates a rear perspective view of the case 100 in this configuration. FIG. 5D illustrates an enlarged view of the bottom left circular body portion 114 of FIG. 5C, and FIG. 5E illustrates a left view of the case 100 in this configuration. As shown in FIGS. 5A-5E, the flexible members 118 can be pulled through the slides 121 until the links 122 come into contact with the slides 121, preventing any further extension of the flexible members 118. When fully extended, the flexible members 118 hang loosely from the case 100, allowing for a user to wear the case, such as putting the case on the user back by inserting each of the users arm between one of the flexible members and the case. FIGS. 6A-6C illustrate how a user might wear the case on the user's back. As shown in FIGS. 6A-6C, a user may insert each arm through the expanded flexible members such that the case rests on the back of the user. It will be understood that the case need not necessarily be worn in this way. For instance, a user could only extend one of the flexible members 118, rather than all of them, to create one extended flexible member 118 to act as a strap of a handbag and wear the case on one shoulder.

Figure 7A:
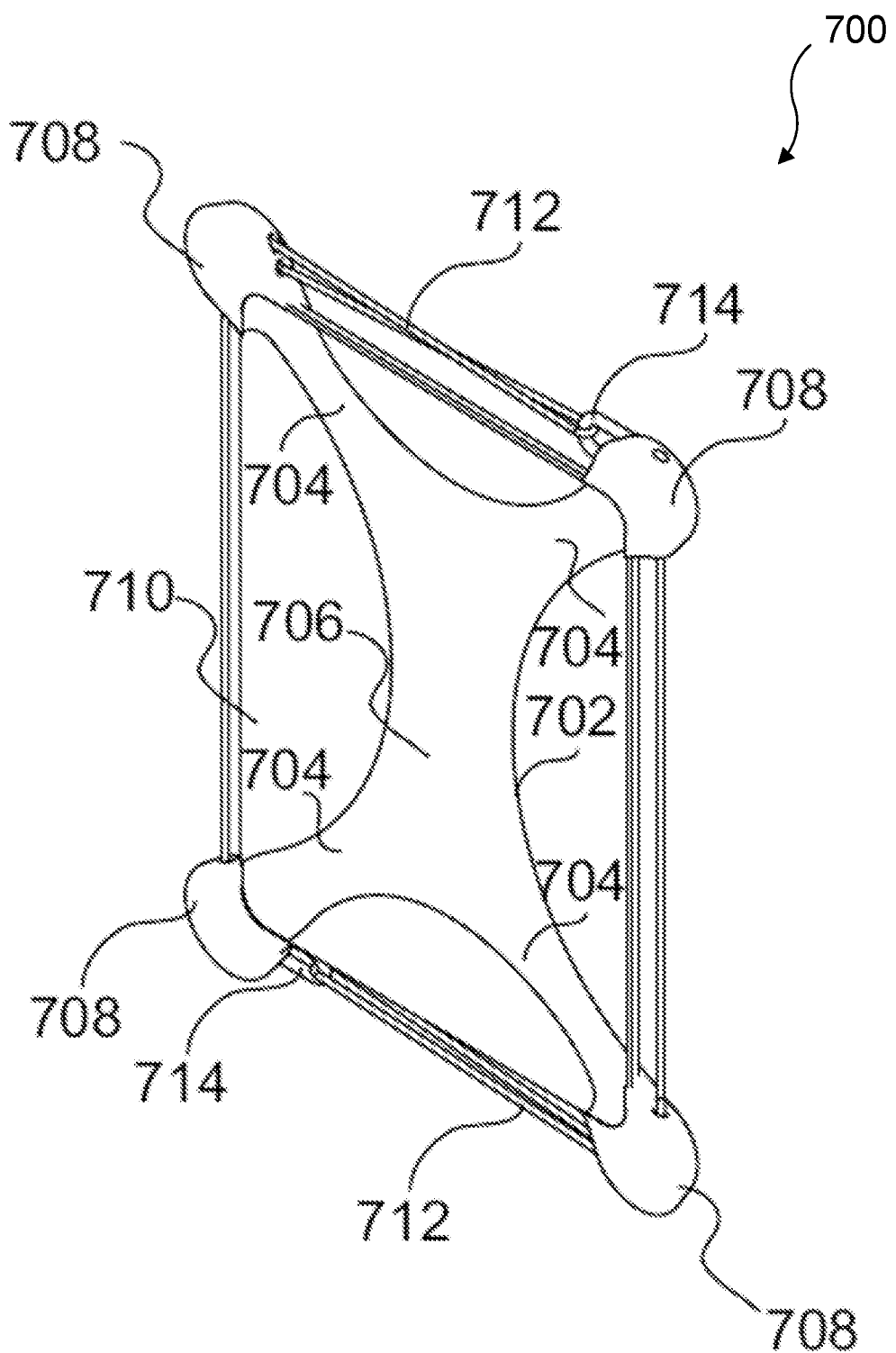
FIG. 7A illustrates a front perspective view of a wearable device case with the presence of a mobile device in accordance with various embodiments of the present disclosure.

Referring now to FIG. 7A, there is illustrated another embodiment of a mobile device case 700 with the presence of a mobile device. The case 700 includes a body 702. In some embodiments such as that illustrated in FIG. 7A, the body 702 may be in an 'X' shape, but other embodiments may allow for other case shapes or dimensions. The body 702 has four arms 704 extending diagonally each in a different direction from a center body portion 706, creating an arcuate edge along the body 702 between each arm 704, the arms 704 also ending in circular body portions 708. The arms 704 extend equally from the center body portion 706, creating a rectangular area, with each point of the rectangular area situated at the base of a circular body portion 708. A mobile device 710 such as a tablet computer may reside in this rectangular area, and thus the length and orientation of the arms 704 may be altered to account for mobile devices of differing shapes and dimensions. The circular body portions 708 are wider than the arms 704 and extend out over the rectangular area. The circular body portions have notched areas that allow for corners of the mobile device 710 to be inserted within the notched areas, holding the mobile device 710 in place.

The circular body portions 708 also have one or more flexible members 712 running therethrough, for use in converting the case 700 into a wearable item. For example, in the embodiment illustrated in FIG. 7A, a flexible member 712 is secured within a top left circular body portion 708 and runs out of the circular body portion 708 via an aperture, extending towards a top right circular body portion 708 and wrapping around a link 714, the link being secured to the top right circular body portion 708. The flexible member 712, after looping around the link 714 at the top right circular body portion 708, runs back toward the left top circular body portion 708 through another aperture and exiting the top circular body portion 708 via an aperture, running down to a bottom left circular body portion 708. The flexible member 712 enters the bottom left circular body portion 708 via yet another aperture and is secured within the bottom left circular body portion 708. A second flexible member 712 is secured similarly to the case 700, running from within the top right circular body portion 708, through a bottom right circular body portion 708, and looping around a link 714 secured to the back of the bottom left circular body portion 708. The bungee then runs back to the bottom right circular body portion 708 where it is secured.

Figure 7C:
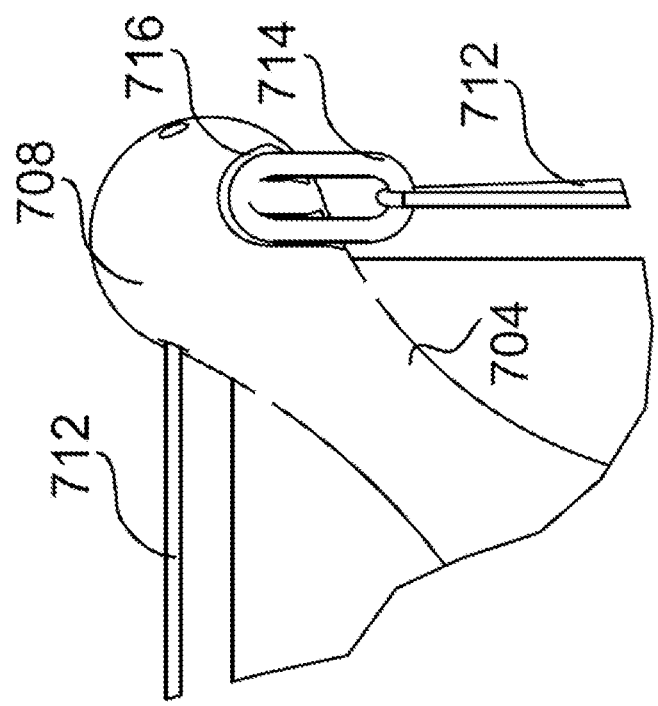
FIG. 7C illustrates an enlarged rear view of a circular body portion with a link a wearable device case with the presence of a mobile device in accordance with various embodiments of the present disclosure.
Figure 7B:
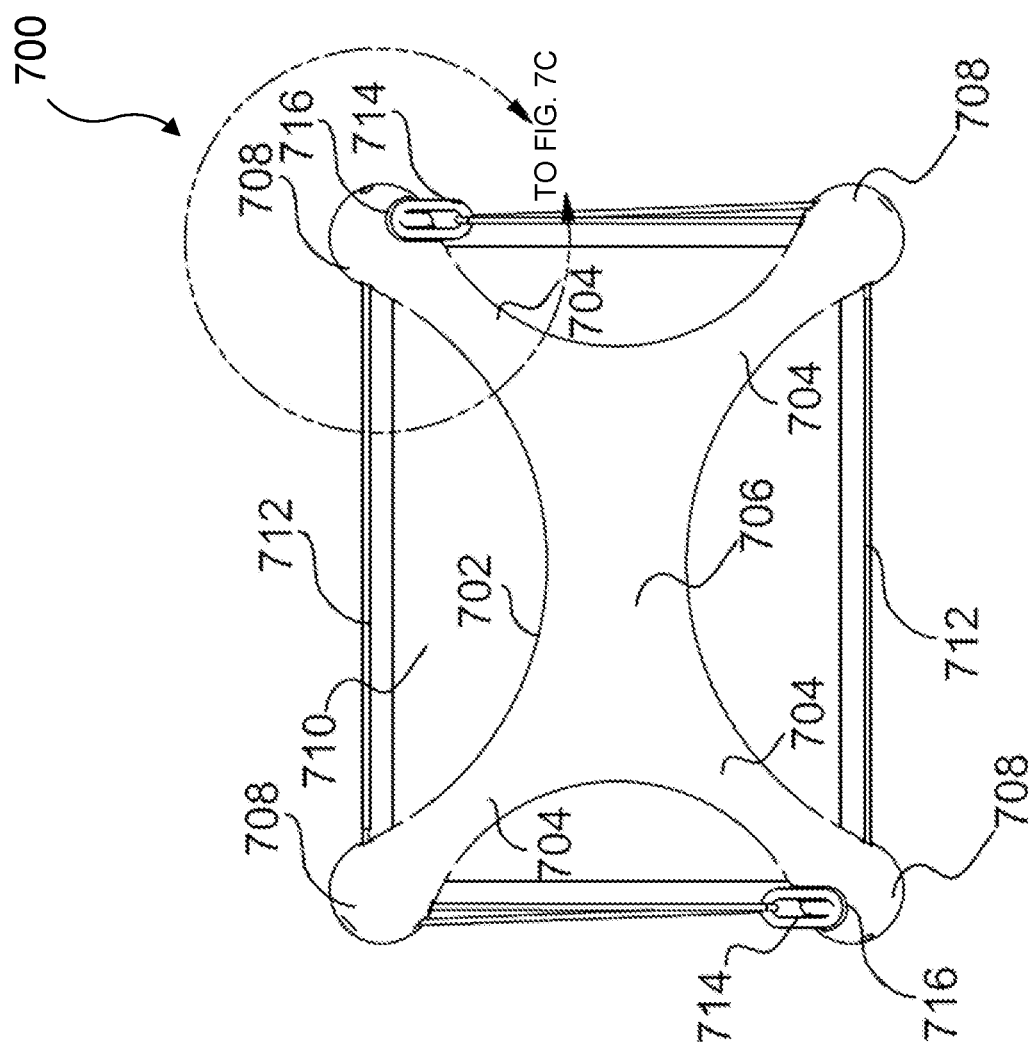
FIG. 7B illustrates a rear view of a wearable device case with the presence of a mobile device in accordance with various embodiments of the present disclosure.
Figure 7G:
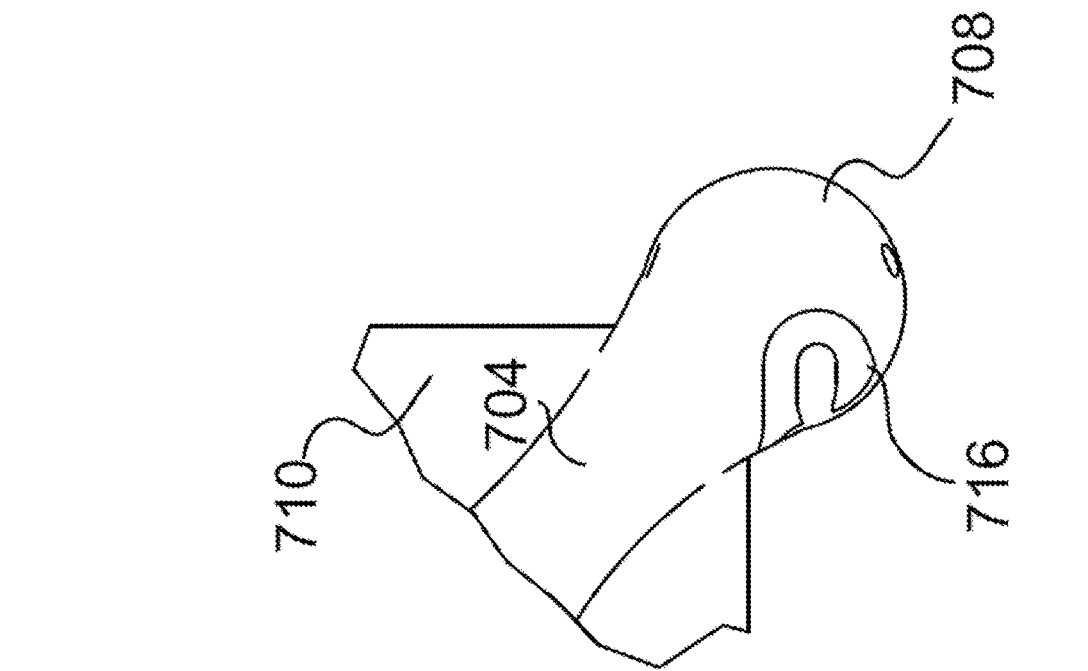
FIG. 7G illustrates an enlarged rear view of one of circular body portions of a wearable device case without flexible members installed in accordance with various embodiments of the present disclosure.
Figure 7F:
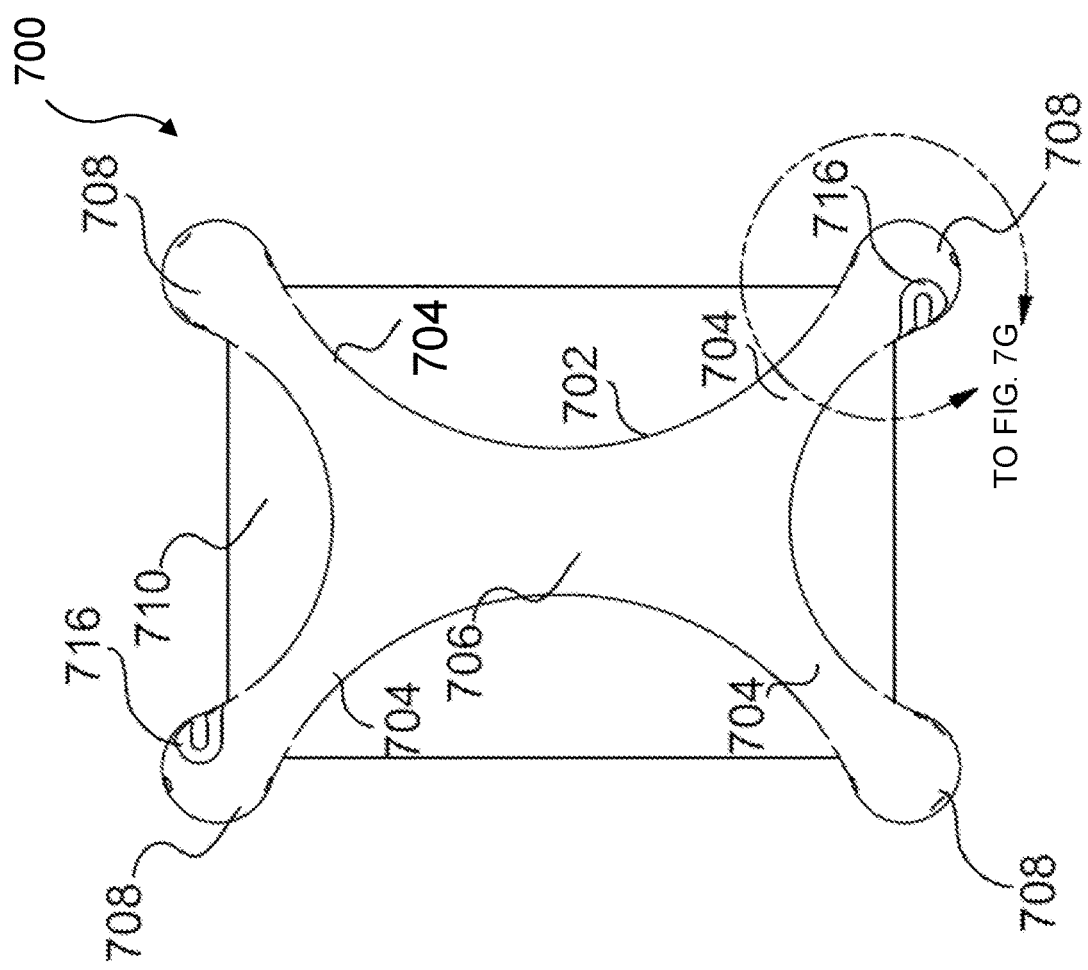
FIG. 7F illustrates a rear view of a wearable device case without flexible members installed and with the presence of a mobile device in accordance with various embodiments of the present disclosure.

Referring now to FIGS. 7B-7G, there are illustrated various views of the case 700. FIG. 7B illustrates a rear view of the case 700, FIG. 7C illustrates an enlarged rear view of one of the circular body portions 708 and a link 714 of the case 700, FIG. 7D illustrates a top view of the case 700, FIG. 7E illustrates an enlarged top view of one of the circular body portions 708 and a link 714 of the case 700, FIG. 7F illustrates a rear view showing the case 700 without the flexible members 712 or links 714 installed, and FIG. 7G illustrates an enlarged rear view of one of the circular body portions 708 without the flexible members 712 installed. FIGS. 7B-7G further show a groove 716 cut out of the circular body portions 708, creating a hook-like surface for the links 714 to couple to when the links 714 are placed within the grooves 716, in order to hold the links 714 in place and create tension on the flexible members 712. It will be understood that the flexible members 712 of the case 700 may be detached and extended from the case and the case 700 worn in a similar manner as that of the case 100 described herein.

Figure 7H:
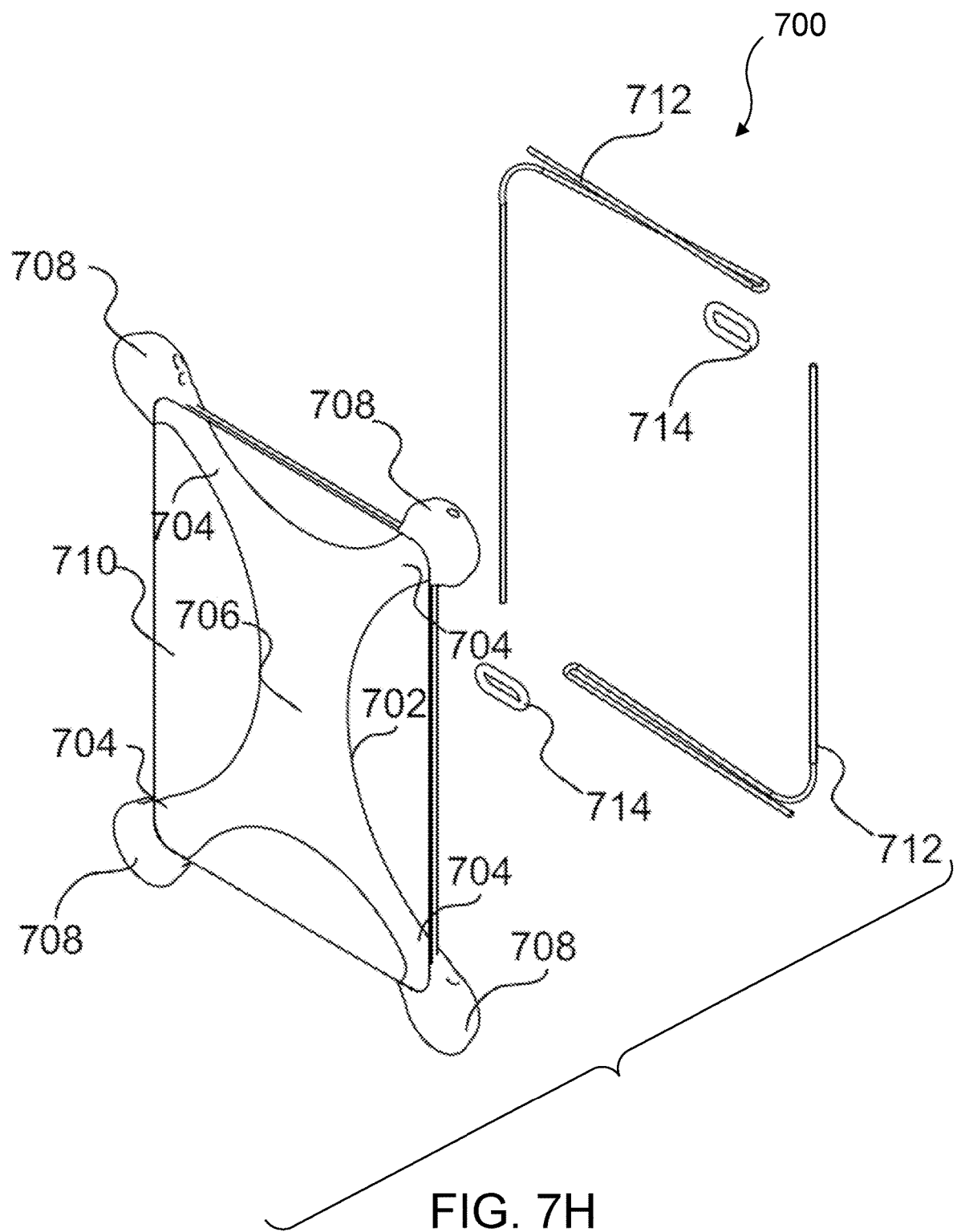
FIG. 7H illustrates an exploded front perspective view of a wearable device case with the presence of a mobile device in accordance with various embodiments of the present disclosure.
Figure 7I:
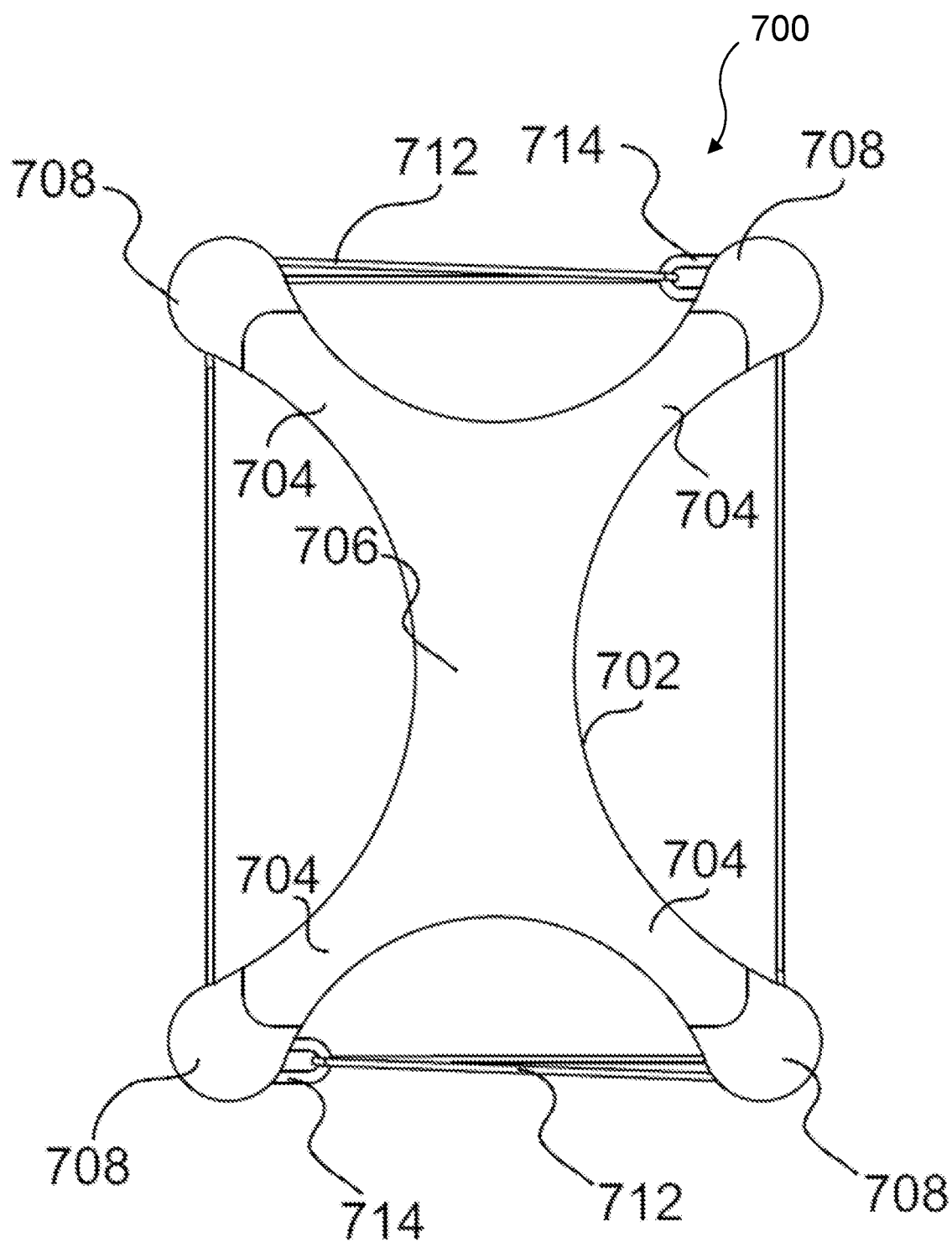
FIG. 7I illustrates a front view of a wearable device case without the presence of a mobile device in accordance with various embodiments of the present disclosure.
Figure 7K:
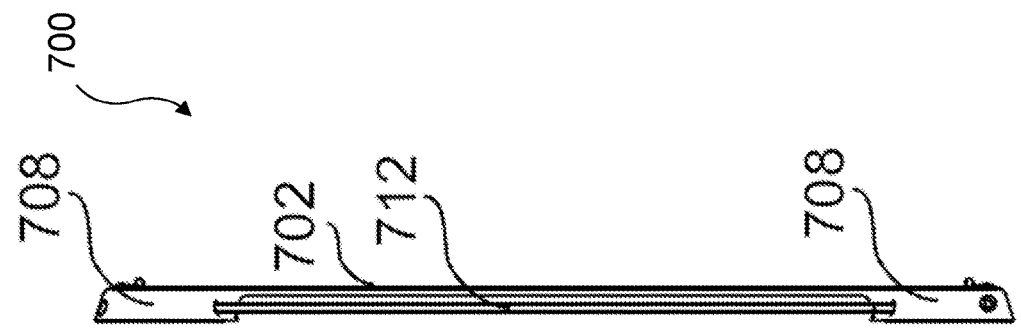
FIG. 7K illustrates a right side view of a wearable device case without the presence of a mobile device in accordance with various embodiments of the present disclosure.
Figure 7J:
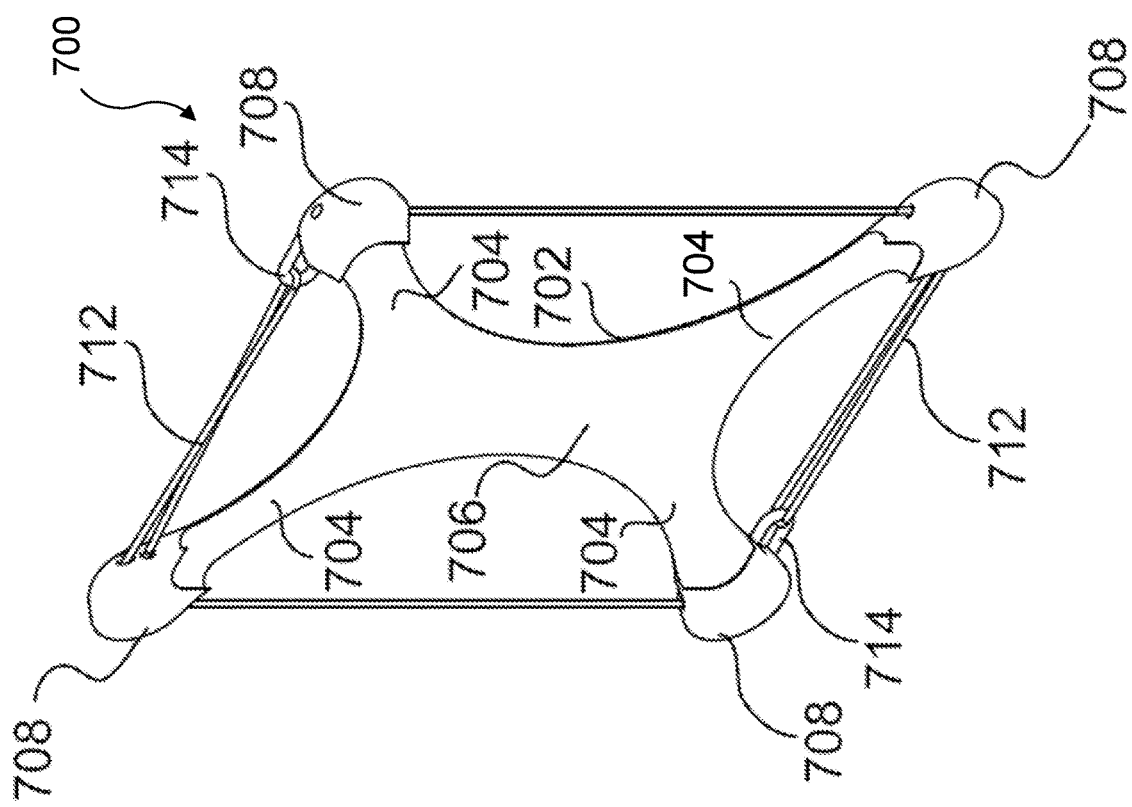
FIG. 7J illustrates a front perspective view of a wearable device case without the presence of a mobile device in accordance with various embodiments of the present disclosure.
Figure 7L:
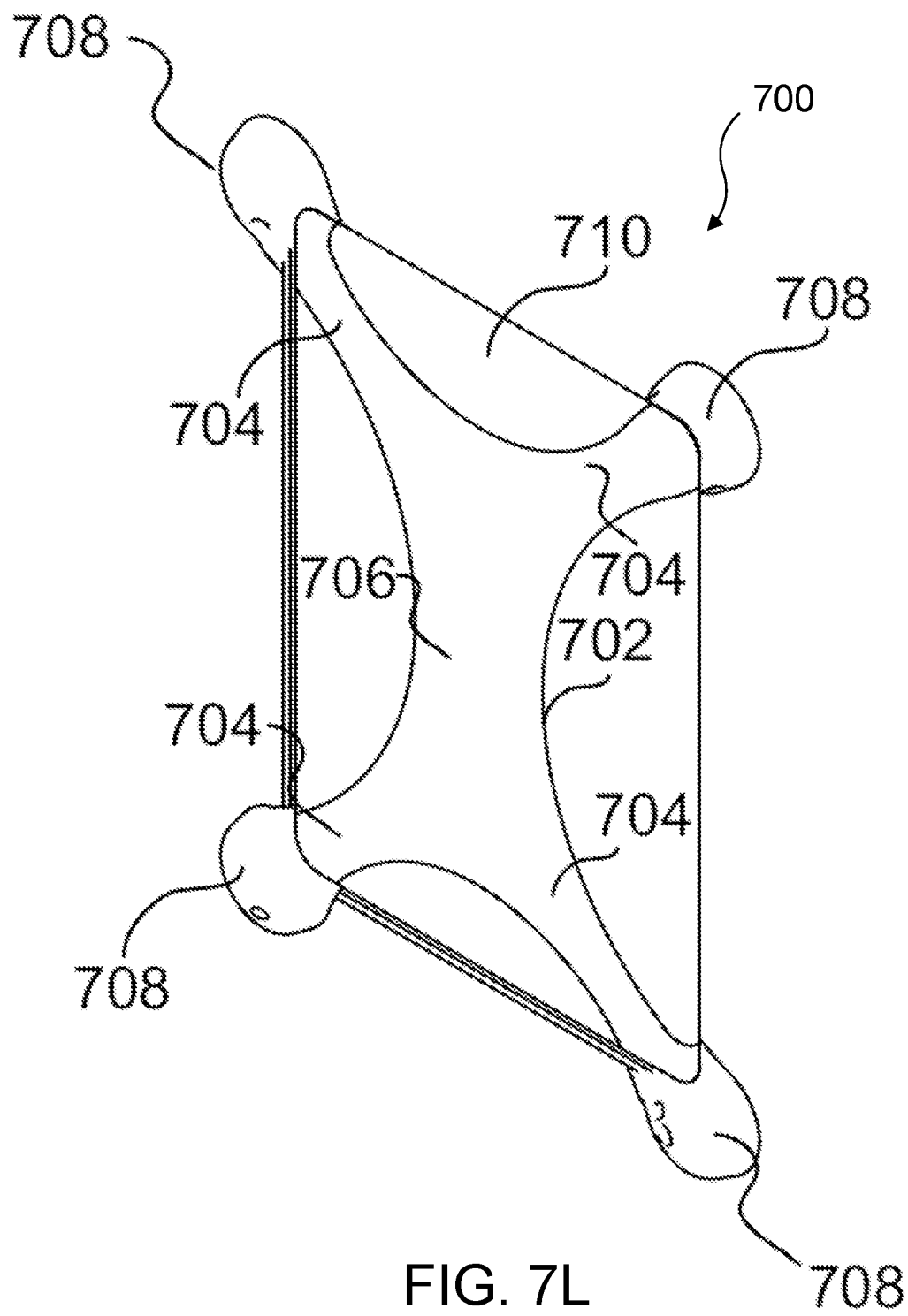
FIG. 7L illustrates a front perspective view of a portion of a wearable device case with a mobile device present in accordance with various embodiments of the present disclosure.
Figure 7N:
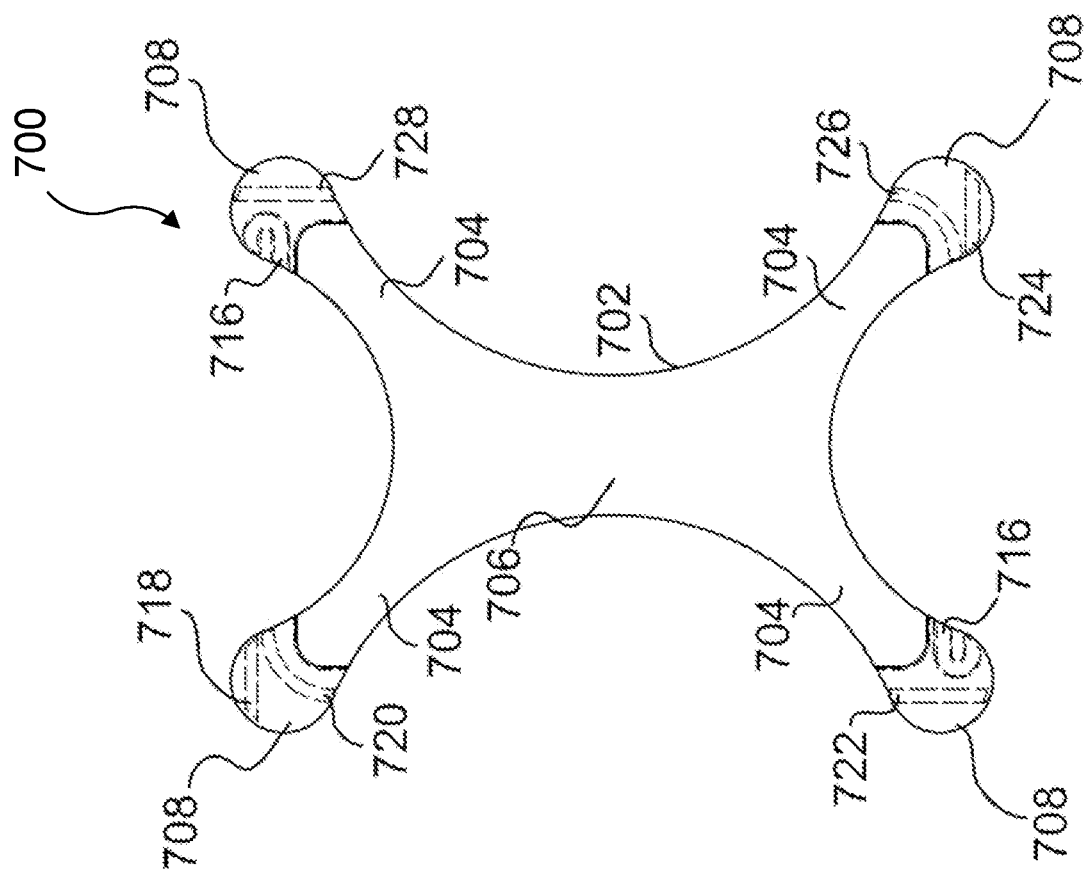
FIG. 7N illustrates a front view of a portion of a wearable device case where the flexible members reside within circular body portions in accordance with various embodiments of the present disclosure.
Figure 7M:
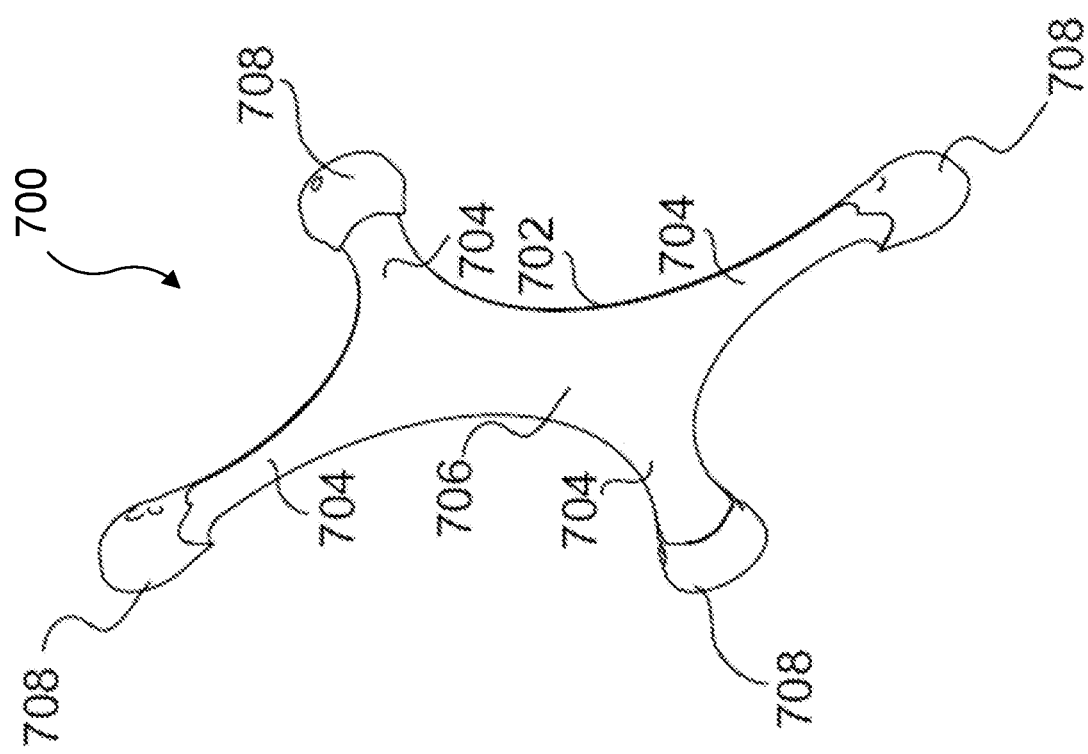
FIG. 7M illustrates a front perspective view of a portion of a wearable device case without the presence of a mobile device and without flexible members installed in accordance with various embodiments of the present disclosure.

Referring now to FIGS. 7H-7M, there are illustrated additional various views of the case 700. FIG. 7H illustrates an exploded front perspective view of the case 700 with the presence of the mobile device, FIG. 7I illustrates a front view of the case 700 without the presence of the mobile device 710, FIG. 7J illustrates a front perspective view of the case 700 without the presence of the mobile device 710, FIG. 7K illustrates a right side view of the case 700 without the presence of the mobile device 710, FIG. 7L illustrates a front perspective view of a portion of the case 700 with the mobile device 710 present and without the flexible members 712 or links 714 installed, and FIG. 7M illustrates a front perspective view of a portion of the case 700 without the presence of the mobile device 710 and without the flexible members 712 or links 714 installed.

Referring now to FIG. 7N, there is illustrated a front view of a portion of the case 700 showing where the flexible members 712 reside within the circular body portions 708. There is shown a first straight cavity 718 within the top left circular body portion 708. A first flexible member (not shown) would be inserted within the first straight cavity 718 and secured tightly therein. The first flexible member would then loop around a link 714 (not shown) situated in the groove 716 at the top right circular body portion 708, looping back to the top left circular body portion 708 and entering a first arced path 720 in the top left circular body portion 708, arcing through the top left circular body portion 708 and exiting and traveling down to the bottom left circular body portion 708. The first flexible member would then enter a second straight cavity 722, where it would be secured. Similarly, there is shown a third straight cavity 724 within the bottom right circular body portion 708. A second flexible member (not shown) would be inserted within the third straight cavity 724 and secured tightly therein. The second flexible member would then loop around a link 714 (not shown) situated in the groove 716 at the bottom left circular body portion 708, looping back to the bottom right circular body portion 708 and entering a second arced path 726 in the bottom right circular body portion 708, arcing through the bottom right circular body portion 708 and exiting and traveling up to the top right circular body portion 708. The second flexible member would then enter a fourth straight cavity 728, where it would be secured.

Figure 8A:
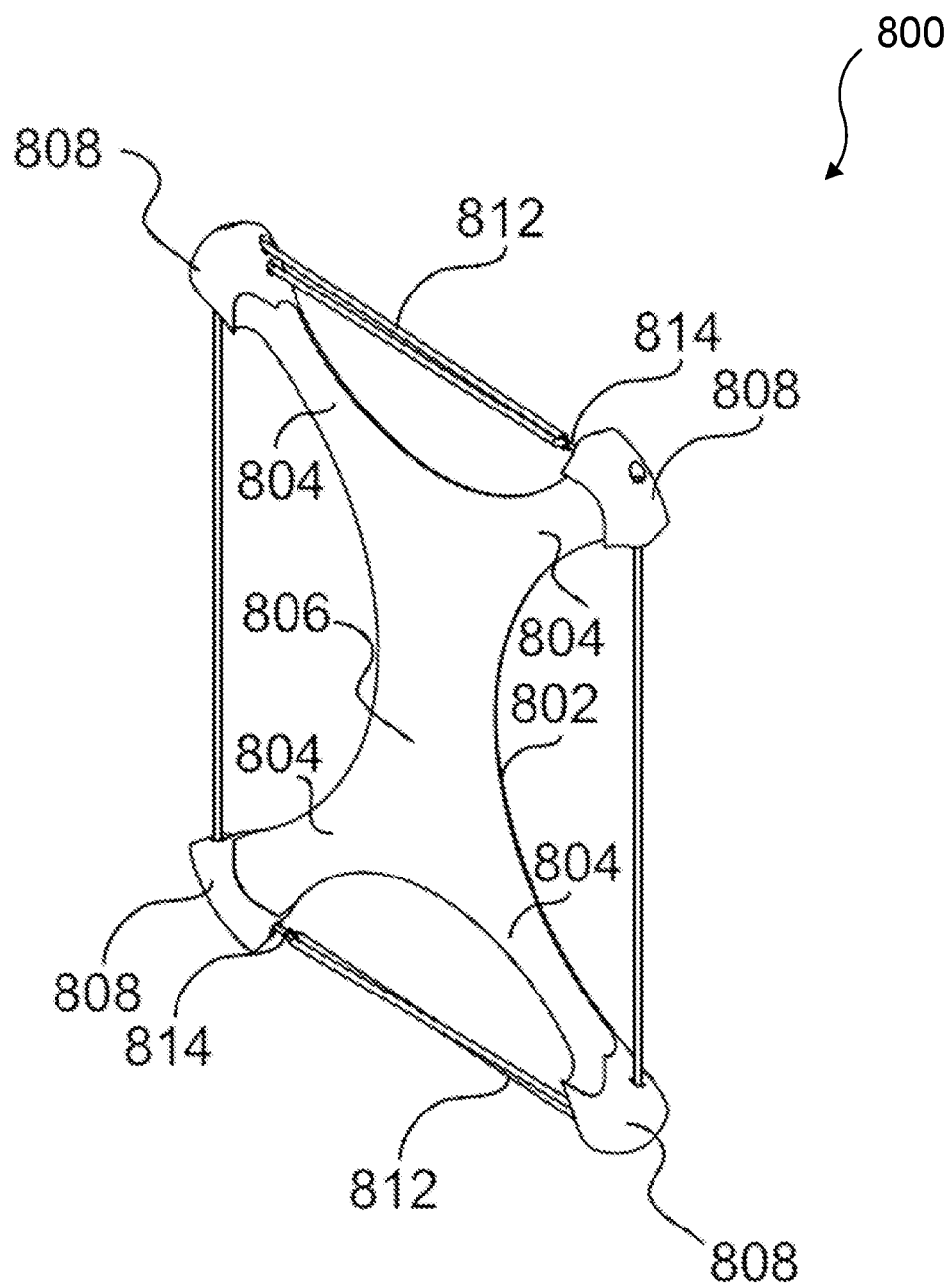
FIG. 8A illustrates a front perspective view of a wearable device case without the presence of a mobile device in accordance with various embodiments of the present disclosure.

Referring now to FIG. 8A, there is illustrated another embodiment of a mobile device case 800. The case 800 includes pins secured within slots of the circular body portions, as described herein. The case 800 includes a body 802. In some embodiments such as that illustrated in FIG. 8A, the body 802 may be in an 'X' shape, but other embodiments may allow for other case shapes or dimensions. The body 802 has four arms 804 extending diagonally each in a different direction from a center body portion 806, creating an arcuate edge along the body 802 between each arm 804, the arms 804 also ending in circular body portions 808. The arms 804 extend equally from the center body portion 806, creating a rectangular area, with each point of the rectangular area situated at the base of a circular body portion 808. A mobile device such as a tablet computer may reside in this rectangular area, and thus the length and orientation of the arms 804 may be altered to account for mobile devices of differing shapes and dimensions. The circular body portions 808 are wider than the arms 804 and extend out over the rectangular area. The circular body portions 808 have notched areas that allow for the corners of a mobile device to be inserted within the notched areas, holding the mobile device in place.

The circular body portions 808 also have one or more flexible members 812 running therethrough, for use in converting the case 800 into a wearable item. For example, in the embodiment illustrated in FIG. 8A, a flexible member 812 is secured within a top left circular body portion 808 and runs out of the circular body portion 808 via an aperture, extending towards a top right circular body portion 808. The flexible member wraps through and hooks around an eye of a pin 814, and the pin 814 is inserted within a slot in the top right circular body portion 808. The flexible member 812, after looping around the pin 814 at the top right circular body portion 808, runs back toward the left top circular body portion 808 through another aperture and exiting the top circular body portion 808 via an aperture, running down to a bottom left circular body portion 808. The flexible member 812 enters the bottom left circular body portion 808 via yet another aperture and is secured within the bottom left circular body portion 808. A second flexible member 812 is secured similarly to the case 800, running from within the top right circular body portion 808, through a bottom right circular body portion 808, and looping around a pin 814 secured to the back of the bottom left circular body portion 808. The bungee then runs back to the bottom right circular body portion 808 where it is secured.

Figure 8B:
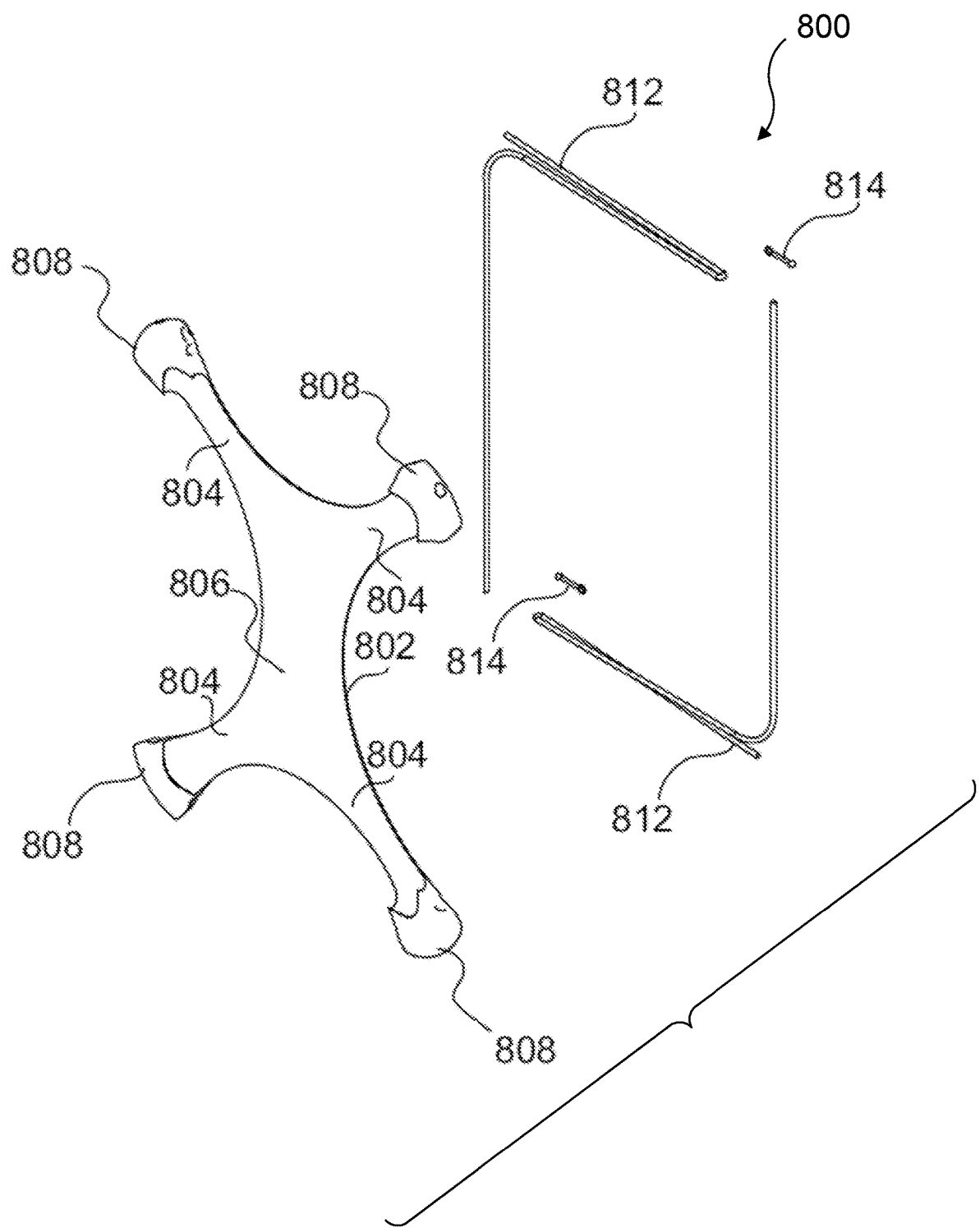
FIG. 8B illustrates an exploded front perspective view of a wearable device case in accordance with various embodiments of the present disclosure.
Figure 8C:
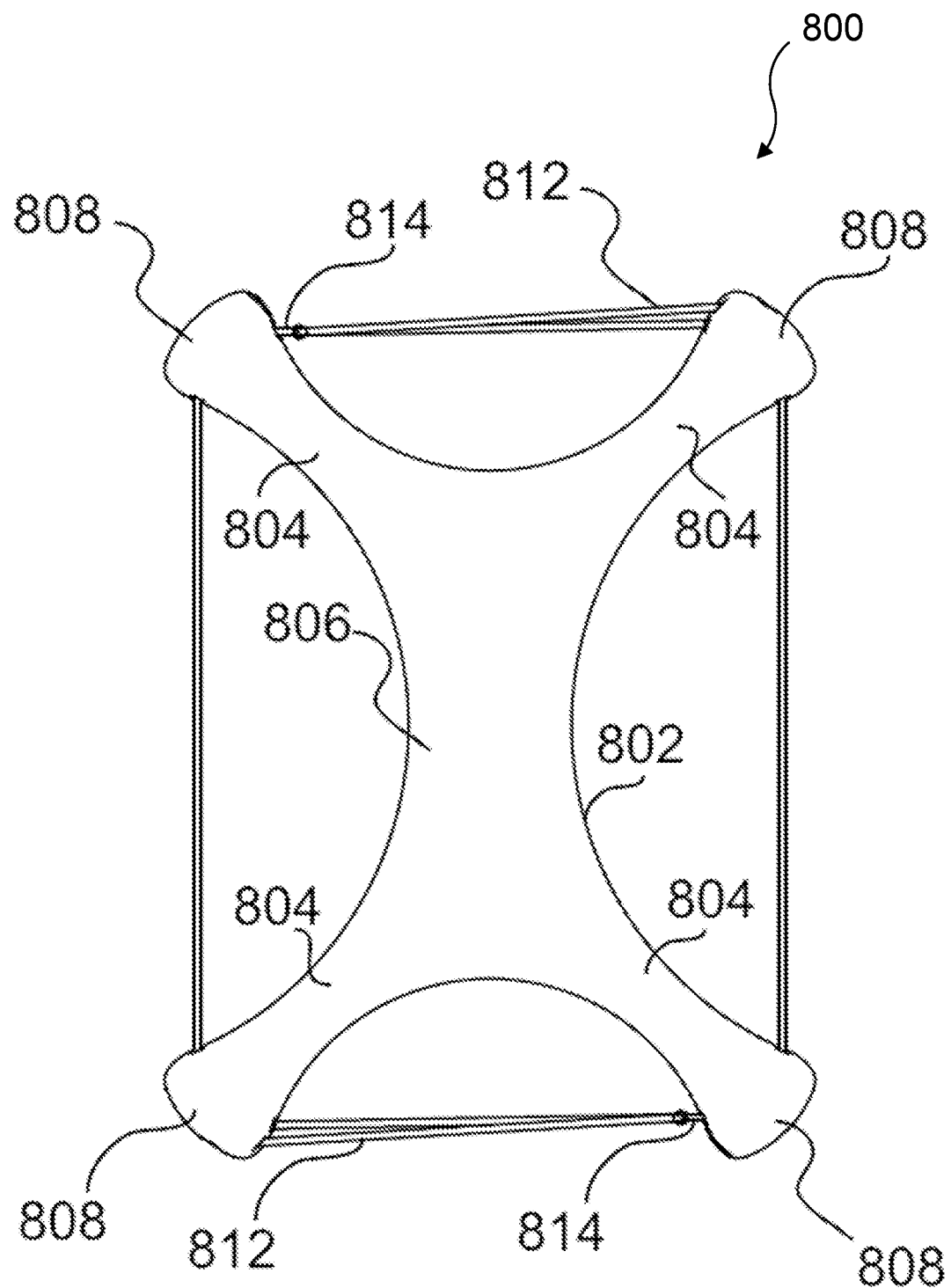
FIG. 8C illustrates a rear view of a wearable device case in accordance with various embodiments of the present disclosure.

Referring now to FIGS. 8B and 8C, there is illustrated an exploded front perspective view (FIG. 8B) and a rear view (FIG. 8C) of the case 800. There is again shown in FIGS. 8B and 8C the structure of the body 802 of the case 800 and the flexible members 812 and the pins 814.

Figure 8F:
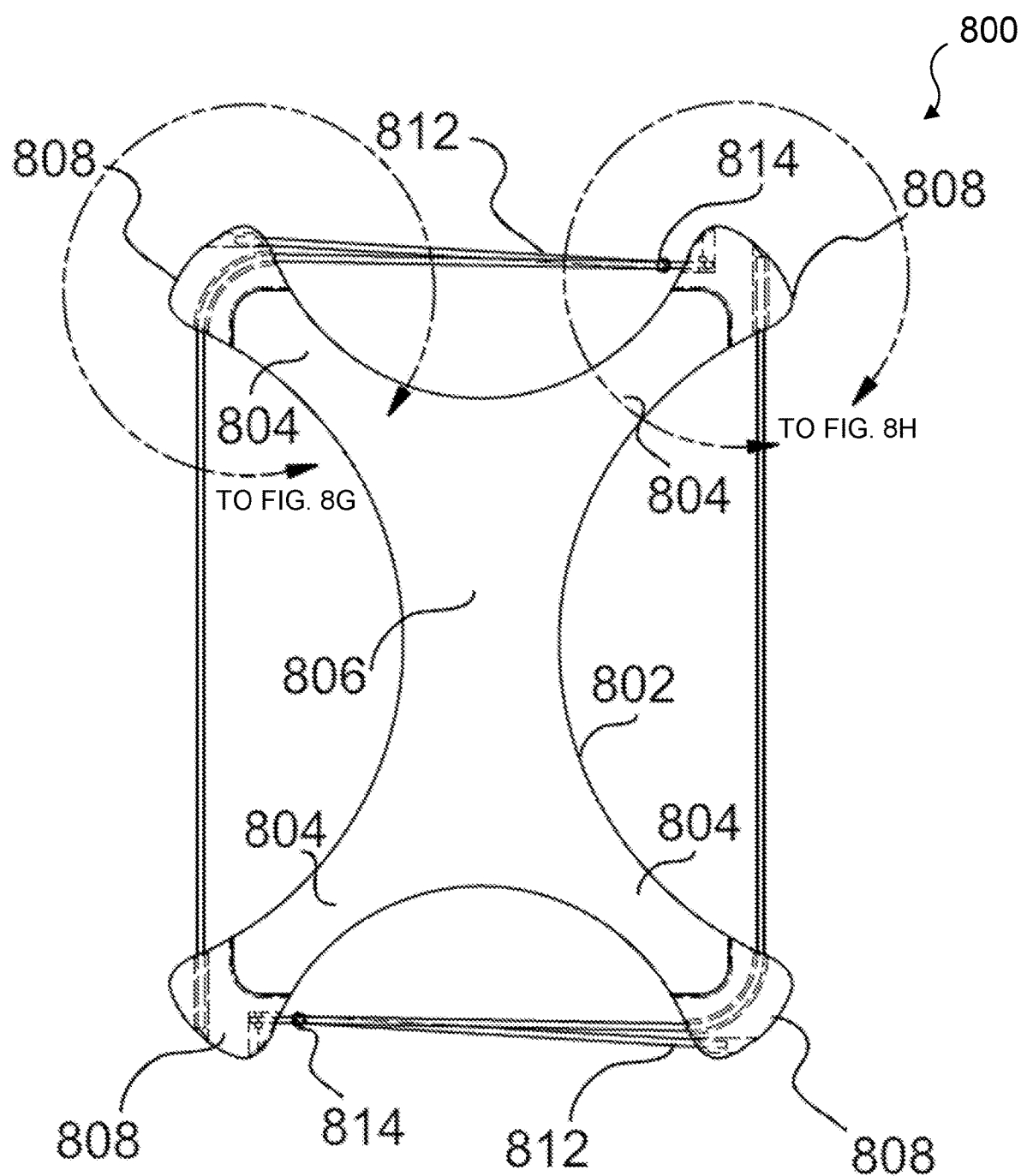
FIG. 8F illustrates a front view of a wearable device case showing slots for the pins in accordance with various embodiments of the present disclosure.
Figure 8G:
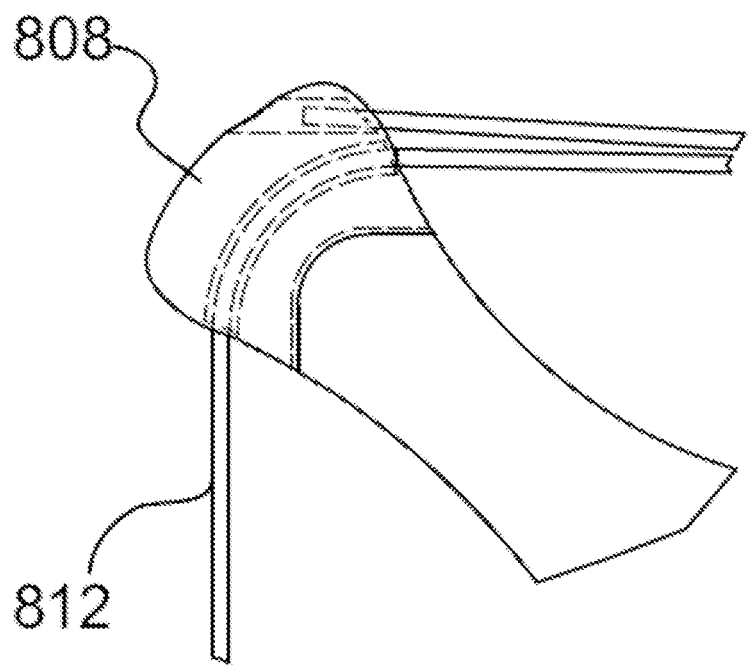
FIG. 8G illustrates an enlarged front view of a top left circular body portion of a wearable device case showing a slot for pins in accordance with various embodiments of the present disclosure.
Figure 8H:
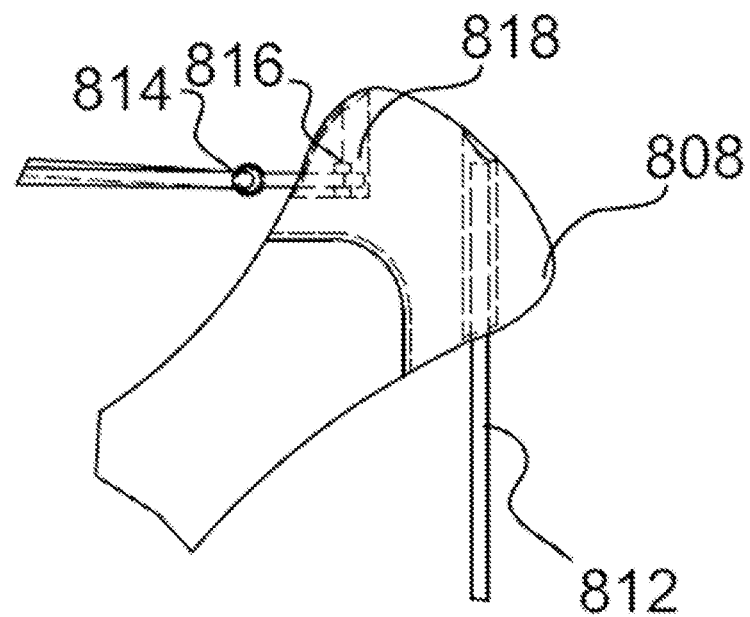
FIG. 8H illustrates an enlarged front view of a top right circular body portion of a wearable device case showing a slot for pins in accordance with various embodiments of the present disclosure.
Figure 8I:
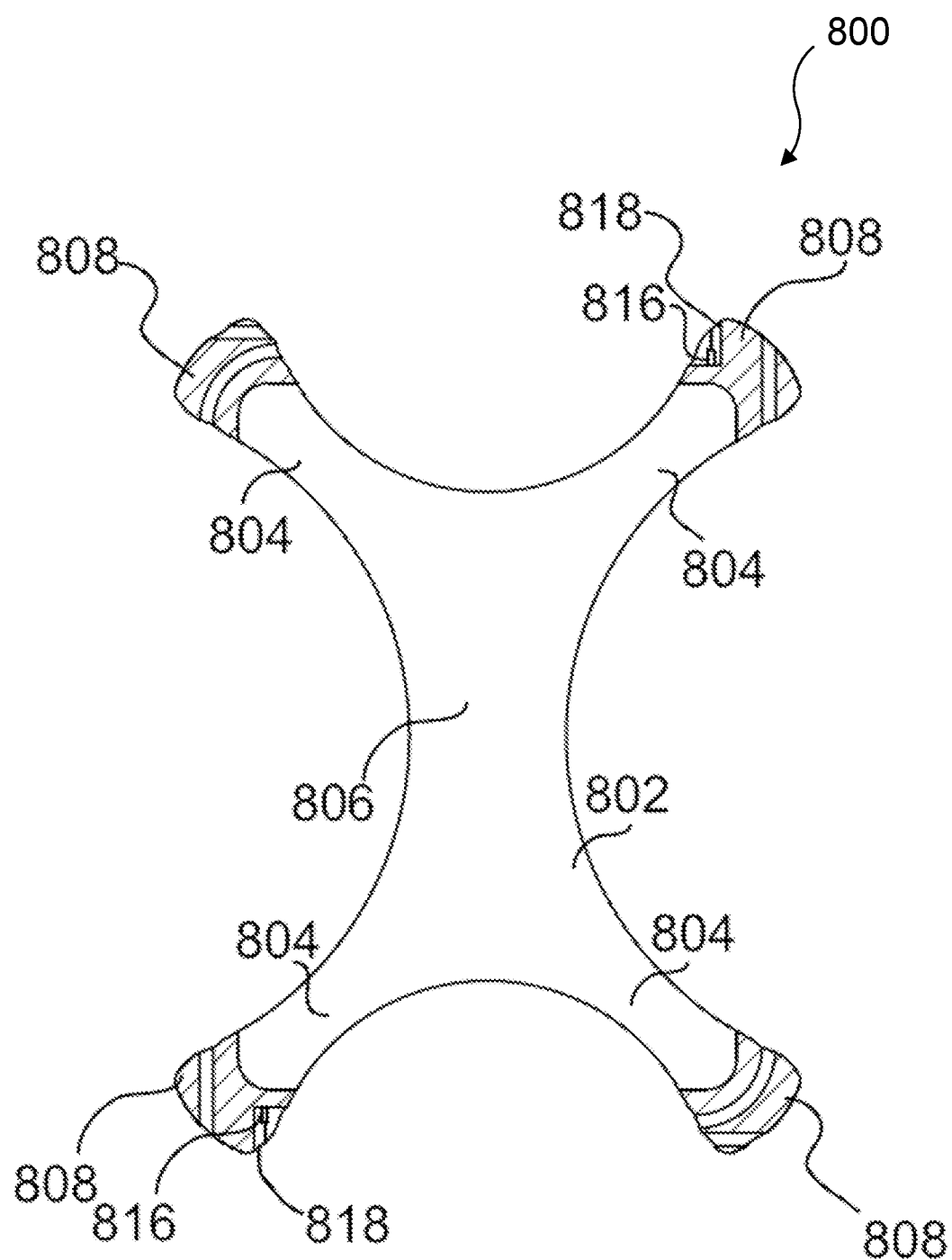
FIG. 8I illustrates a front cross-section view of a wearable device case, without flexible members installed, showing slots for pins in accordance with various embodiments of the present disclosure.

Referring now to FIGS. 8D-8I, there are illustrated various views of the case 800. FIG. 8D illustrates a front cross-section view of the case 800 showing the slots for the pins 814, FIG. 8E illustrates an enlarged front cross-section view of the top right circular body portion 808 showing the slot for the pin 814, FIG. 8F illustrates a front view of the case 800 showing the slots for the pins 814, FIG. 8G illustrates an enlarged front view of the top left circular body portion showing the slot for the pins, FIG. 8H illustrates an enlarged front view of the top right circular body portion showing the slot for the pins, and FIG. 8I illustrates a front cross-section view of the case 800, without the flexible members 812 installed, showing the slots for the pins 814. FIGS. 8D-8I show the flexible members 812 secured at one end via apertures in the circular body portions 808, and extending to and looping through an eye of pin 814, before looping back and through the circular body portion 808 where the flexible member 812 was originally secured, travelling through an arcuate path through the circular body portion 808, and extending to another circular body portion 808 where it is again tightly secured. The pins 814, at an end opposite the end where the flexible member 812 is looped through, is placed over a stake 816 embedded in a cutout area 818 of the circular body portion 808. The stake 816 may have a spring loaded button or ball that can be pressed in when applying or removing the pin 814, and that locks the pin in place once applied by springing out over the pin 814 to prevent it from slipping off the stake 816. Additionally, the pin 814 is kept in the slot with the tension of the flexible member. To release the pin, the bungee is stretched so that a cylindrical portion of the pin 814 can slide over the stake 816 and out of the cutout area 818 so the mobile device can be worn.

Figure 9A:
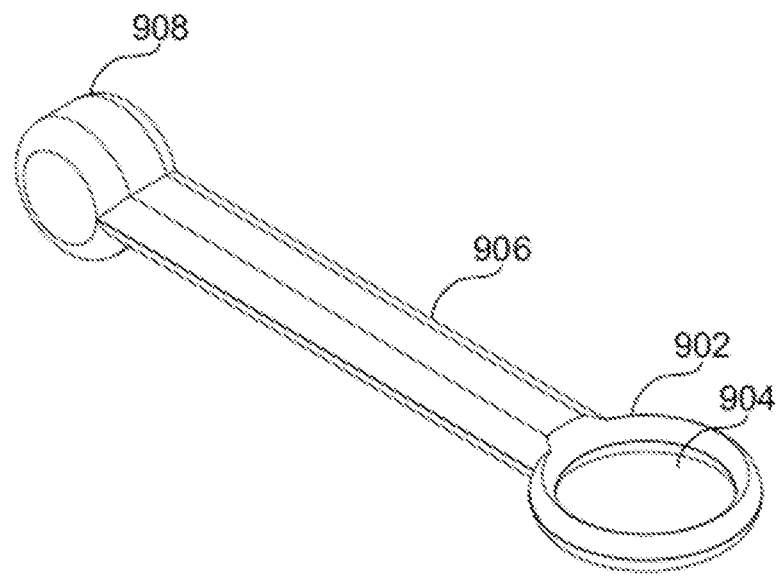
FIG. 9A illustrates a front perspective view of a pin for use with a wearable device case in accordance with various embodiments of the present disclosure.
Figure 9B:
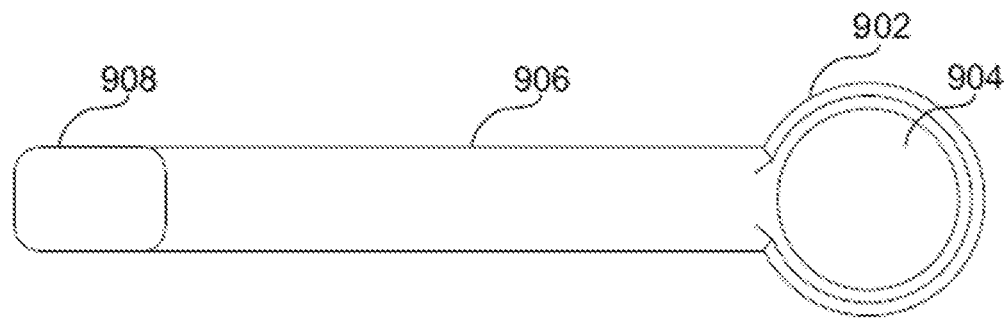
FIG. 9B illustrates a front view of a pin for use with a wearable device case in accordance with various embodiments of the present disclosure.
Figure 9C:
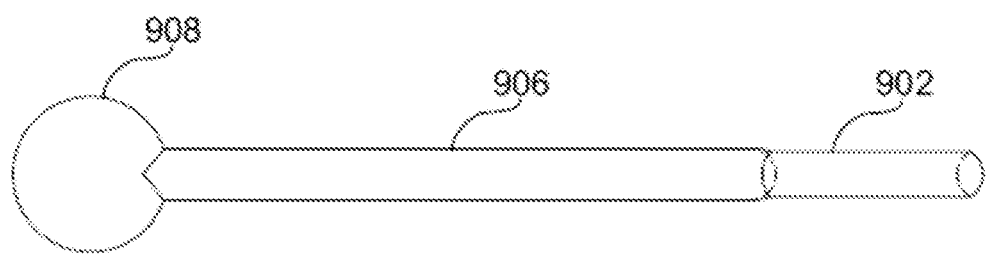
FIG. 9C illustrates a top view of a pin for use with a wearable device case in accordance with various embodiments of the present disclosure.

Referring now to FIGS. 9A-C, there are illustrated various views of the pin 814. FIG. 9A illustrates a front perspective view of the pin 814, FIG. 9B illustrates a front view of the pin 814, and FIG. 9C illustrates a top view of the pin 814. The pin 814 has a first ring 902 having an opening 904 therein disposed at one end of an elongated body 906, the opening 904 being for receiving and looping therethrough the flexible members described herein. At an opposite end of the elongated body 906 from the first ring 902 is a cylindrical portion 908, the cylindrical portion 908 having an aperture therethrough and being for placing over the stake 816 described herein.

Figure 10A:
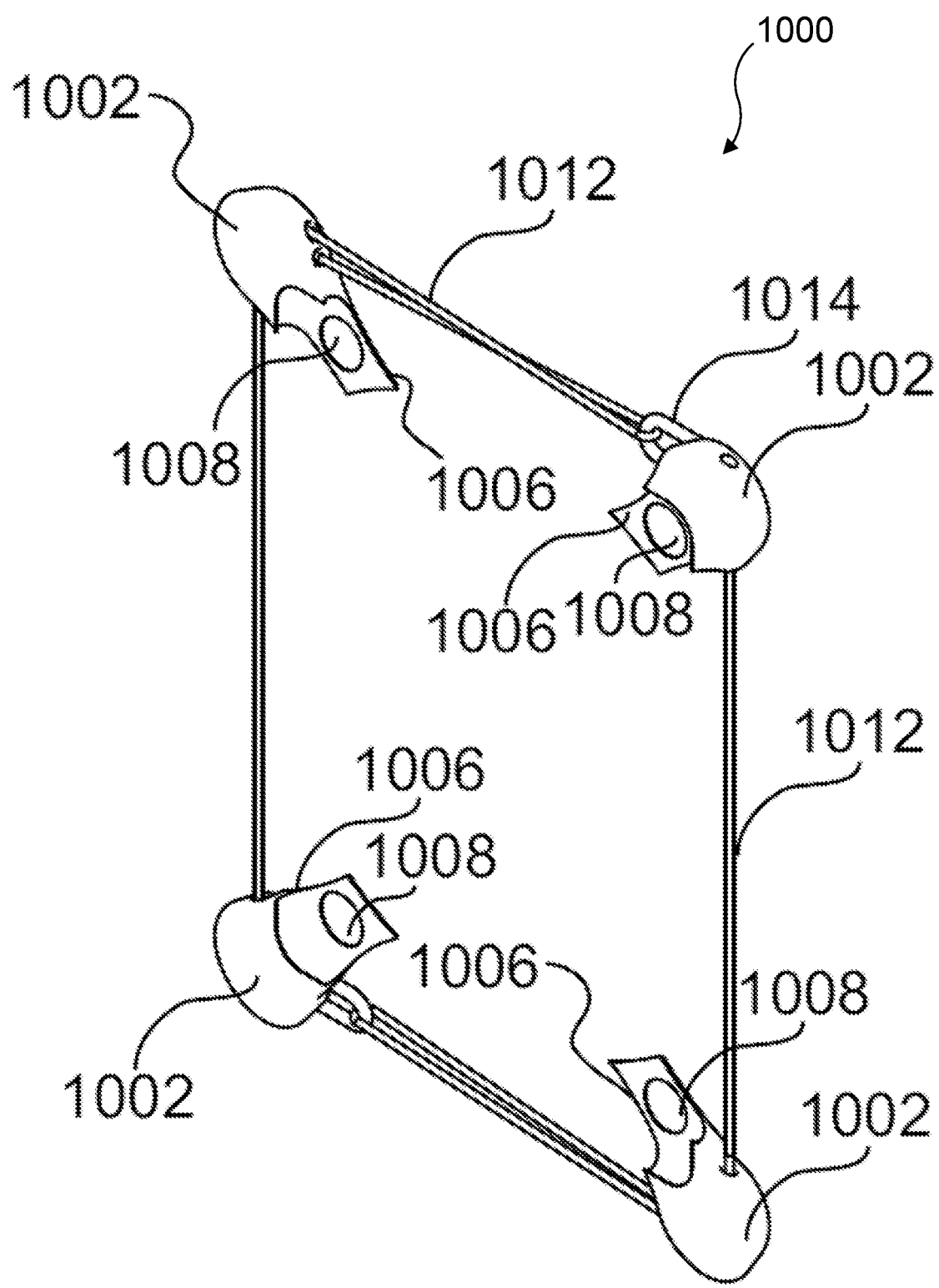
FIG. 10A illustrates a front perspective view of a wearable device case without the presence of a mobile device in accordance with various embodiments of the present disclosure.
Figure 10B:
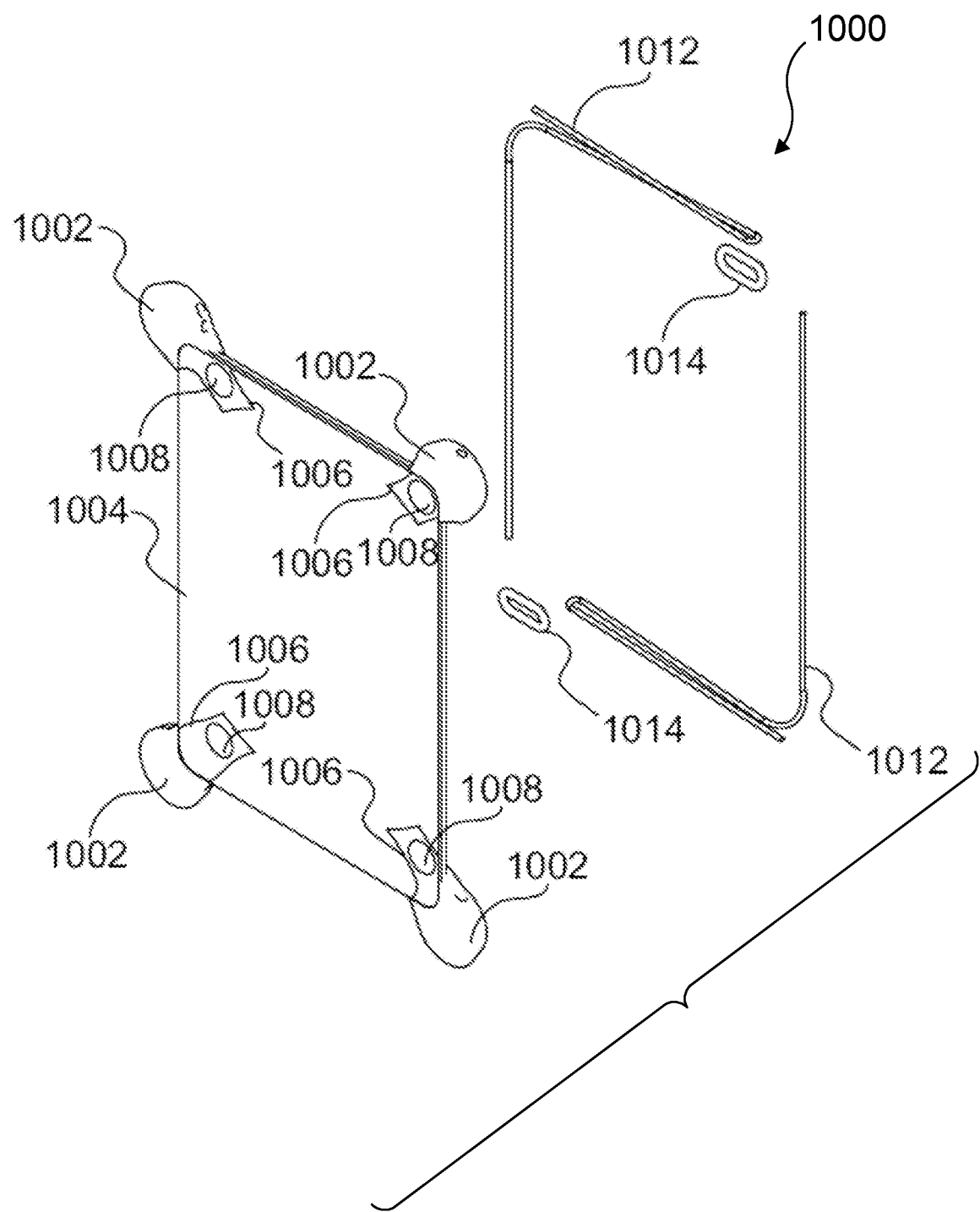
FIG. 10B illustrates an exploded front perspective view of a wearable device case with the presence of a mobile device in accordance with various embodiments of the present disclosure.
Figure 10C:
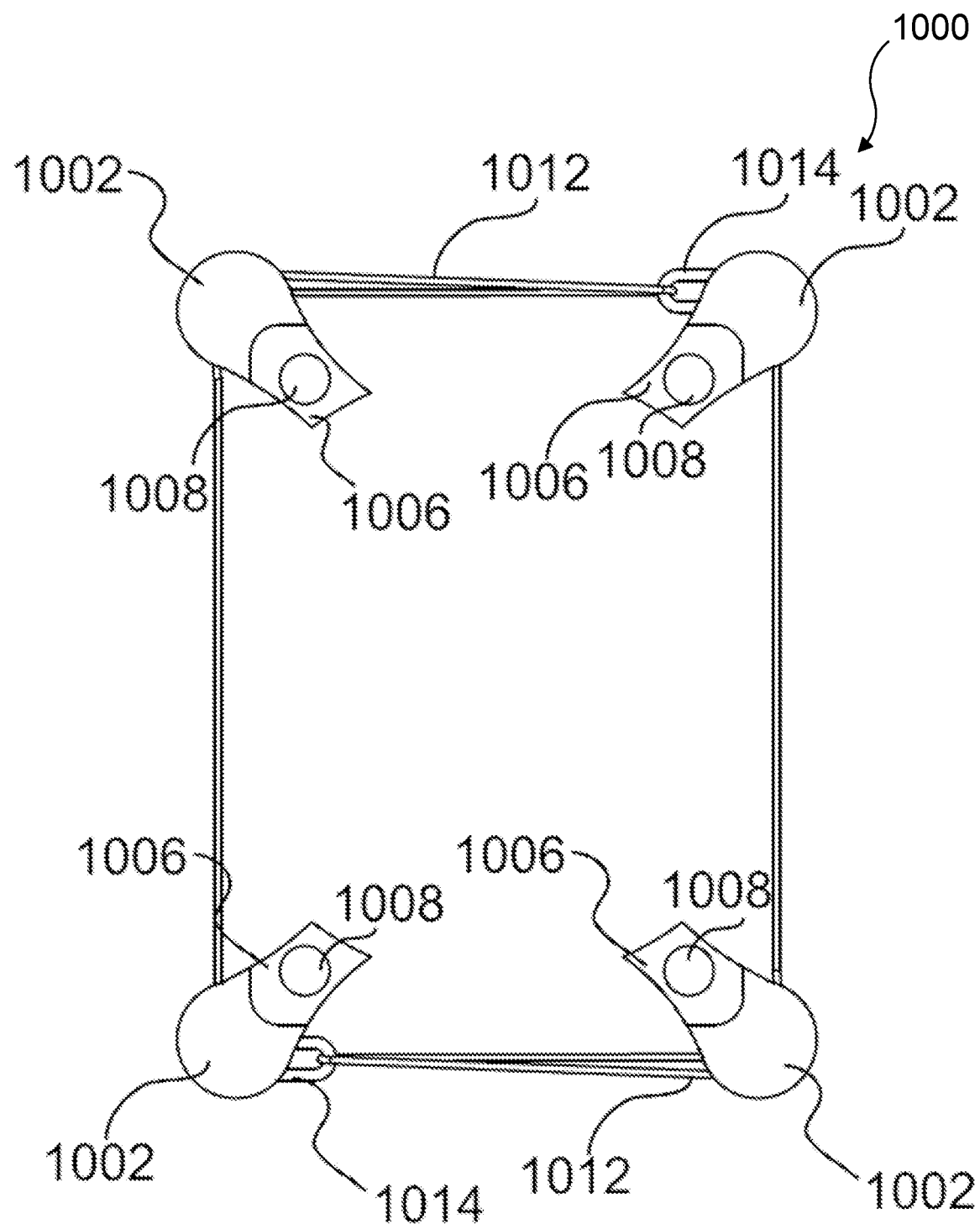
FIG. 10C illustrates a front view of a wearable device case in accordance with various embodiments of the present disclosure.
Figure 10F:
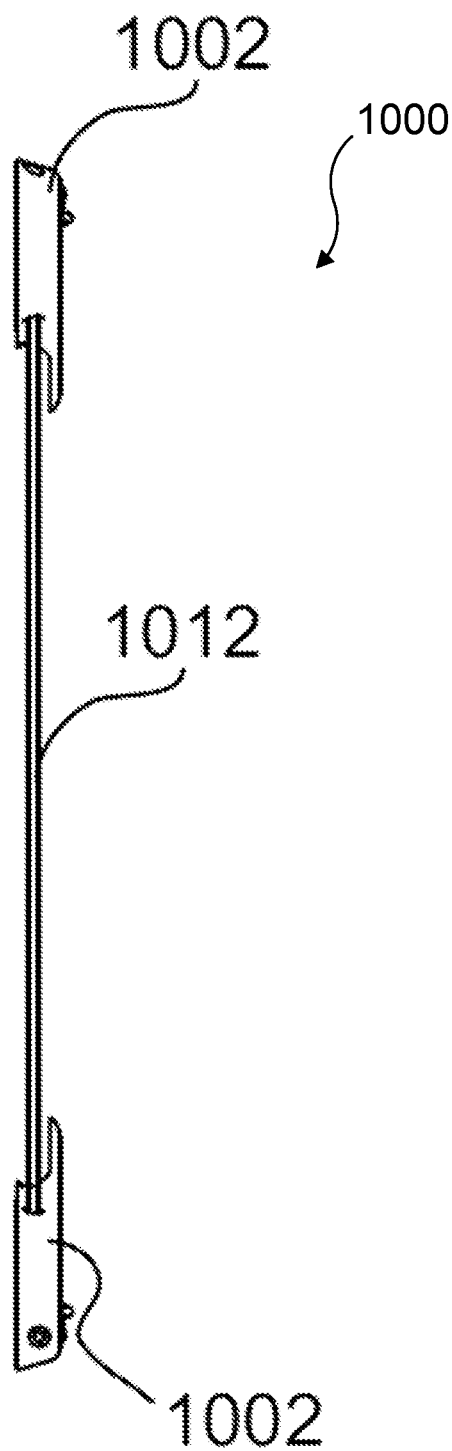
FIG. 10F illustrates a right side view of a wearable device case in accordance with various embodiments of the present disclosure.

Referring now to FIGS. 10A-10F, there are illustrated various views of another embodiment of a mobile device case 1000. FIG. 10A illustrates a front perspective view of the case 1000, FIG. 10B illustrates an exploded front perspective view of the case 1000 with the presence of the mobile device, FIG. 10C illustrates a front view of the case 1000, FIG. 10D illustrates a rear view of the case 1000, FIG. 10E illustrates an enlarged view of one circular body of the case 1000, and 10F illustrates a right side view of the case 1000. The case 1000, instead of providing a solid backed body, includes four separate circular bodies 1002 having notched areas wherein corners of a mobile device 1004 can be inserted, and having arms 1006 each extending only a short distance from the circular bodies 1002 diagonally toward the center of the mobile device 1004, as shown in FIG. 10A. Adhesive 1008 may be placed on the arms 1006 so that the mobile device 1004 comes into contact with the adhesive 1008 to provide a greater hold on the mobile device 1004. Two of the circular bodies 1002 additionally have a groove 1010 cut out of the back of the two circular bodies 1002 to provide a hook-like surface for flexible members 1012 to attach via a link 1014, similar to other embodiments described herein. In addition, the flexible members may be attached to the hook 1010 directly, without the use of a link 1014. The flexible members 1012 can be detached and extended so that the case 100 can be worn similarly to other embodiments described herein as well. Thus, the case 1000 provides for a light and small form factor while retaining the functionality of becoming a wearable article.

Figure 11A:
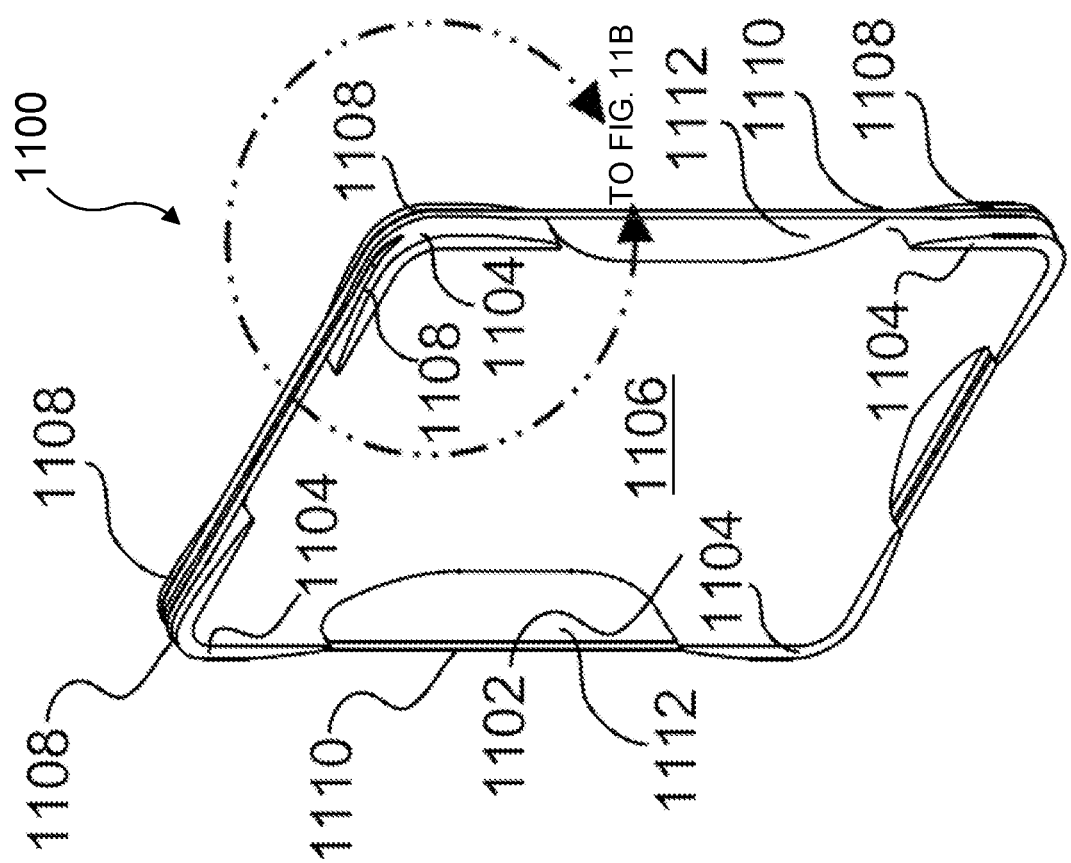
FIG. 11A illustrates a front perspective view of a wearable device case in accordance with various embodiments of the present disclosure.
Figure 11B:
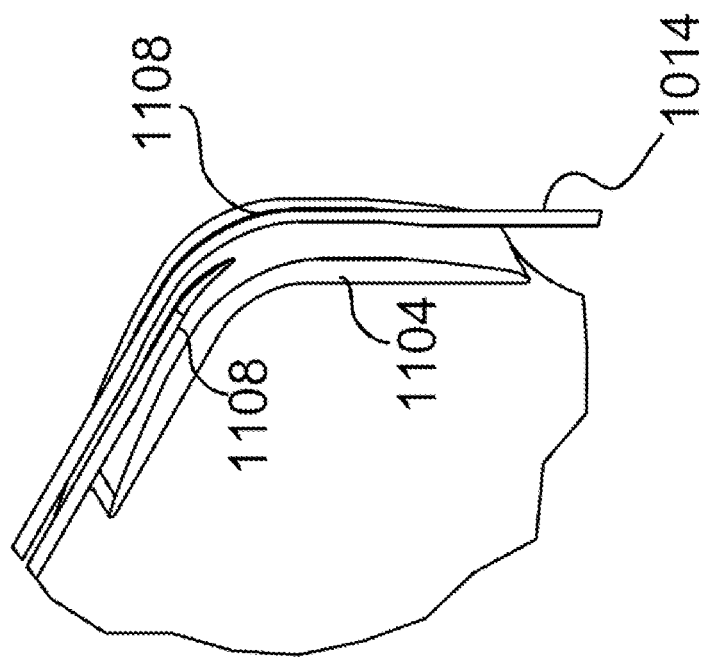
FIG. 11B illustrates an enlarged view of an upper right corner of a wearable device case showing flexible members installed on the case in accordance with various embodiments of the present disclosure.

Referring now to FIGS. 11A-11B, there is illustrated another embodiment of a mobile device case 1100. FIG. 11A illustrates a front perspective view of the case 1100 and FIG. 11B illustrates an enlarged view of an upper right corner of the case 1100 showing flexible members installed on the case 1100. The case 1100 has a rectangular body 1102 having corner sections 1104 that extend forward from a back 1106, defining a rectangular space in which a mobile device may fit into the case 1100 by fitting firmly within and being held by the corner sections 1104. The corner sections 1104 further have a series of grooves 1108 that allow for one or more flexible members 1110 to be inserted tightly into the grooves 1108. When the mobile device is being used rather than transported, the flexible members 1110 may be secured into the grooves 1108 to allow for easier gripping of the case 1100 by inserted the user's hands in spaces 1112 between the flexible members 1110 and the body 1102, as shown in FIG. 11A.

Figure 11C:
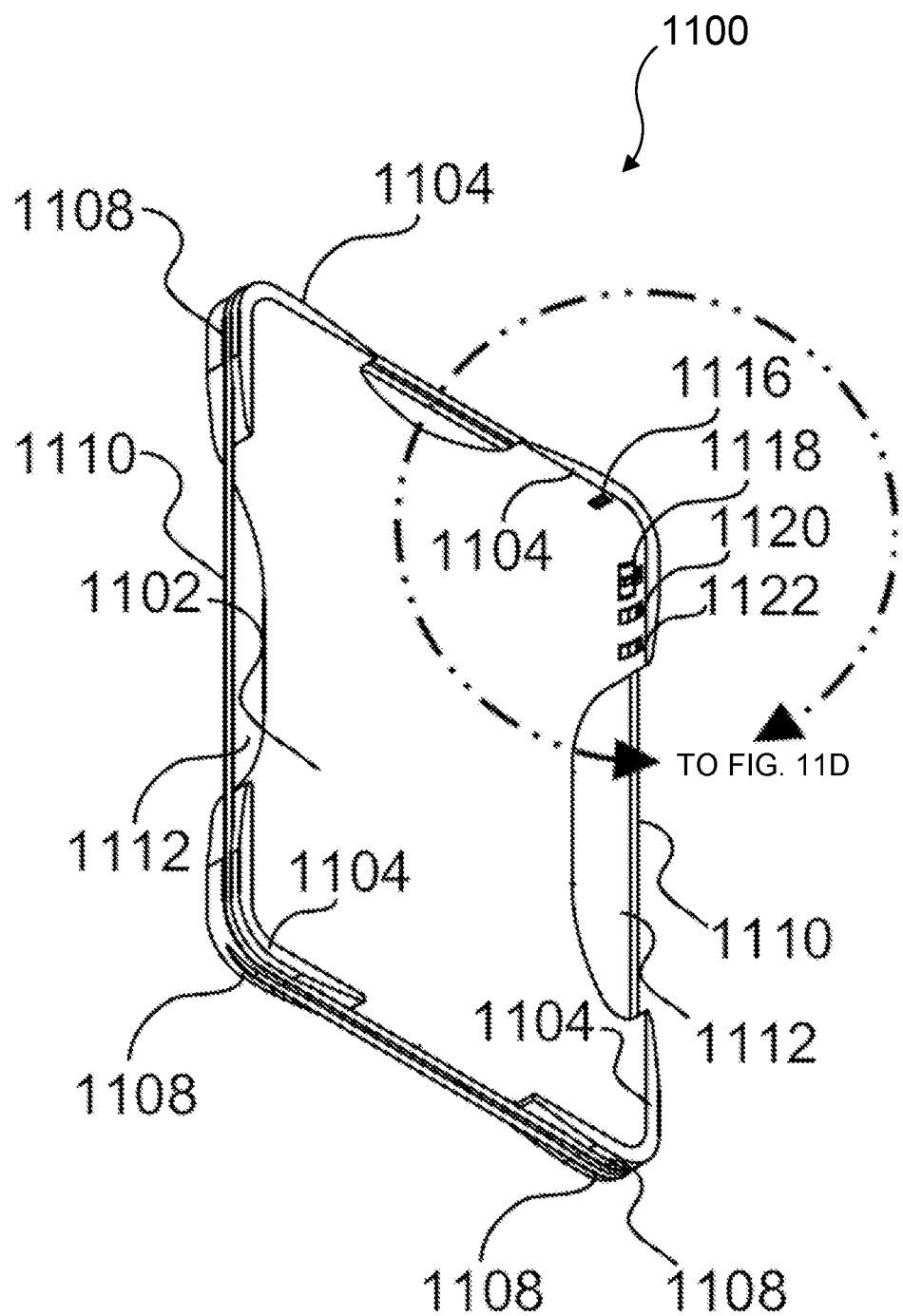
FIG. 11C illustrates a front perspective view of a wearable device case in accordance with various embodiments of the present disclosure.
Figure 11E:
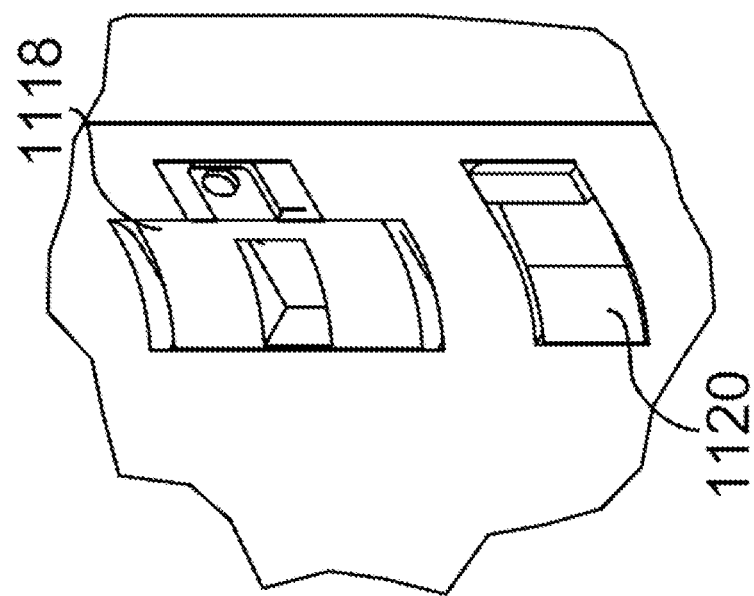
FIG. 11E illustrates an enlarged front perspective view of a series of buttons of a wearable device case in accordance with various embodiments of the present disclosure.
Figure 11D:
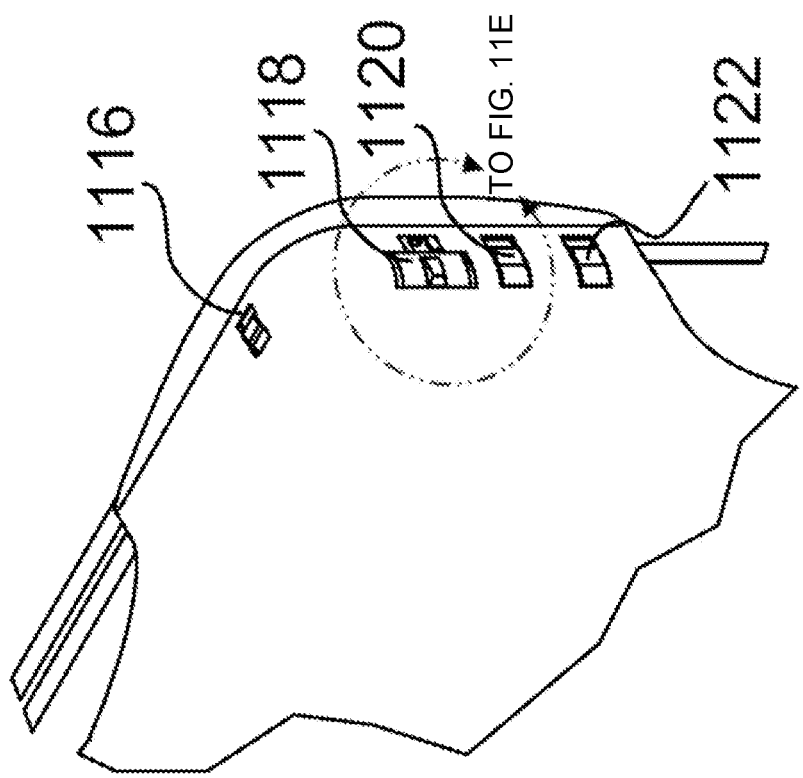
FIG. 11D illustrates an enlarged front perspective view of an upper right corner of a wearable device case showing a series of buttons in accordance with various embodiments of the present disclosure.
Figure 11F:
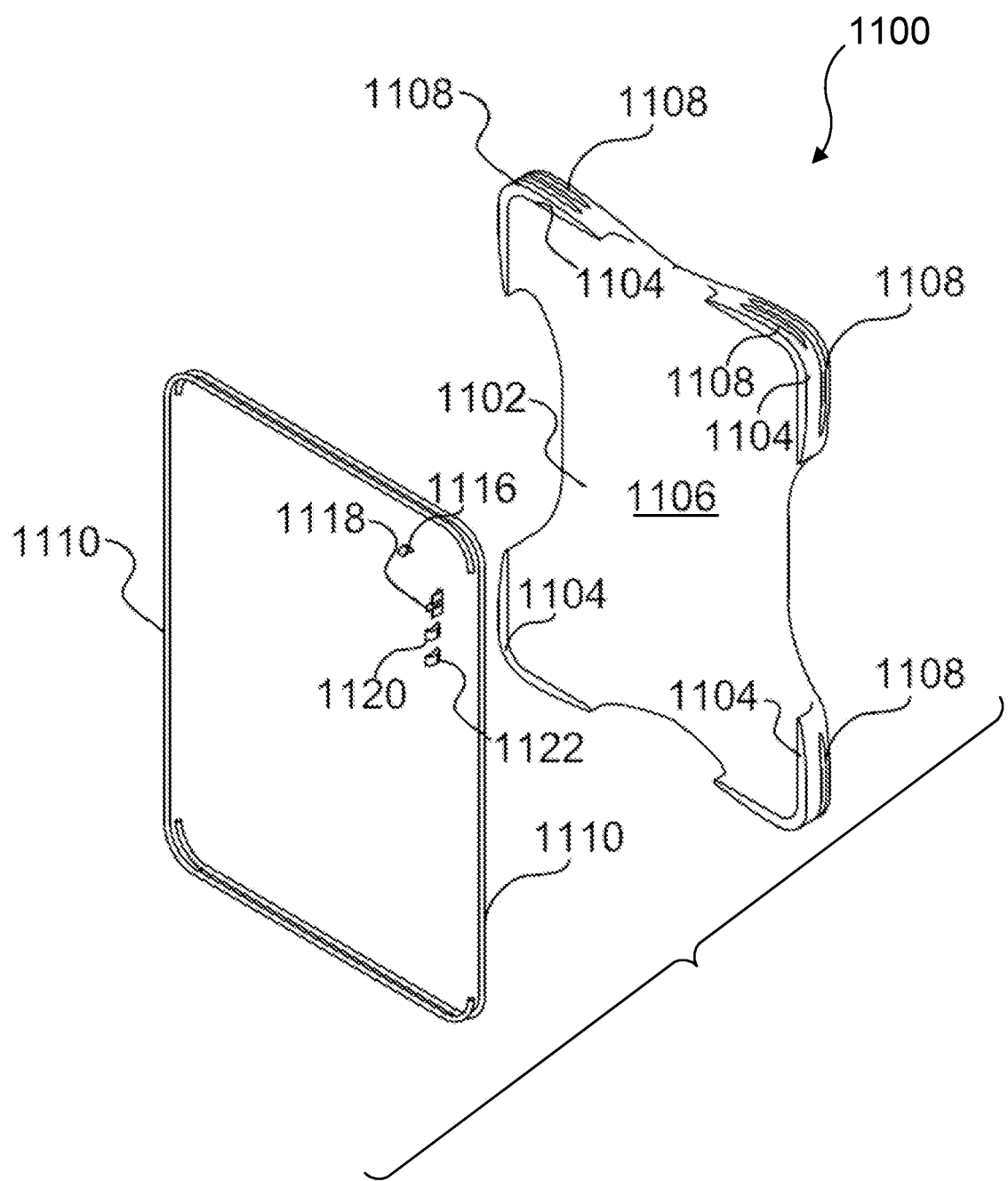
FIG. 11F illustrates an exploded front perspective view of a wearable device case in accordance with various embodiments of the present disclosure.

Referring now to FIGS. 11C-11F, there are illustrated various views of the case 1100. FIG. 11C illustrates a front perspective view of the case 1100, FIG. 11D illustrates an enlarged front perspective view of an upper right corner of the case 1100 showing a series of buttons, FIG. 11E shows an enlarged view of the series of buttons, and FIG. 11F shows an exploded front perspective view of the case 1100. The series of buttons include a lock button 1116, a vibration toggle button 1118, a volume up button 1120, and a volume down button 1122. The vibration toggle button 1118 operates with a sliding motion to turn a vibration feature of the mobile device on or off by interacting with a button on the mobile device itself. The lock button 1116, the volume up button 1120, and the volume down button 1122 operate with a seesaw motion when pressure is applied to one side of the button, causing the button to move downward to activate a button on the mobile device itself, and the button moving away from the button on the mobile device when pressure is taken off the button on the case 1100. In addition, these mechanisms can be used and adapted to any other types of buttons that are seen on tablet devices.

Figure 11G:
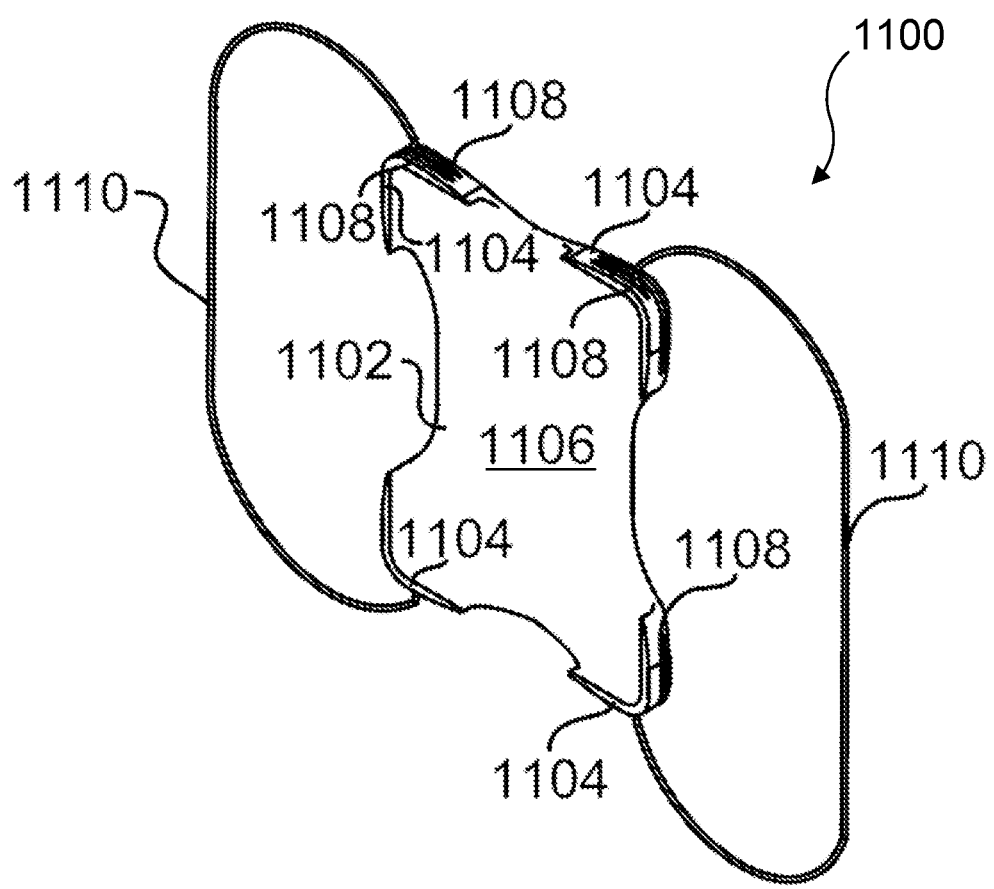
FIG. 11G illustrates a front perspective view of a wearable device case in a wearable configuration in accordance with various embodiments of the present disclosure.
Figure 11H:
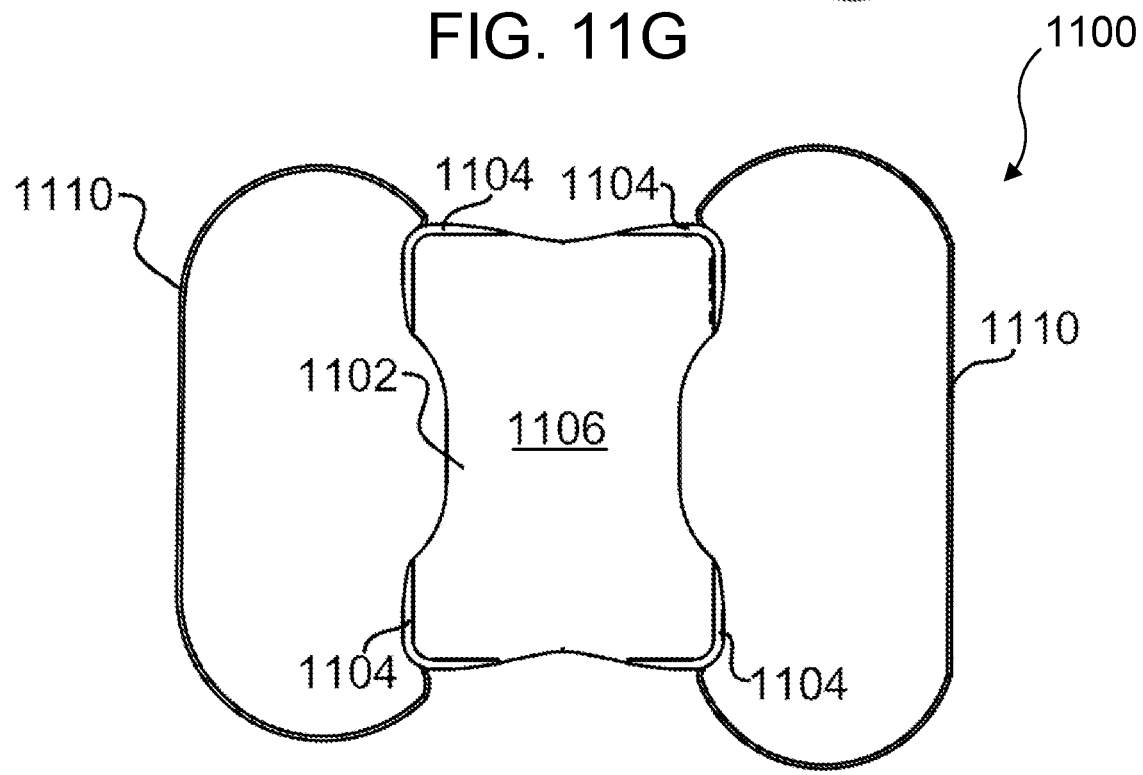
FIG. 11H illustrates a front view of a wearable device case in a wearable configuration in accordance with various embodiments of the present disclosure.
Figure 11I:
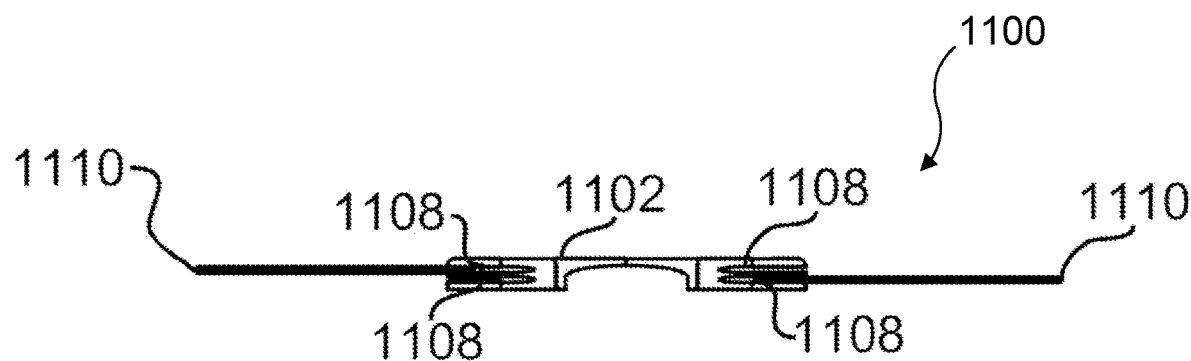
FIG. 11I illustrates a top view of a wearable device case in a wearable configuration in accordance with various embodiments of the present disclosure.
Figure 11J:
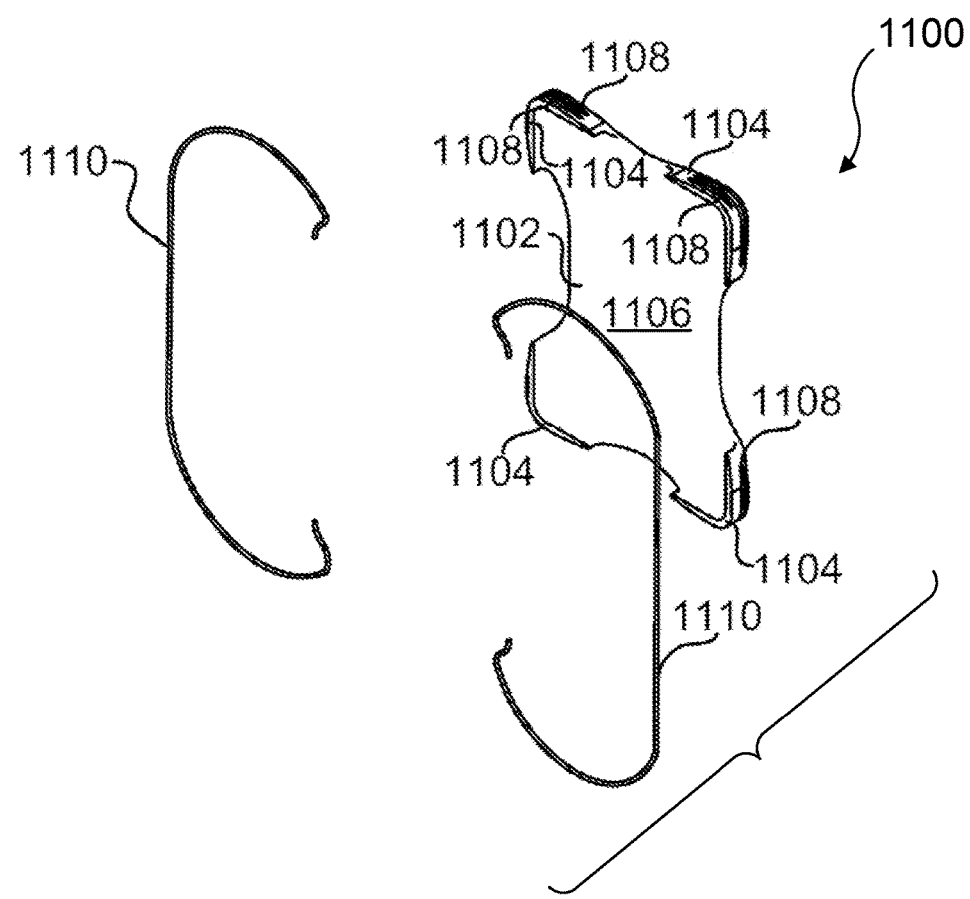
FIG. 11J illustrates an exploded front perspective view of a wearable device case in a wearable configuration in accordance with various embodiments of the present disclosure.

Referring now to FIGS. 11G-11J, there is illustrated various views of the case 1100 in a wearable configuration. FIG. 11G illustrates a front perspective view of the case 1100 in a wearable configuration, FIG. 11H illustrates a front view of the case 1100 in a wearable configuration, FIG. 11I illustrates a top view of the case 1100 in a wearable configuration, and FIG. 11J illustrates an exploded front perspective view of the case 1100 in a wearable configuration.

Figure 12B:
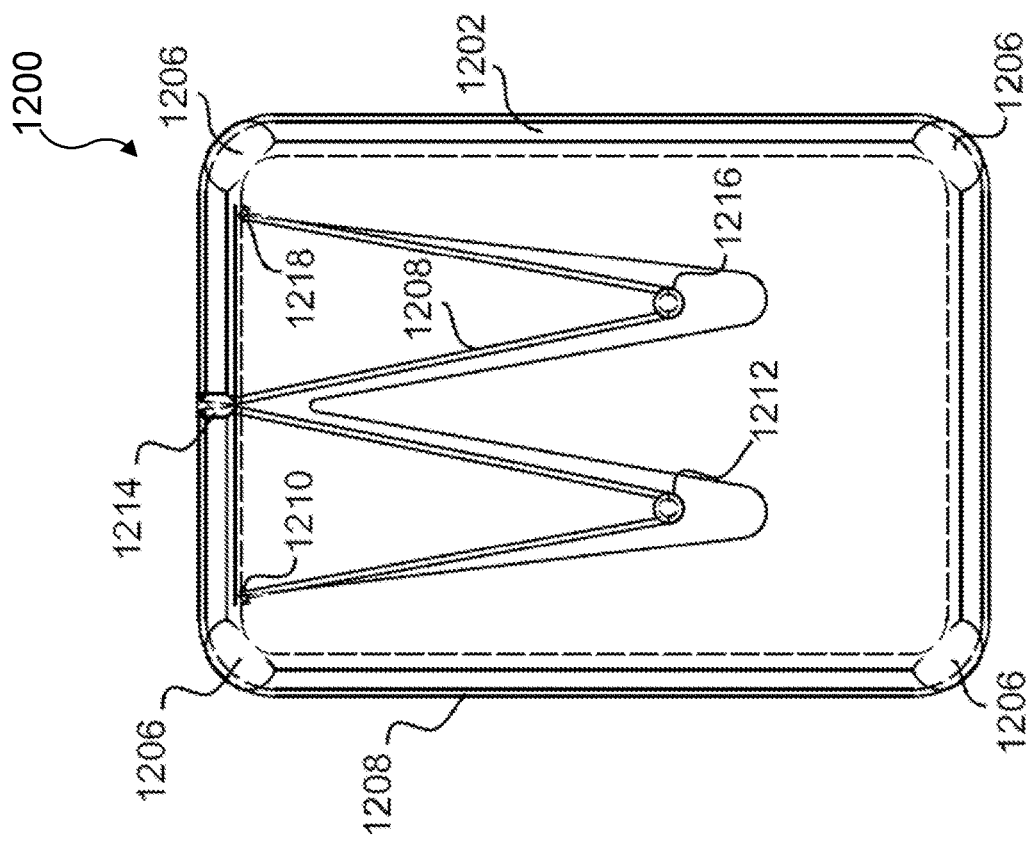
FIG. 12B illustrates a rear view of a wearable device case in accordance with various embodiments of the present disclosure.
Figure 12A:
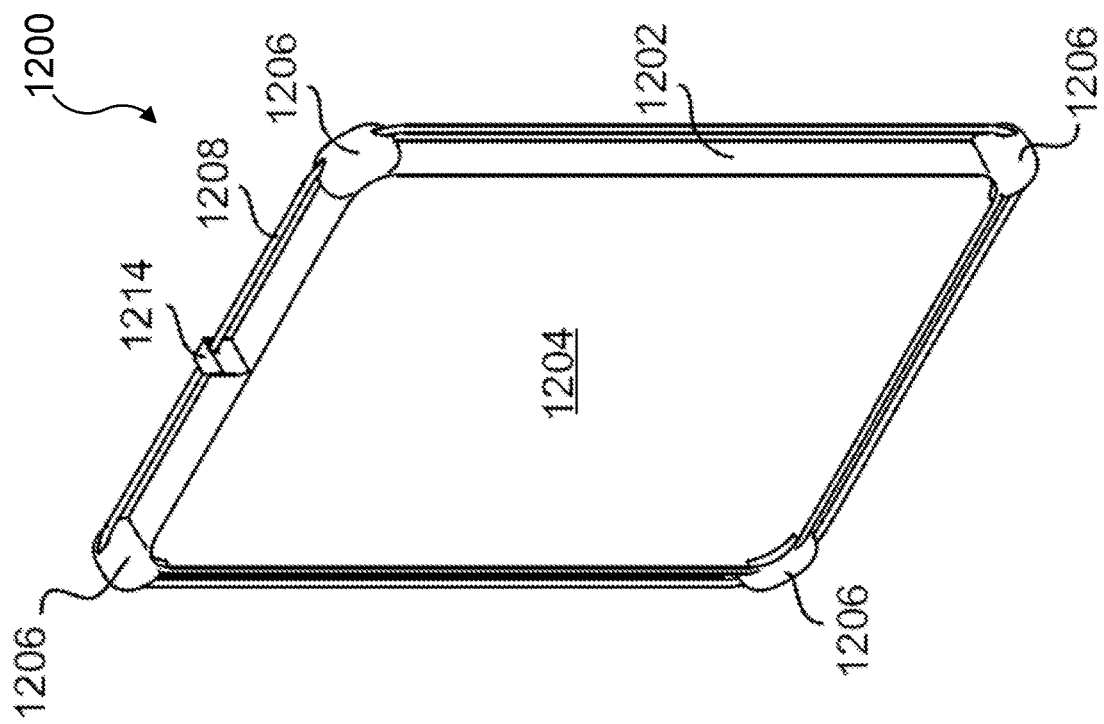
FIG. 12A illustrates a front perspective view of a wearable device case in accordance with various embodiments of the present disclosure.
Figure 12D:
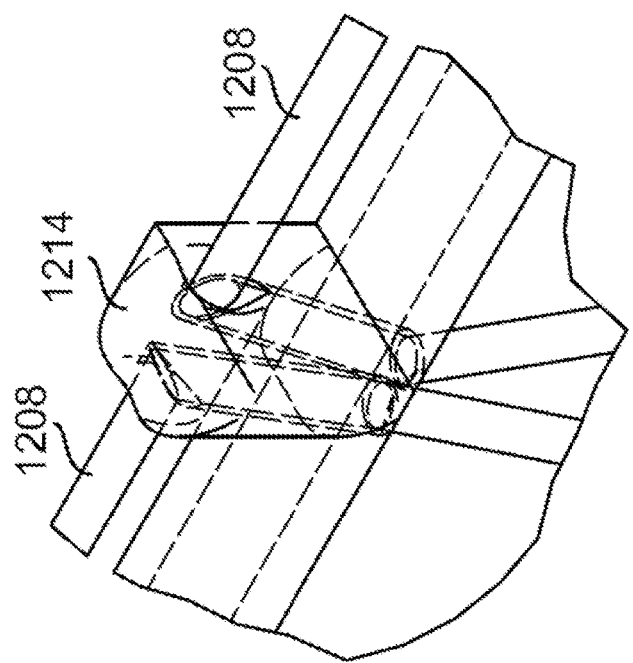
FIG. 12D illustrates an enlarged view of a sliding mechanism of a wearable device case in accordance with various embodiments of the present disclosure.
Figure 12C:
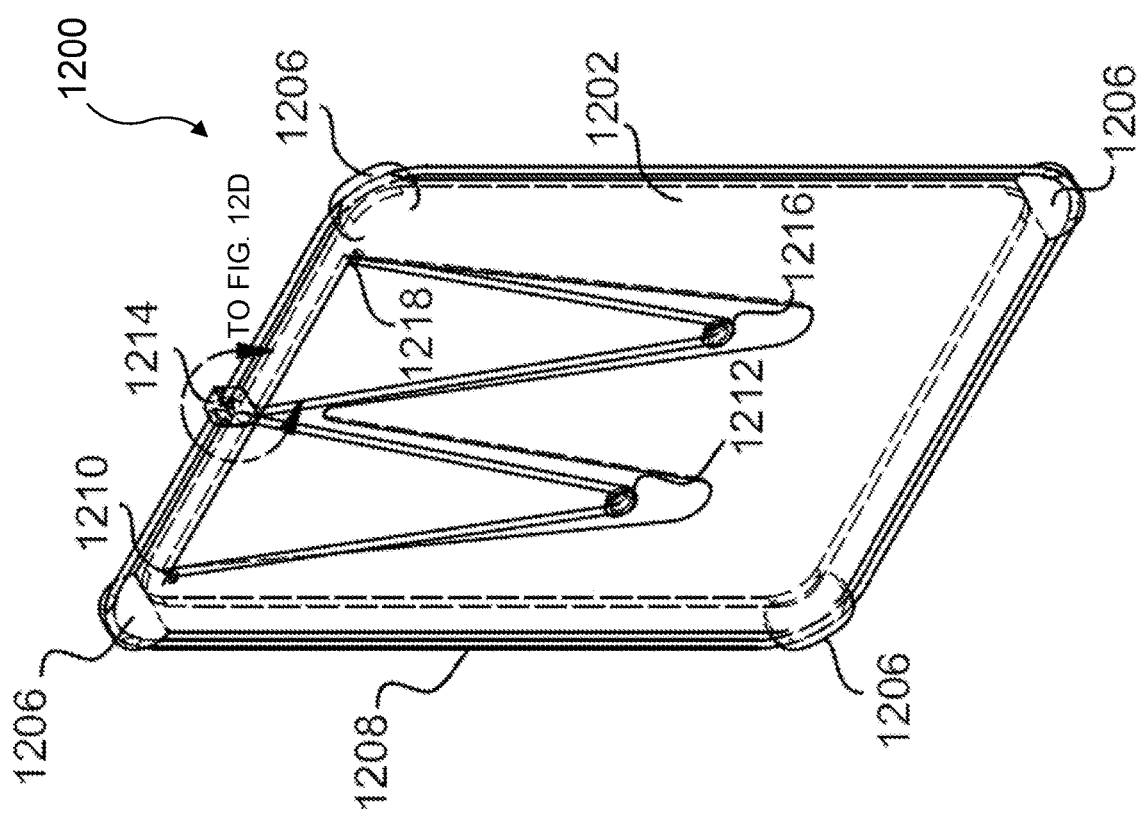
FIG. 12C illustrates a rear perspective view of a wearable device case in accordance with various embodiments of the present disclosure.
Figure 12E:
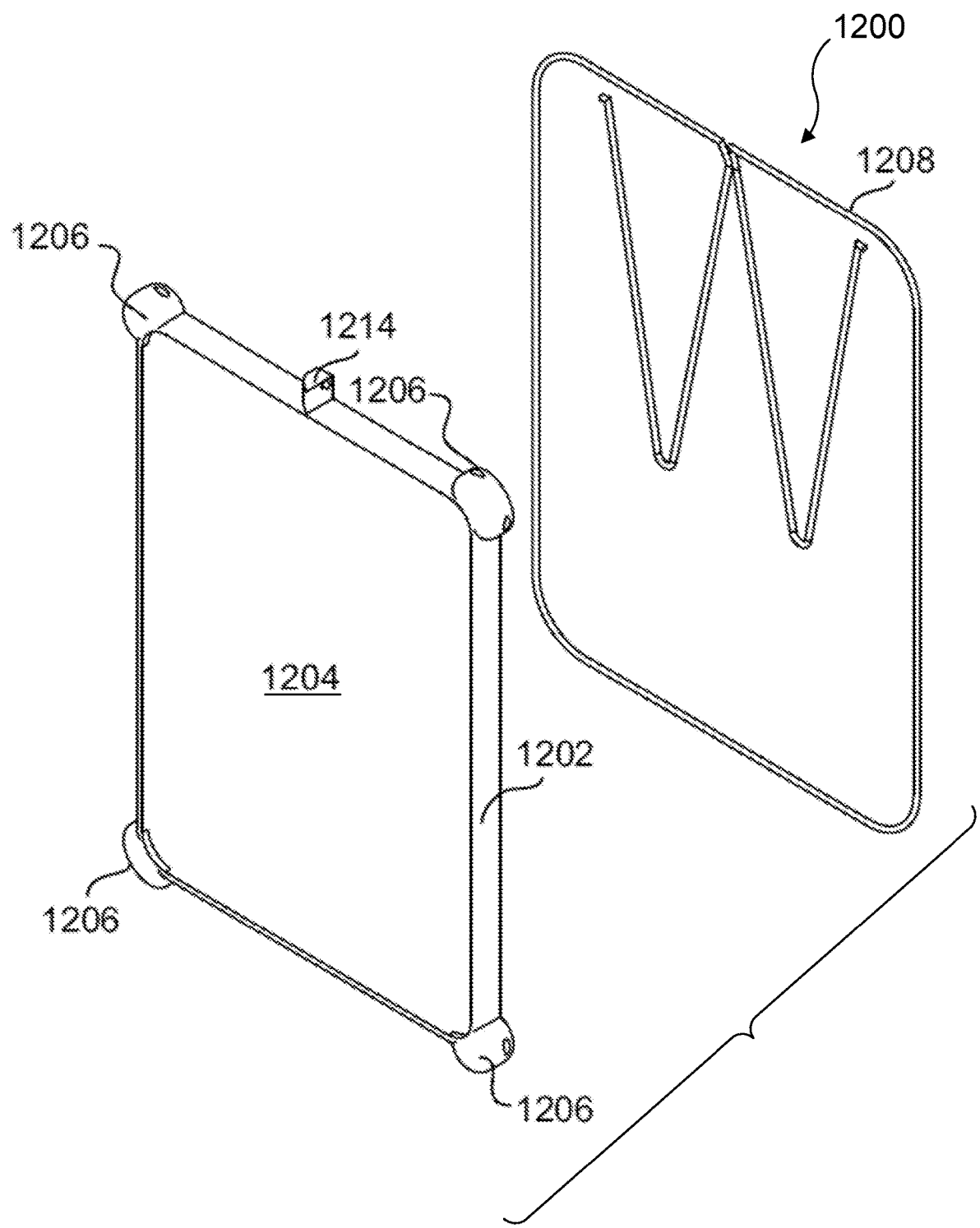
FIG. 12E illustrates an exploded front perspective view of a wearable device case in accordance with various embodiments of the present disclosure.
Figure 12F:
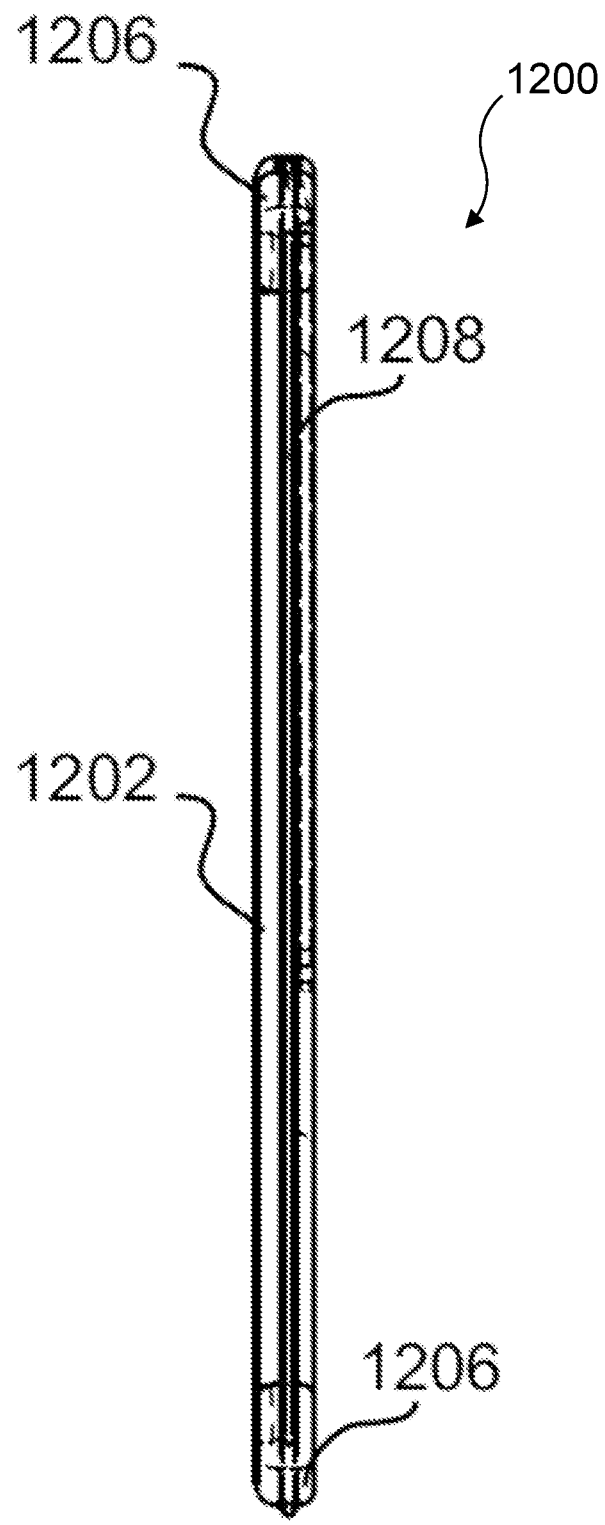
FIG. 12F illustrates a right side view of a wearable device case in accordance with various embodiments of the present disclosure.
Figure 12G:
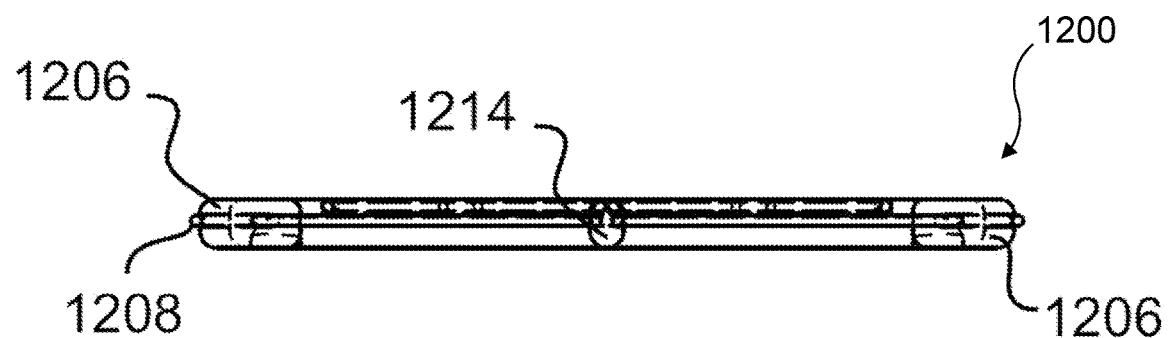
FIG. 12G illustrates a top view of a wearable device case in accordance with various embodiments of the present disclosure.
Figure 12H:
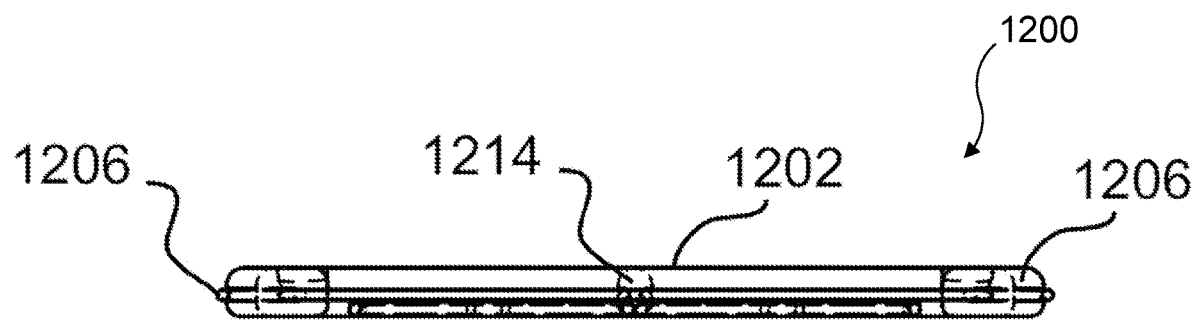
FIG. 12H illustrates a bottom view of a wearable device case in accordance with various embodiments of the present disclosure.

Referring now to FIGS. 12A-12H, there are illustrated various views of another embodiment of a mobile device case 1200. FIG. 12A illustrates a front perspective view of the case 1200, FIG. 12B illustrates a rear view of the case 1200, FIG. 12C illustrates a rear perspective view of the case 1200, FIG. 12D illustrates an enlarged view of a sliding mechanism of the case 1200, FIG. 12E illustrates an exploded front perspective view of the case 1200, FIG. 12F illustrates a right side view of the case 1200, FIG. 12G illustrates a top view of the case 1200, and FIG. 12H illustrates a bottom view of the case 1200. FIGS. 12A-12H show that the case 1200 includes a rectangular body 1202 having a recessed portion 1204 defining a space for a mobile device to reside. On the outside surface and at each of the four corners of the rectangular body 1202 are circular body portions 1206. The circular body portions 1206 may not be perfect circles and may also be other shapes. The circular body portions 1206 may be secured on the body 1202 by sliding within the slots at each of the four corners of the body 1202, via adhesive, or other means. A single flexible member 1208 runs through each of the circular body portions 1206, wrapping around the case 1200. More specifically, when the case 1200 is in a configuration for using the mobile device, the flexible member 1208 is secured at a first tether point 1210 on the back of the case 1200. The flexible member 1208 begins at the first tether point 1210 and travels in a diagonal direction down and towards the center area of the case 1200, looping around a first knob 1212 to the right of a near-center location on the back of the case 1200. The first knob 1212 may have a thin cylindrical portion for the flexible member 1208 to loop around, with a wider circular top portion to prevent the flexible member from slipping off the first knob 1212 when the flexible member 1208 is pulled tight against the first knob 1212.

From the first knob 1212, the flexible member 1208 travels diagonally up to the top center of the case 1200. At the top center of the case 1200 is a sliding member 1214. The flexible member travels up into the sliding member 1214 and out one side of the sliding member 1214, the one side being on the same side of the case as the first tether point 1210. The flexible member 1208 then travels around the perimeter of the case 1200, passing through each of the circular body portions 1206 and entering the sliding member 1214 again on the opposite side from where the flexible member exited the sliding member 1214. The sliding member 1214 may have two separate paths within the sliding member 1214 for the flexible member to travel through, as shown in FIG. 12D. After entering and traveling through the sliding member 1214 again, the flexible member 1208 travels diagonally away from the top center of the case 1200 and away from the first tether point 1210, looping around a second knob 1216. After looping around the second knob 1216, the flexible member 1208 travels diagonally up to and ending at a second tether point 1218.

Figure 12I:
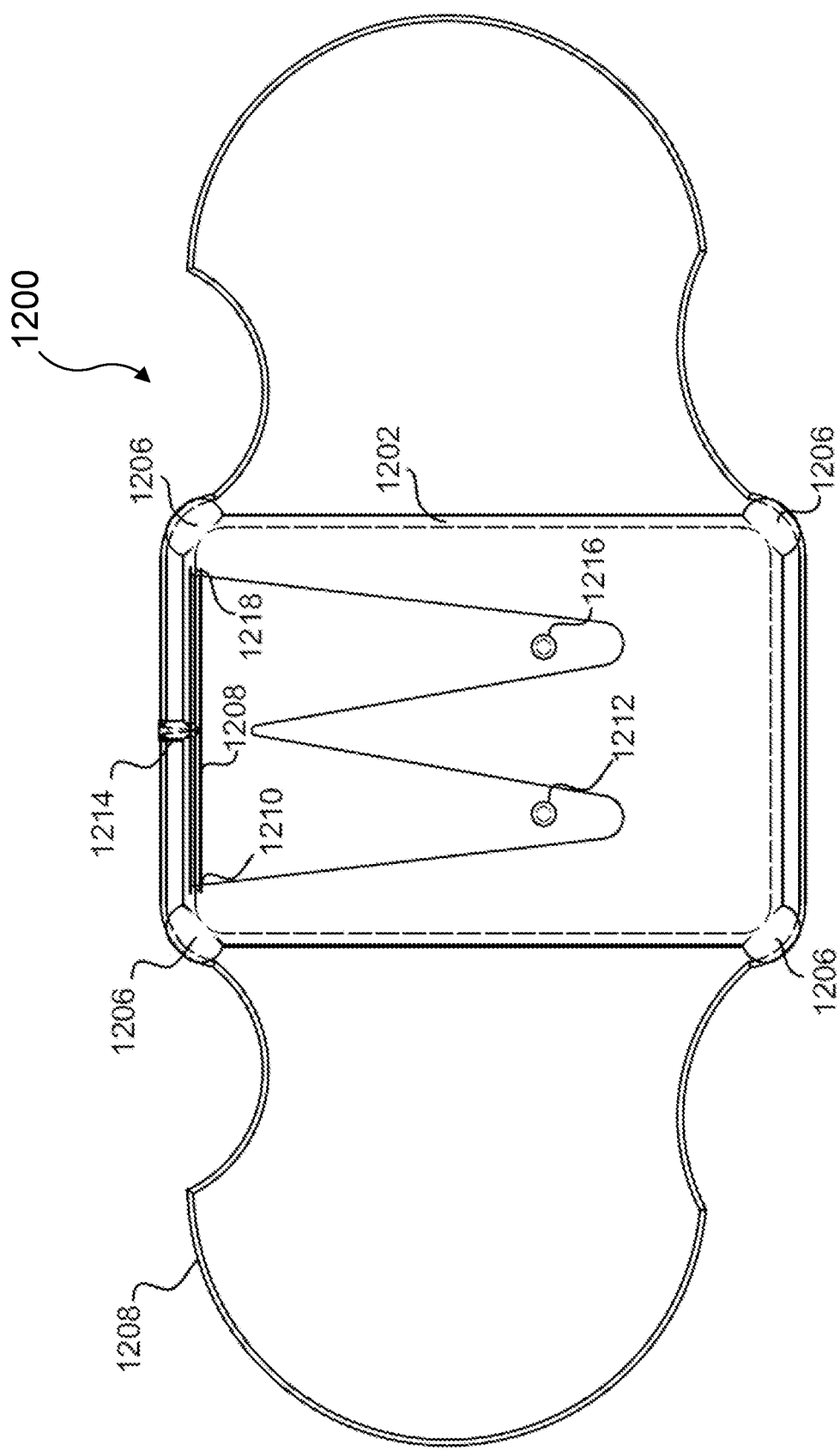
FIG. 12I illustrates a rear view of a wearable device case in a wearable configuration in accordance with various embodiments of the present disclosure.

Referring now to FIG. 12I, there is illustrated the case 1200 in a wearable configuration. To transition to a wearable configuration from that shown in FIGS. 12A-12H, the flexible member 1208 is pulled off of the first and second knobs 1212 and 1216. The flexible member 1208 is then pulled through the sliding member 1214 on each side of the sliding member 1214, until the flexible member 1208 is pulled tight against the first and second tether points 1210 and 1218, extending the flexible member 1208 out from the body 1202, as shown in FIG. 12I. To convert the case 1200 back into a configuration for using the mobile device, the flexible member 1208 is pulled back through the sliding member 1214 on each side and placed back around the knobs 1212 and 1216.

Figure 13A:
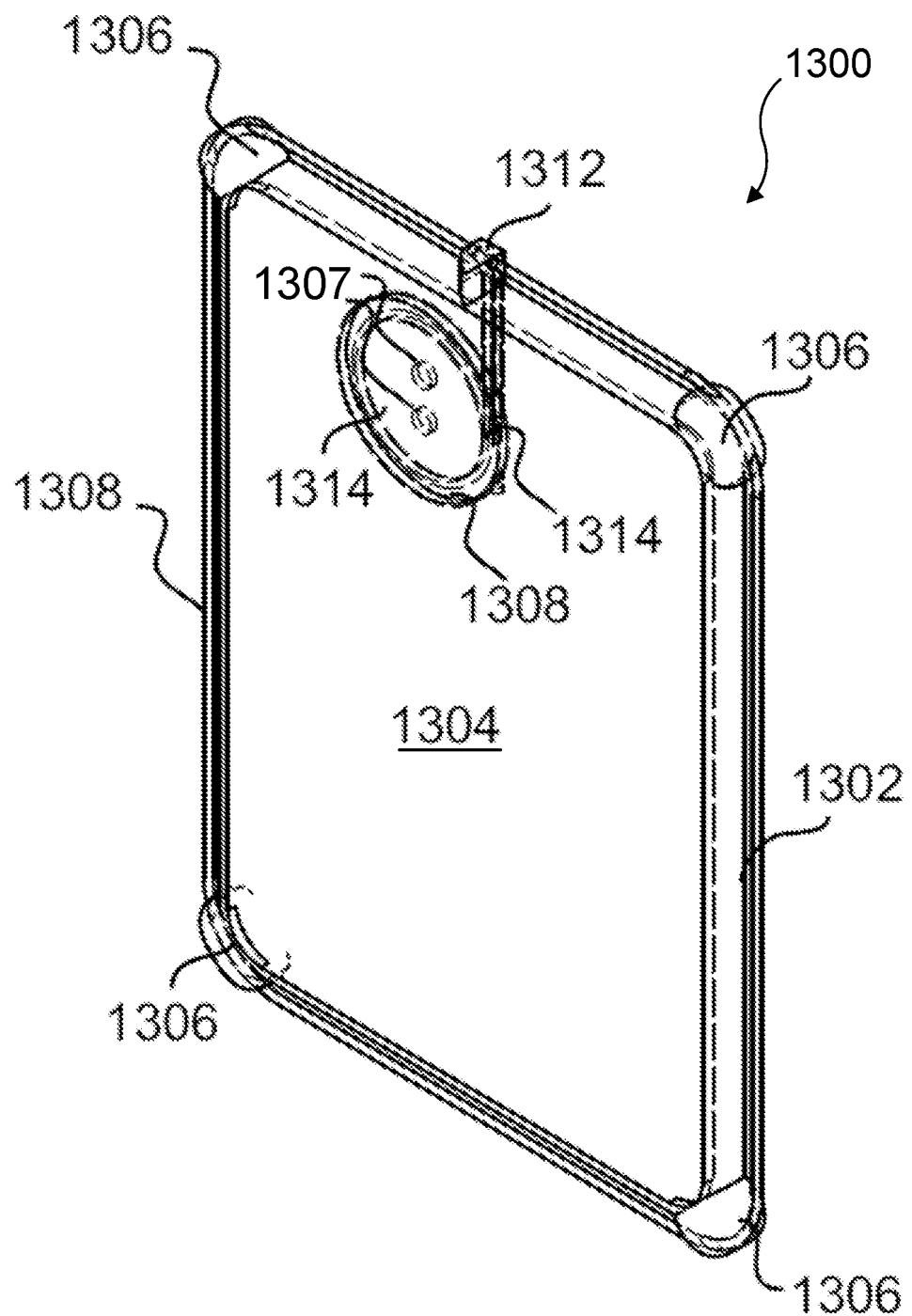
FIG. 13A illustrates a front perspective view of a wearable device case in accordance with various embodiments of the present disclosure.
Figure 13B:
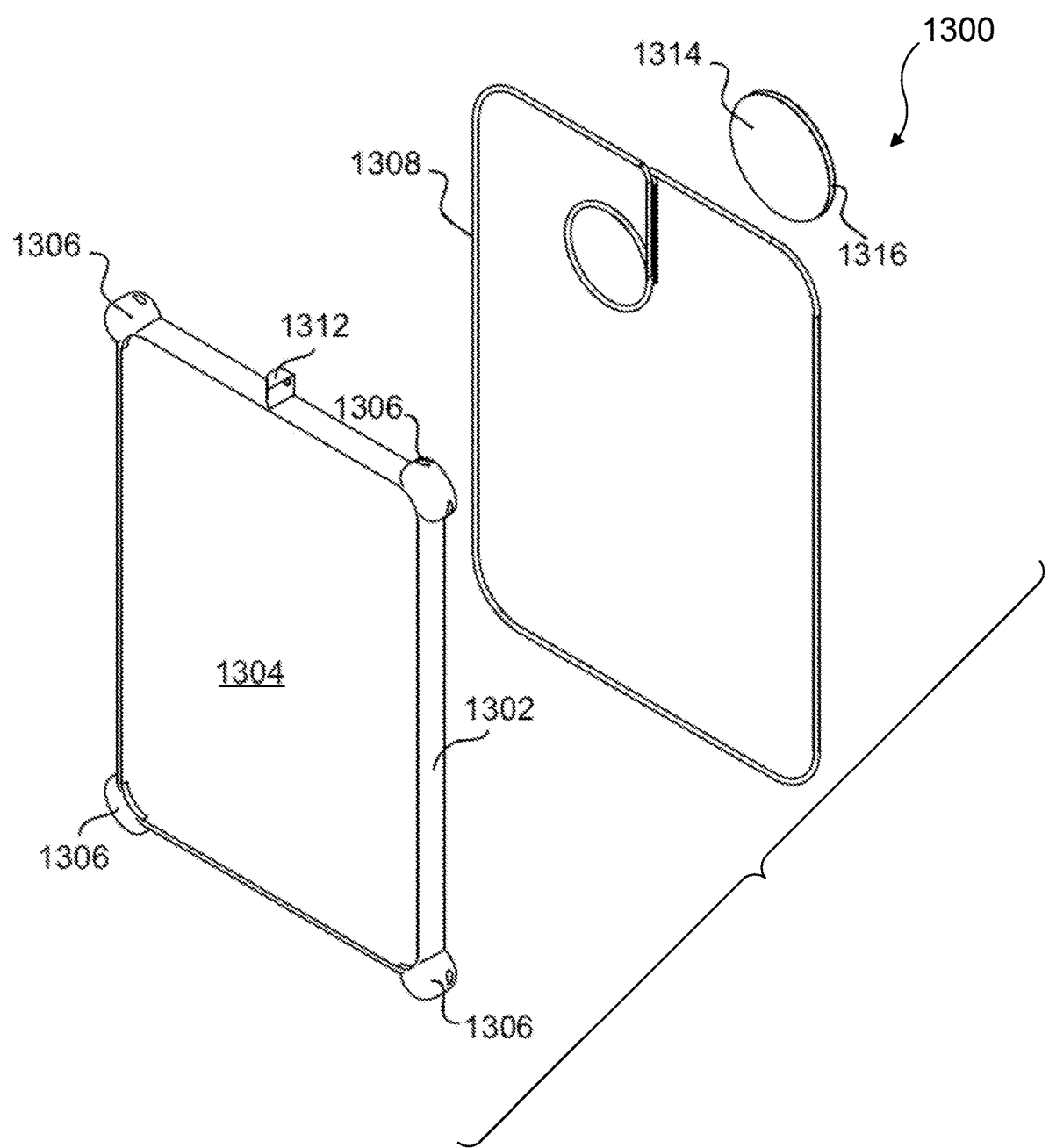
FIG. 13B illustrates an exploded front perspective view of a wearable device case in accordance with various embodiments of the present disclosure.
Figure 13E:
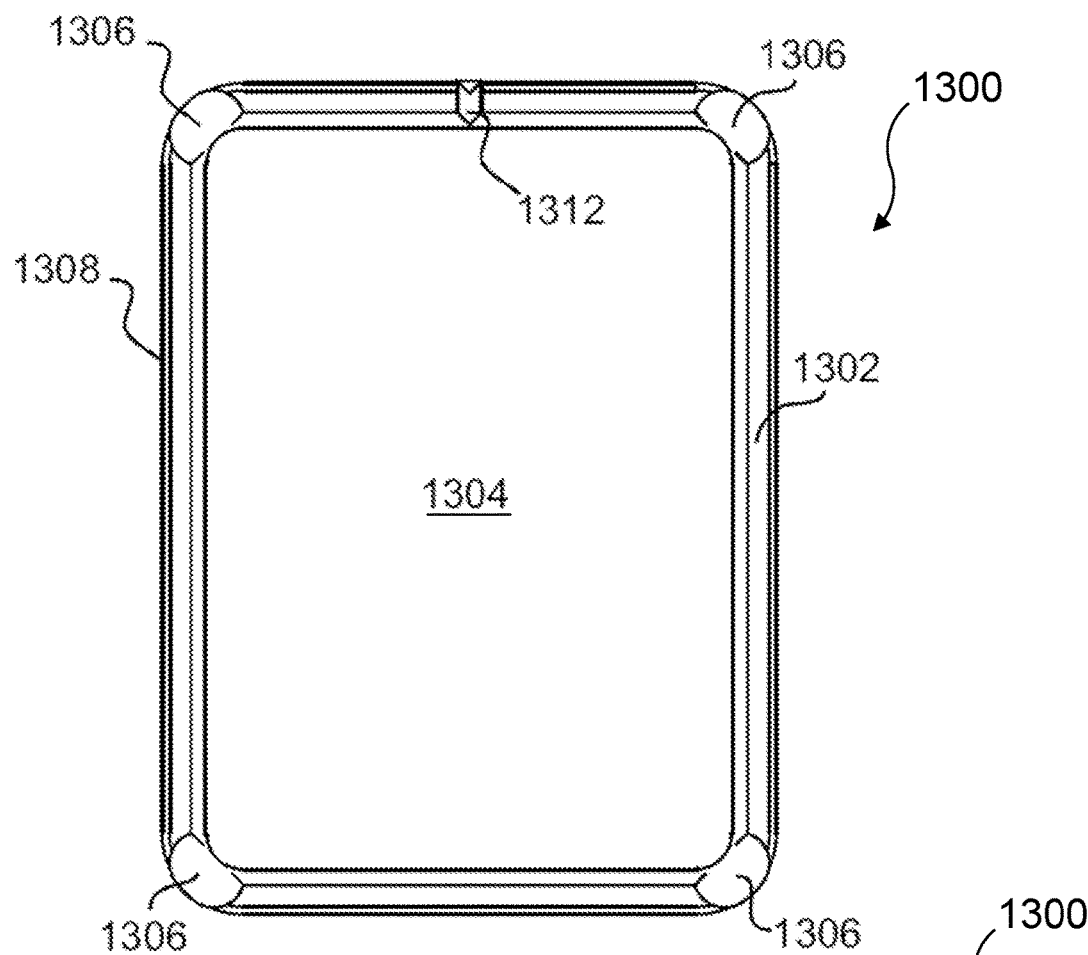
FIG. 13E illustrates front view of a wearable device case in accordance with various embodiments of the present disclosure.
Figure 13F:
FIG. 13F illustrates a bottom view of a wearable device case in accordance with various embodiments of the present disclosure.
Figure 13G:
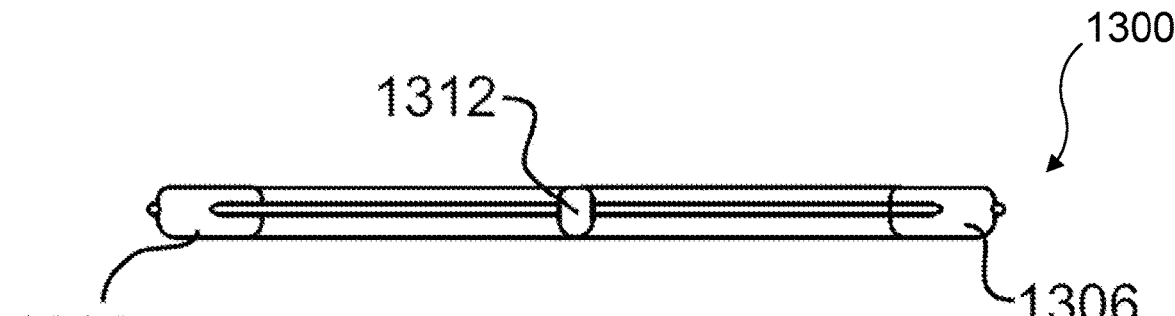
FIG. 13G illustrates a top view of a wearable device case in accordance with various embodiments of the present disclosure.

Referring now to FIGS. 13A-13G, there are illustrated various views of another embodiment of a mobile device case 1300. FIG. 13A illustrates a front perspective view of the case 1300. FIG. 13B illustrates an exploded front perspective view of the case 1300. FIG. 13C illustrates a front view of the case 1300, FIG. 13D illustrates a rear view of the case 1300, FIG. 13E illustrates another front view of the case 1300, FIG. 13F illustrates a bottom view of the case 1300, and FIG. 13G illustrates a top view of the case 1300. The case 1300 includes a body 1302, a recessed portion 1304, circular body portions 1306, a flexible member 1308 running through the circular body portions 1306 and through a sliding member 1312. However, the case 1300 instead includes a wheel 1314 that is partially internal to the case 1300, with a back end of the wheel 1314 protruding from the back of the case 1300. In addition, the circular body portion 1312 could be recessed or completely encapsulated by the back wall of the case. The flexible member 1308 is secured at a tether point 1316 on the wheel 1314. When the case 1300 is in a configuration to use the mobile device, the flexible member 1308 is wrapped around the wheel until the flexible member 1308 is pulled tightly around the perimeter of the case 1300. To convert the case 1300 into a wearable configuration, the wheel 1314 is turned so that the flexible member 1308 is unwrapped from around the wheel 1314, allowing the flexible member 1308 to be pulled out from the sliding member 1312 in a similar manner to the case 1200. The wheel 1314 additionally has on the back side finger holes 1307 to allow a user to easily turn the wheel 1314 to wrap or unwrap the flexible member 1308 from the wheel 1314. The wheel can be spring loaded, have a pin/slot, or clicking mechanism to hold it in place when in the different modes.

Figure 14B:
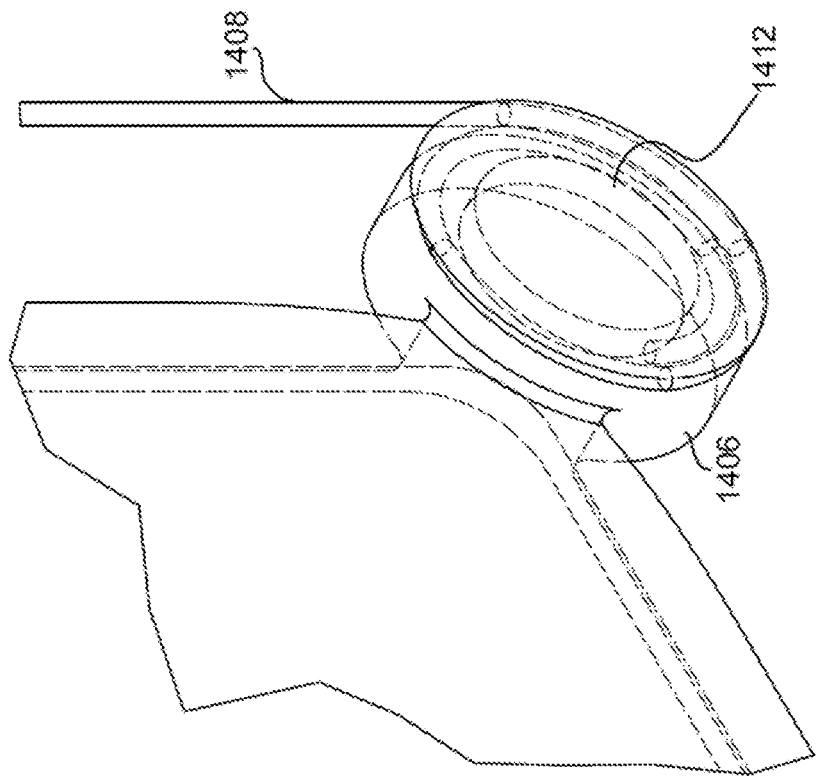
FIG. 14B illustrates an enlarged view of a spool on a wearable device case in accordance with various embodiments of the present disclosure.
Figure 14A:
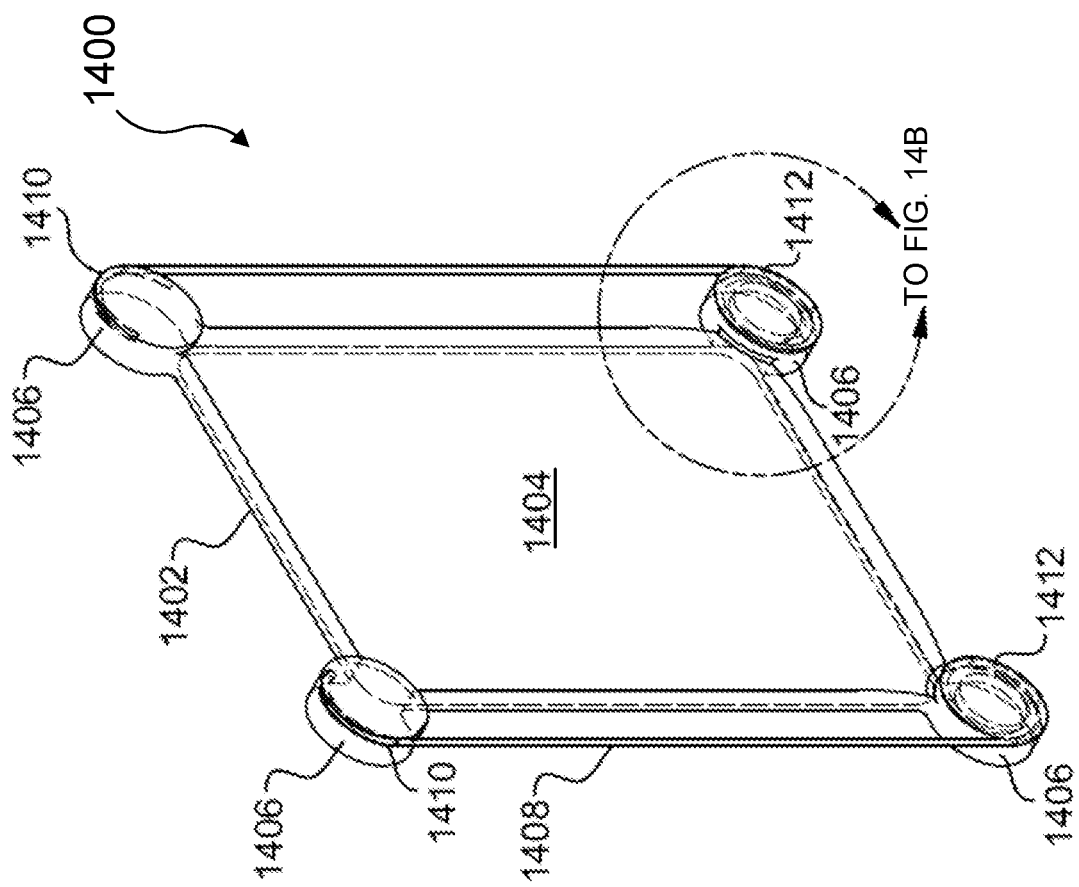
FIG. 14A illustrates a rear perspective view of a wearable device case in accordance with various embodiments of the present disclosure.
Figure 14C:
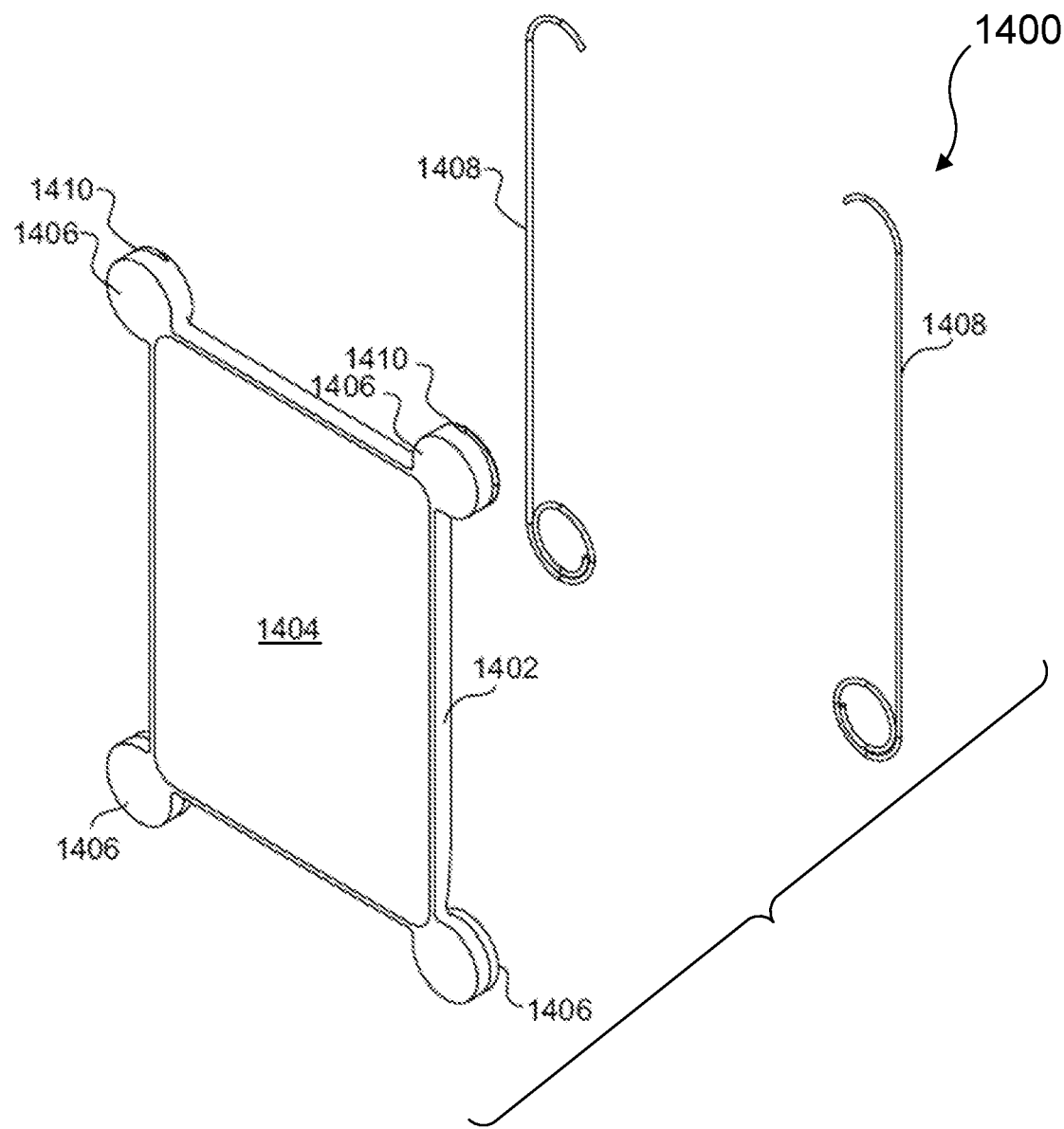
FIG. 14C illustrates an exploded front perspective view of a wearable device case in accordance with various embodiments of the present disclosure.
Figure 14F:
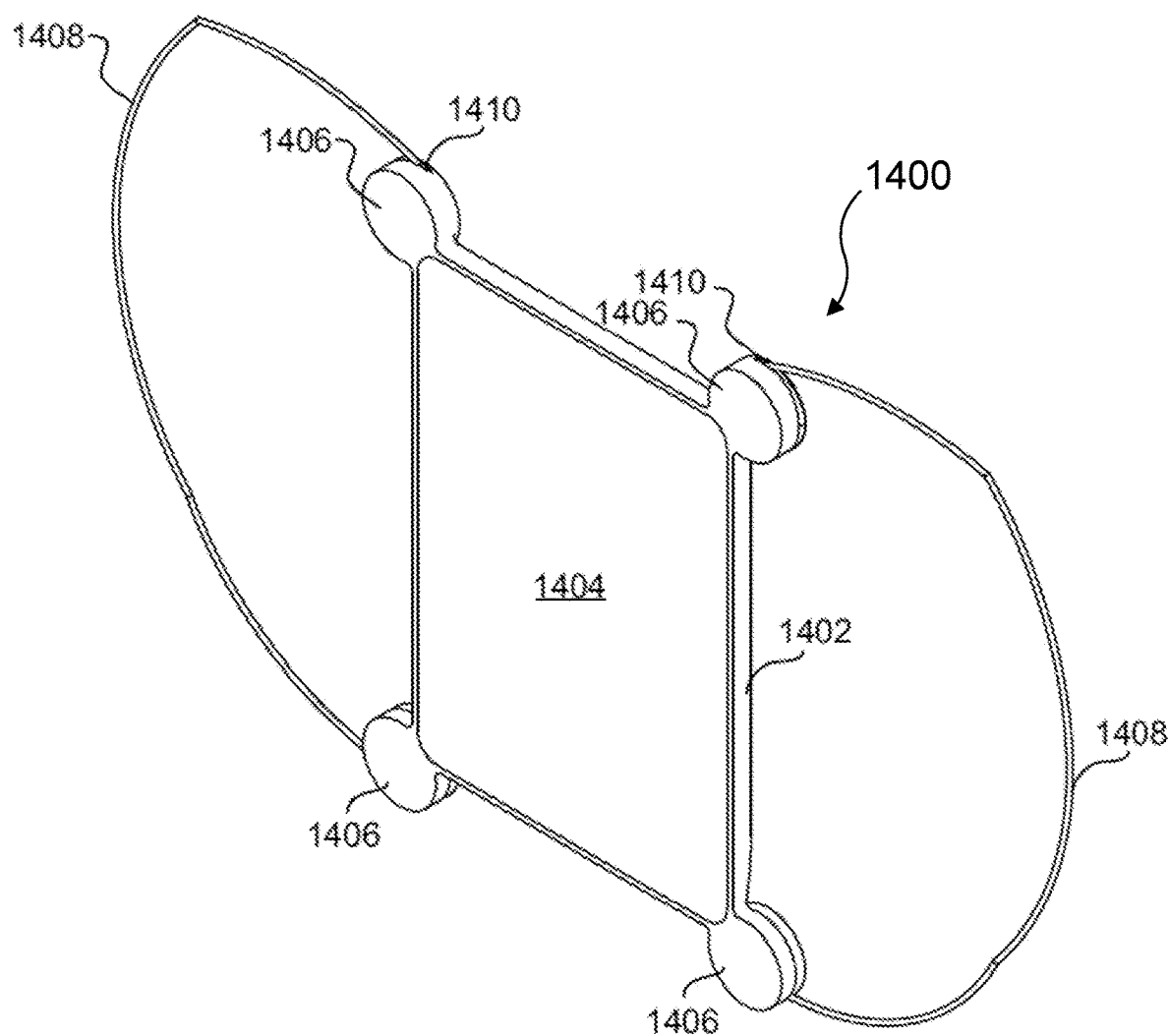
FIG. 14F illustrates a front perspective view of a wearable device case in a wearable configuration in accordance with various embodiments of the present disclosure.

Referring now to FIGS. 14A-14F, there are illustrated various views of another embodiment of a mobile device case 1400. FIG. 14A illustrates a rear perspective view of the case 1400, FIG. 14B illustrates an enlarged view of a spool on the case 1400, FIG. 14C illustrates an exploded front perspective view of the case 1400, FIG. 14D illustrates a front view of the case 1400, FIG. 14E illustrates a rear view of the case 1400, and FIG. 14F illustrates a front perspective view of the case 1400 in a wearable configuration. The case 1400 includes a rectangular body 1402 having a recessed portion 1404 capable of receiving a mobile device. The case 1400 further includes circular body portions 1406 positioned on the outside of each of the four corners of the body 1402. Flexible members 1408 are each connected at one end in a groove 1410 in the top circular body portions 1406 and at the other end by wrapping around a spool 1412 contained within the bottom circular body portions 1406. The flexible members 1408 are wrapped or unwrapped from the spool 1412 in order to convert the case 1400 between a usable configuration and a wearable configuration.

Figure 15D:
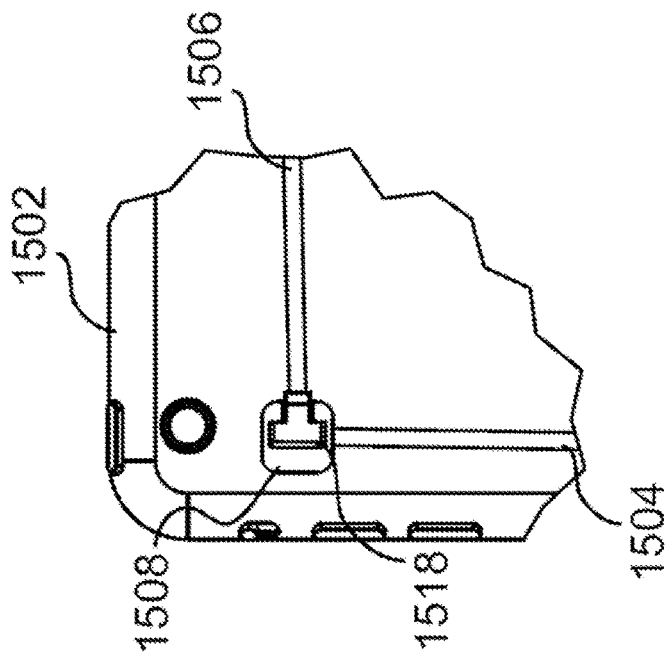
FIG. 15D illustrates an enlarged rear view of a portion of a mobile device wearable conversion apparatus showing a secured flexible member in accordance with various embodiments of the present disclosure.
Figure 15C:
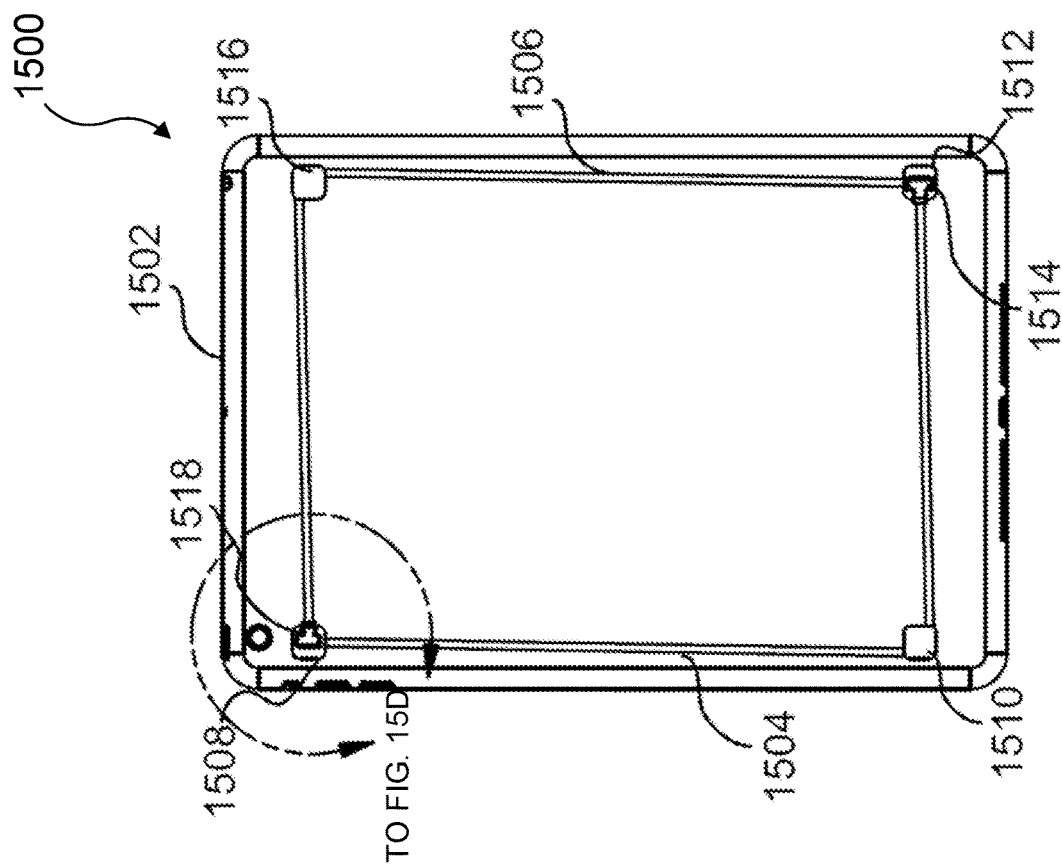
FIG. 15C illustrates a rear view of a mobile device wearable conversion apparatus installed on a mobile device in accordance with various embodiments of the present disclosure.
Figure 15E:
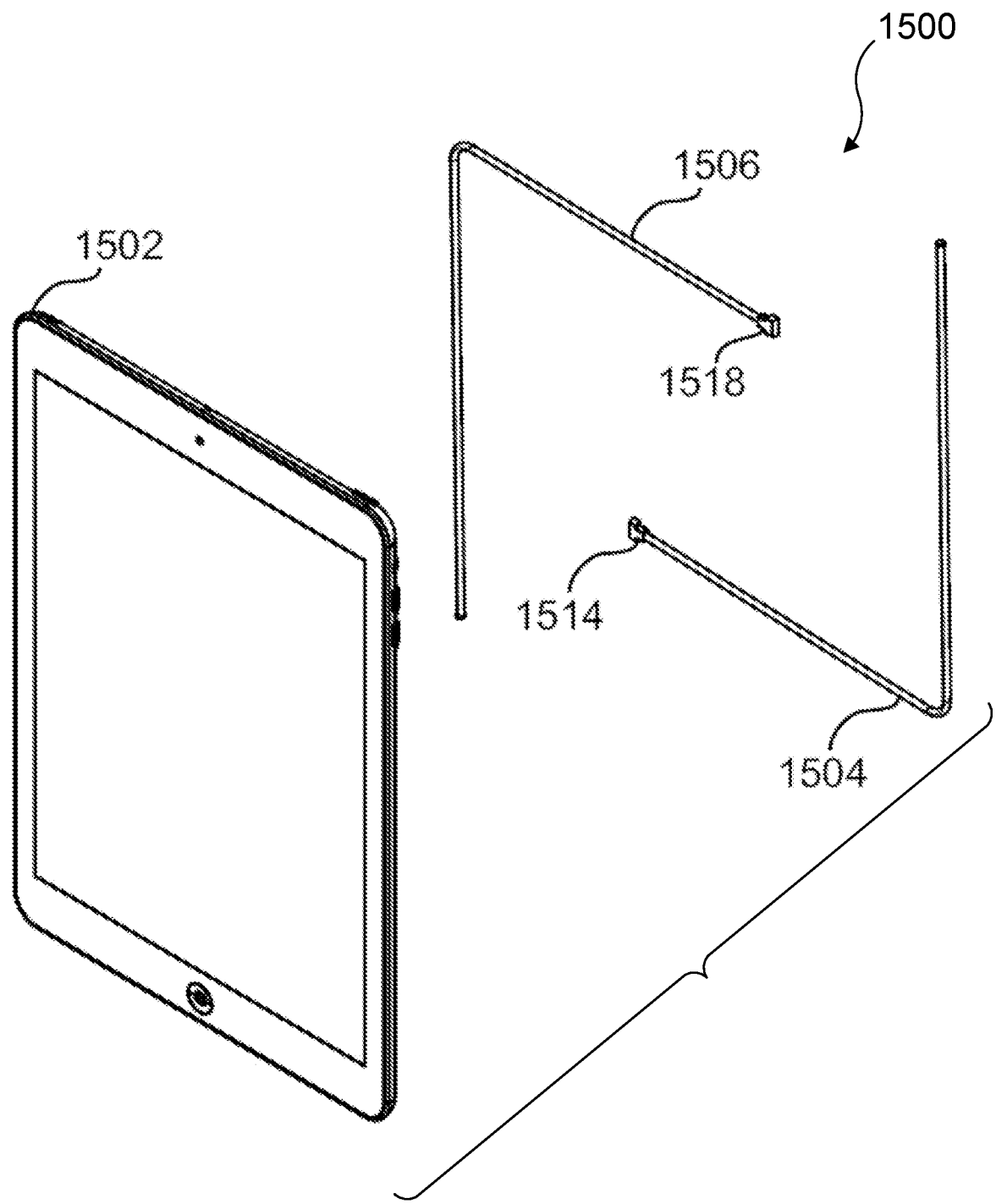
FIG. 15E illustrates an exploded front perspective view of a mobile device wearable conversion apparatus installed on a mobile device in accordance with various embodiments of the present disclosure.
Figure 15F:
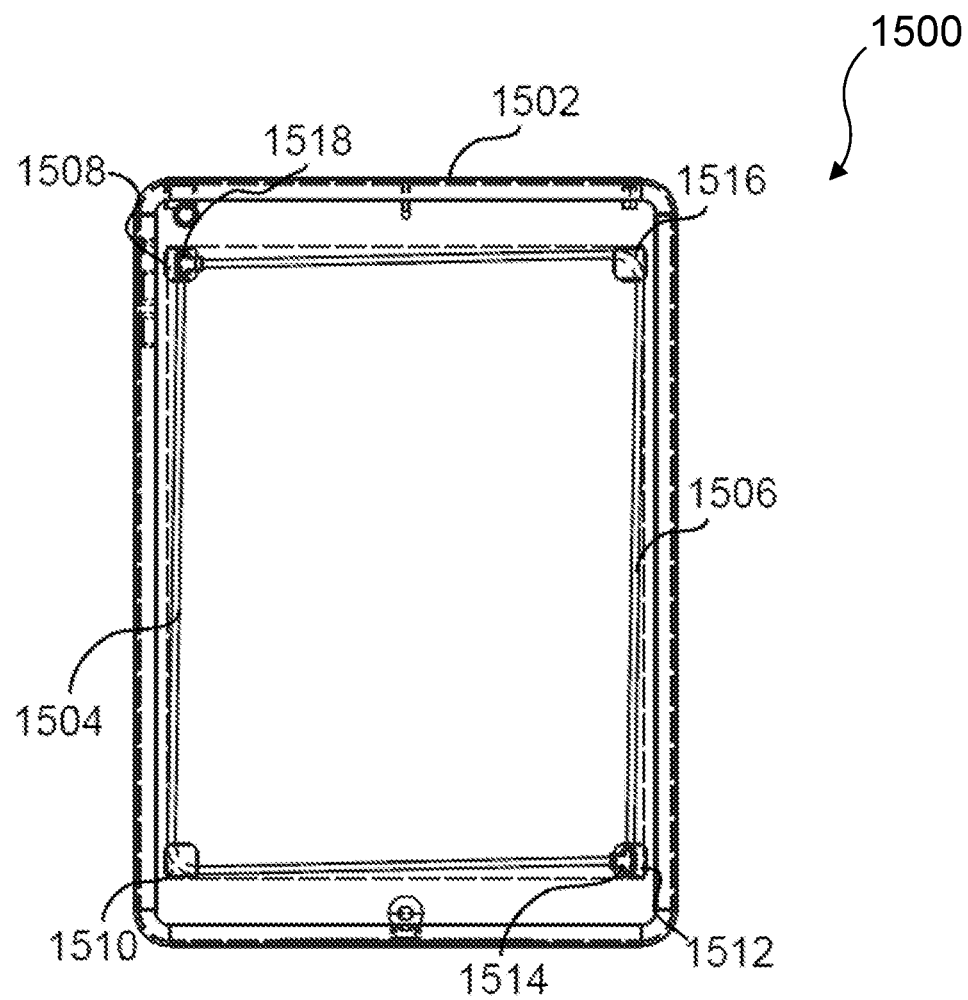
FIG. 15F illustrates a rear view of a mobile device wearable conversion apparatus installed on a mobile device in accordance with various embodiments of the present disclosure.
Figure 15G:
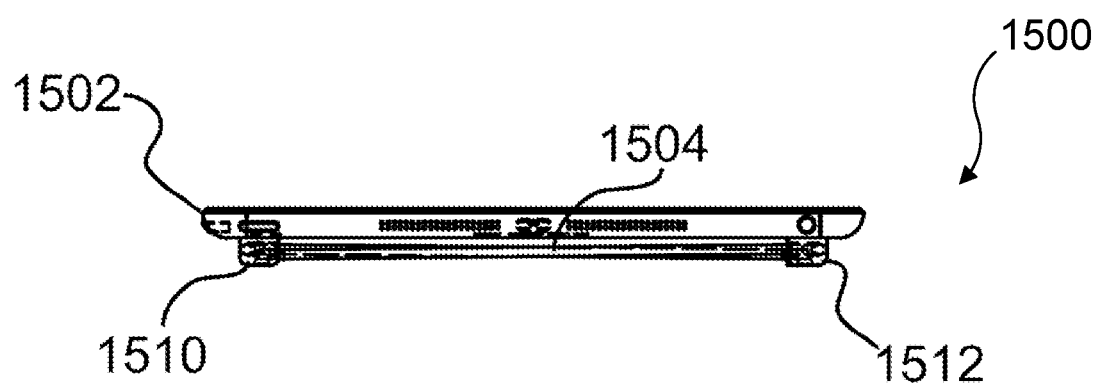
FIG. 15G illustrates a bottom view of a mobile device wearable conversion apparatus installed on a mobile device in accordance with various embodiments of the present disclosure.
Figure 15H:
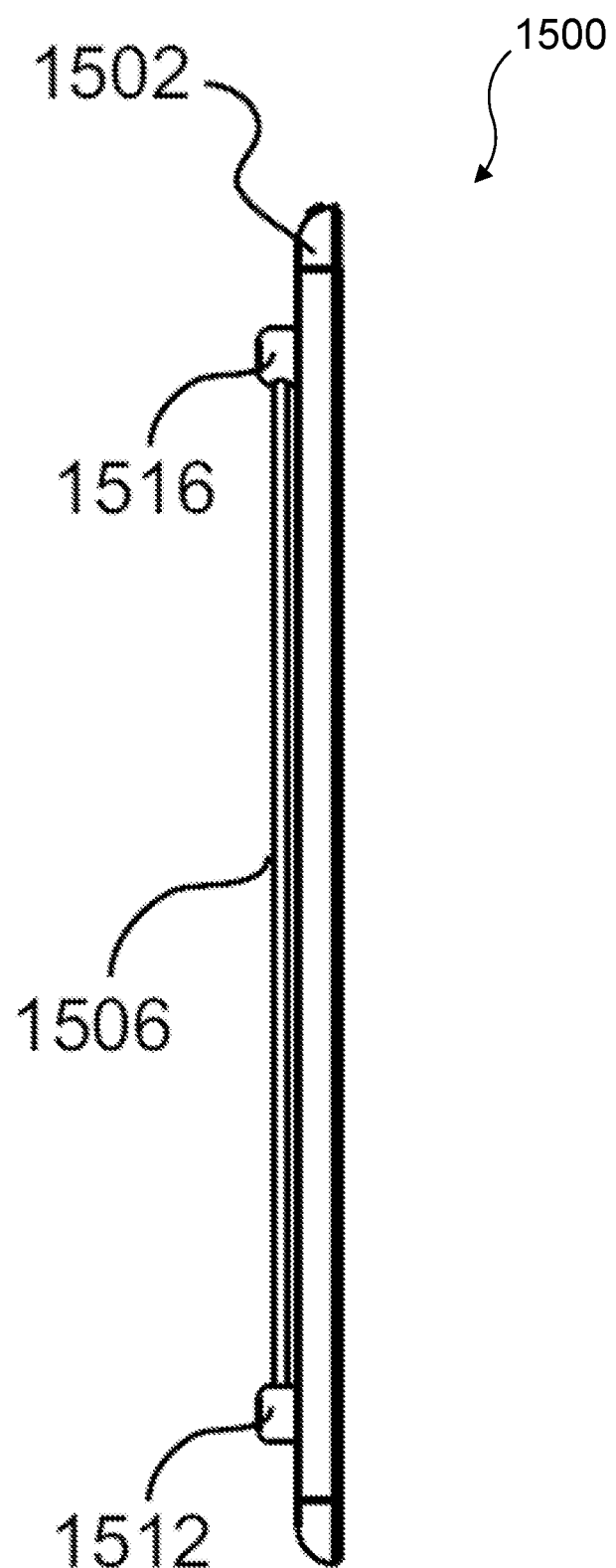
FIG. 15H illustrates a left side view of a mobile device wearable conversion apparatus installed on a mobile device in accordance with various embodiments of the present disclosure.

Referring now to FIGS. 15A-15I, there are illustrated various views of one embodiment of a mobile device wearable conversion apparatus 1500. FIG. 15A illustrates a rear perspective view of the apparatus installed on a mobile device, FIG. 15B illustrates an enlarged rear perspective view of a portion of the apparatus showing a secured flexible member, FIG. 15C illustrates a rear view of the apparatus installed on a mobile device, FIG. 15D illustrates an enlarged rear view of a portion of the apparatus showing a secured flexible member, FIG. 15E illustrates an exploded front perspective view of the apparatus 1500 installed on a mobile device, FIG. 15F illustrates a rear view of a mobile device with the apparatus 1500 installed, FIG. 15G illustrated a bottom view of the apparatus installed on a mobile device, and FIG. 15H illustrates a left side view of the apparatus installed on a mobile device.

The apparatus 1500 is installed on a mobile device 1502 and includes a first flexible member 1504 and a second flexible member 1506. The first flexible member 1504 is securely coupled to a first snap 1508 situated on the back of the mobile device 1502 near one corner of the mobile device. The first flexible member 1504 travels vertically down the back of the mobile device 1502 and into a first arched slide path piece 1510, diverting the flexible member over to the other side of the mobile device along a path near the bottom of the mobile device to reach a second snap 1512 situated opposite of the first snap 1508 on the back of the mobile device 1502. An end of the first flexible member 1504 is installed within the second snap 1512 by inserting into the second snap 1512 a first head piece 1514 coupled to the end of the first flexible member 1504. The first head piece 1514 is capable of being removed from the second snap 1512. Once the first head piece 1514 is removed, the first flexible member 1504 can be pulled away from the mobile device, causing the first flexible member 1504 to move through the first arched slide path piece 1510 until the first head piece 1514 comes into contact with the first arched slide path piece 1510, the first arched slide path piece 1510 preventing the first flexible member 1504 from extending further. Thus, the first flexible member 1504 creates a wearable strap for a user to wear on the body.

The apparatus 1500 further includes the second flexible member 1506 securely coupled to the second snap 1512. The second flexible member 1506 travels vertically up the back of the mobile device 1502 and into a second arched slide path piece 1516, diverting the flexible member over to the other side of the mobile device along a path near the top of the mobile device to reach the first snap 1508 situated opposite of the second snap 1512 on the back of the mobile device 1502. An end of the second flexible member 1506 is installed within the first snap 1508 by inserting into the first snap 1508 a second head piece 1518 coupled to the end of the second flexible member 1506. The second head piece 1518 is capable of being removed from the first snap 1508. Once the second head piece 1518 is removed, the second flexible member 1506 can be pulled away from the mobile device, causing the second flexible member 1506 to move through the second arched slide path piece 1516 until the second head piece 1518 comes into contact with the second arched slide path piece 1516, the second arched slide path piece 1516 preventing the second flexible member 1506 from extending further. Thus, the second flexible member 1506 also creates a wearable strap for a user to wear on the body. Note: This strap design can be recessed into the tablet when in use and then only become visible when wearing the device.

Figure 16C:
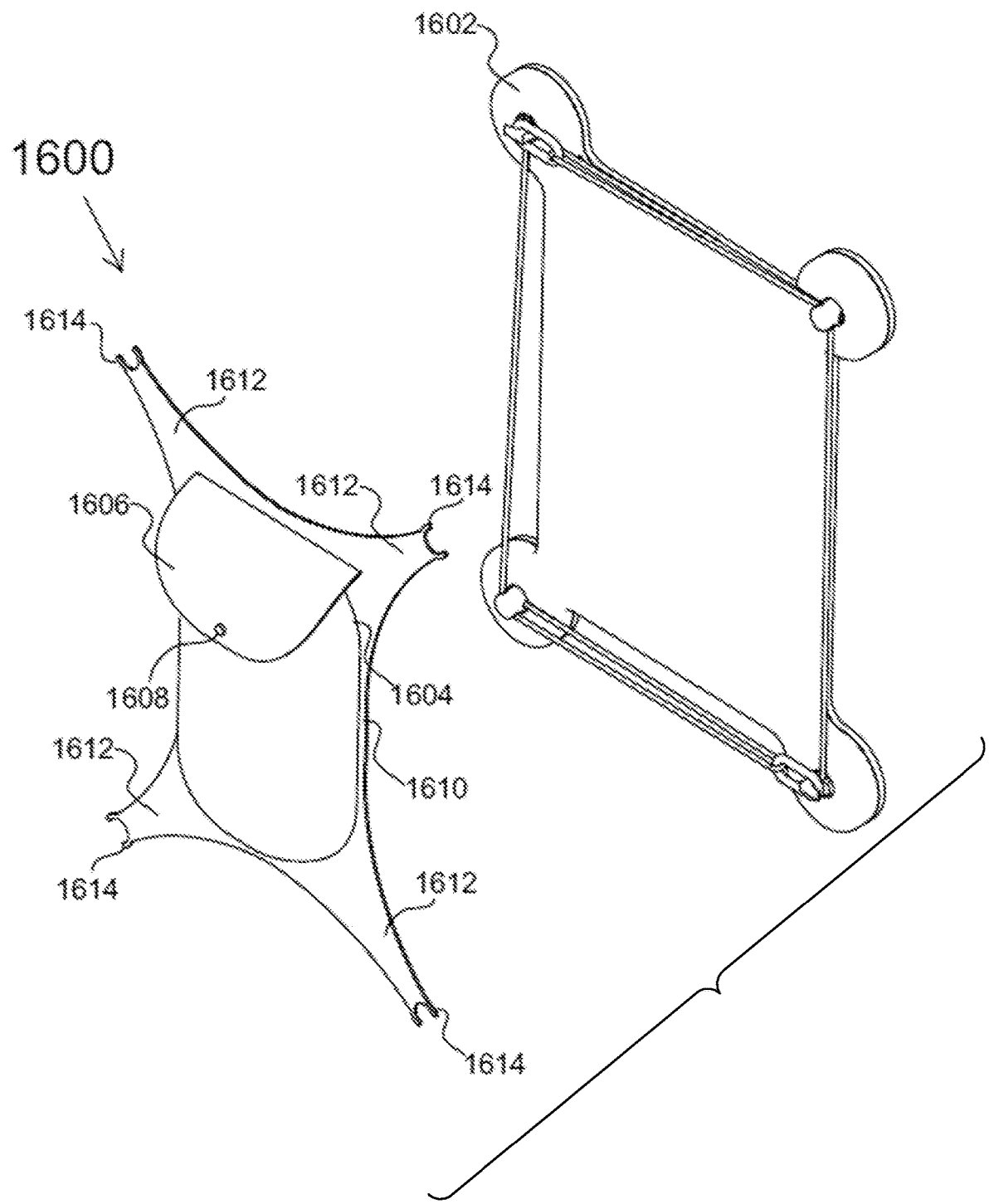
FIG. 16C illustrates an exploded rear perspective view of a pouch or insulated lunch bag accessory installed on a back of a wearable device case in accordance with various embodiments of the present disclosure.

Referring now to FIG. 16A-16C, there are illustrated various views of one embodiment of a pouch or insulated lunch bag accessory 1600 for installation on a mobile device case 1602. FIG. 16A illustrates a rear view of the pouch accessory 1600 on the back of the mobile device case 1602, FIG. 16B illustrates a left side view of the pouch accessory 1600 on the back of the mobile device case 1602, and FIG. 16C illustrates an exploded rear perspective view of the pouch accessory 1600 and the mobile device case 1602. The pouch accessory 1600 includes a pouch portion 1604 for placing items within, and a flap portion 1606 connected to the pouch portion 1604 that can be folded over an opening in the pouch portion 1604, the flap portion 1606 having a closing mechanism 1608. The pouch portion 1604, and optionally the flap portion 1606 as well, is connected to a base 1610 having arms 1612 extending out diagonally from the center of the base 1610 and from the pouch portion 1604. Each of the arms 1612 end in a pronged arc portion 1614 that can be inserted onto a structure on the case 1602, such as the snaps and slides disclosed in some embodiments and as shown in FIGS. 16A-16C, to hold the pouch accessory 1600 onto the back of the case 1602. The function of the pronged arced portion can be achieved with a hook that will hook over the slides and snaps. In addition, the pouch can be secured to the case with Velcro, one or more magnets, or any other hooking or clasping mechanism (pin in slot). Adhesive or other means may also be used to more permanently secure the pouch accessory 1600 onto the back of the case 1602. The pouch or insulated lunch bag can be closed with a flap (as shown), a zipper, Velcro, or bungee pocket (like what is on the back of a car seat).

Figure 17A:
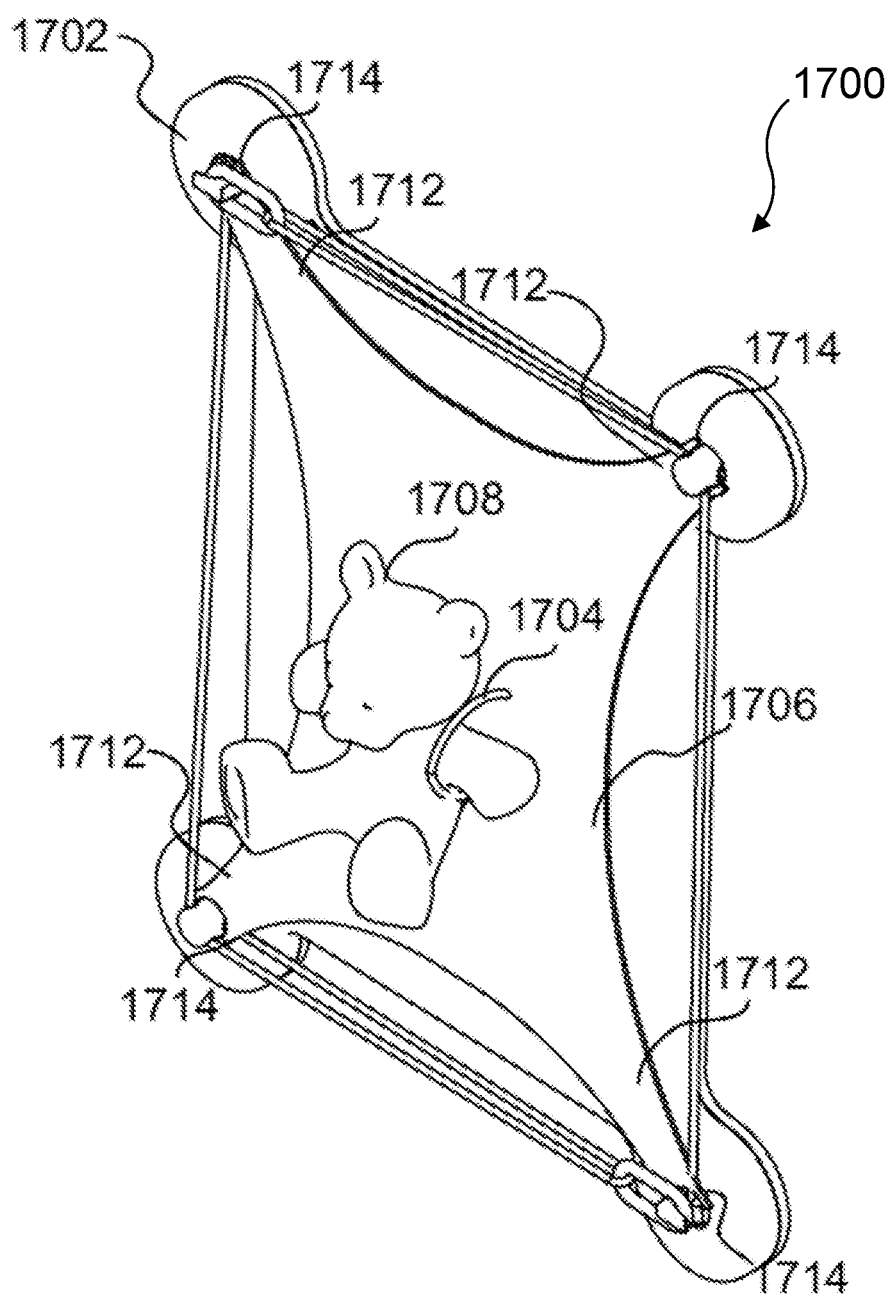
FIG. 17A illustrates a rear perspective view of a toy harness accessory installed on a back of a wearable device case in accordance with various embodiments of the present disclosure.
Figure 17B:
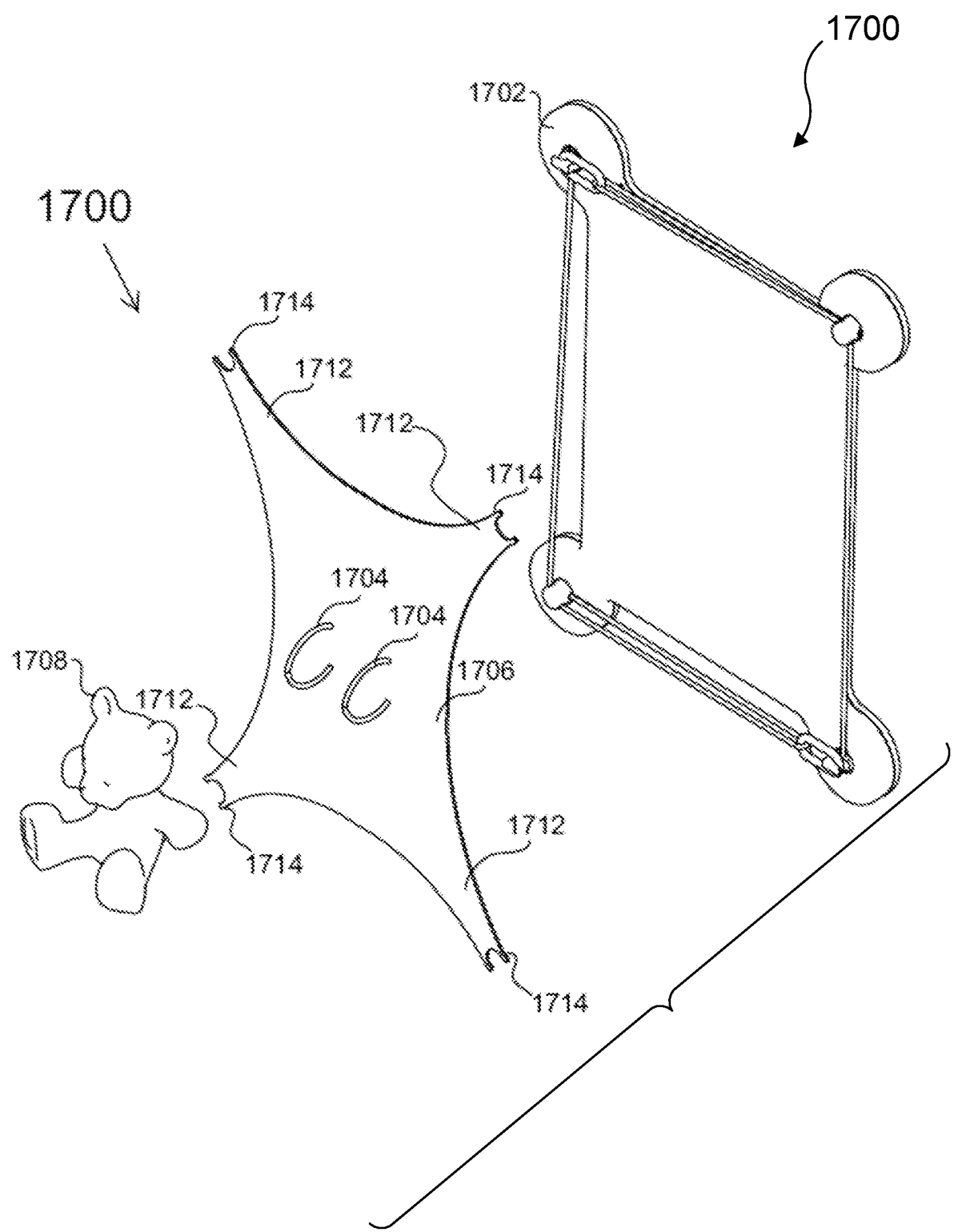
FIG. 17B illustrates an exploded rear perspective view of a toy harness accessory installed on a back of a wearable device case in accordance with various embodiments of the present disclosure.
Figure 17D:
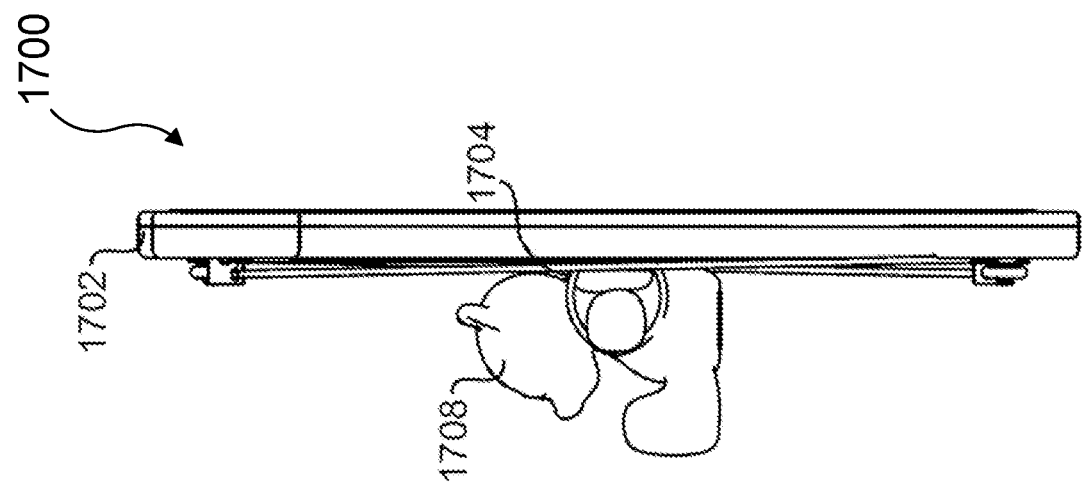
FIG. 17D illustrates a left side view of a toy harness accessory installed on a back of a wearable device case in accordance with various embodiments of the present disclosure.
Figure 17C:
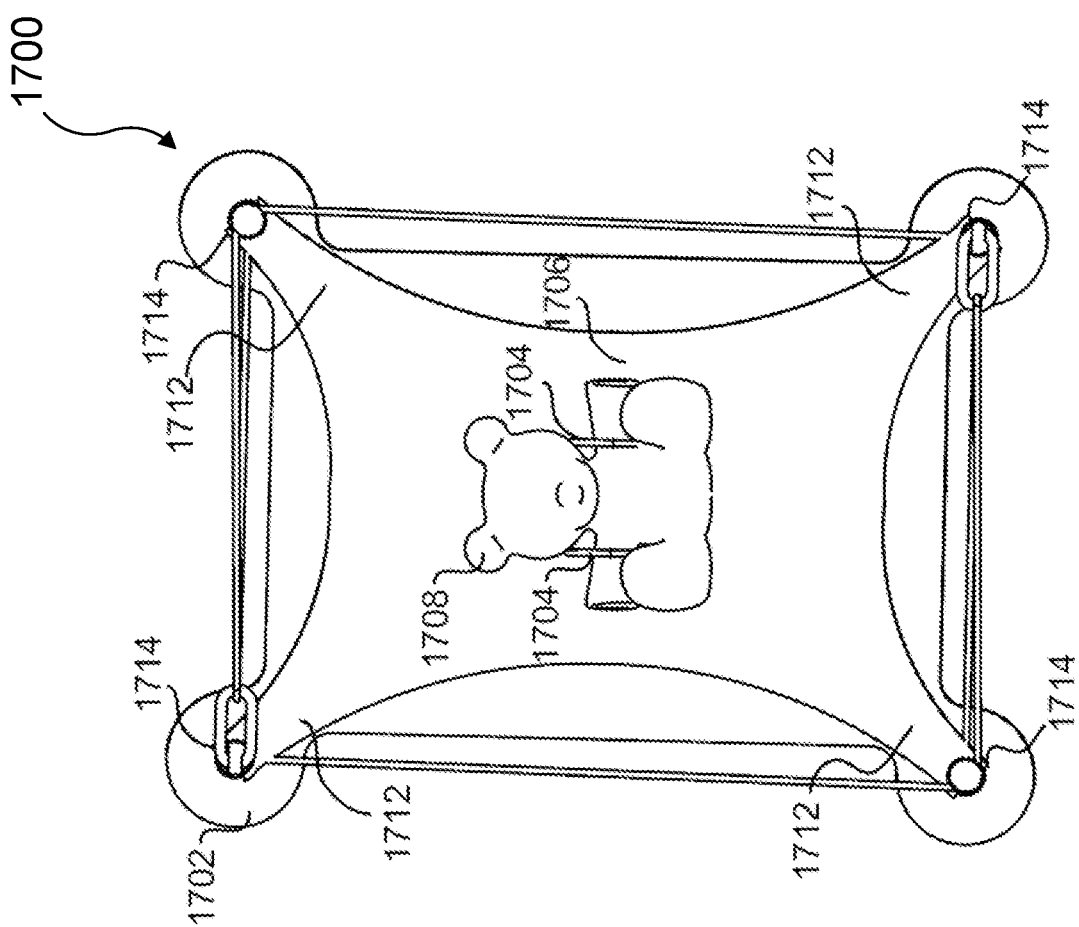
FIG. 17C illustrates a rear view of a toy harness accessory installed on a back of a wearable device case in accordance with various embodiments of the present disclosure.

Referring now to FIGS. 17A-17D, there are illustrated various views of one embodiment of a toy harness accessory 1700. FIG. 17A illustrates a rear perspective view of the toy harness accessory 1700 on the back of a mobile device case 1702, FIG. 17B illustrates an exploded rear perspective view of the toy harness accessory 1700 and the mobile device case 1702, FIG. 17C illustrates a rear view of the toy harness accessory 1700 on the back of the mobile device case 1702, and FIG. 17D illustrates a left side view of the toy harness accessory 1700 on the back of the mobile device case 1702. The toy harness accessory 1700 includes one or more harnesses 1704 extending from a base 1706, the one or more harnesses 1704 allowing for portions of a toy 1708 to be inserted within the harnesses 1704 to hold the toy 1708 in place against the base 1706. The base 1706 has arms 1712 extending out diagonally from the center of the base 1710. Each of the arms 1712 end in a pronged arc portion 1714 that can be inserted onto a structure on the case 1702, such as the snaps disclosed in some embodiments and as shown in FIGS. 17A-17D, to hold the toy harness accessory 1700 onto the back of the case 1702. Adhesive or other means may also be used to more permanently secure the toy harness accessory 1700 onto the back of the case 1702. In addition, the pouch can be secured to the case with Velcro, one or more magnets, or any other hooking or clasping mechanism (pin in slot).

Figures 18A, 18B:
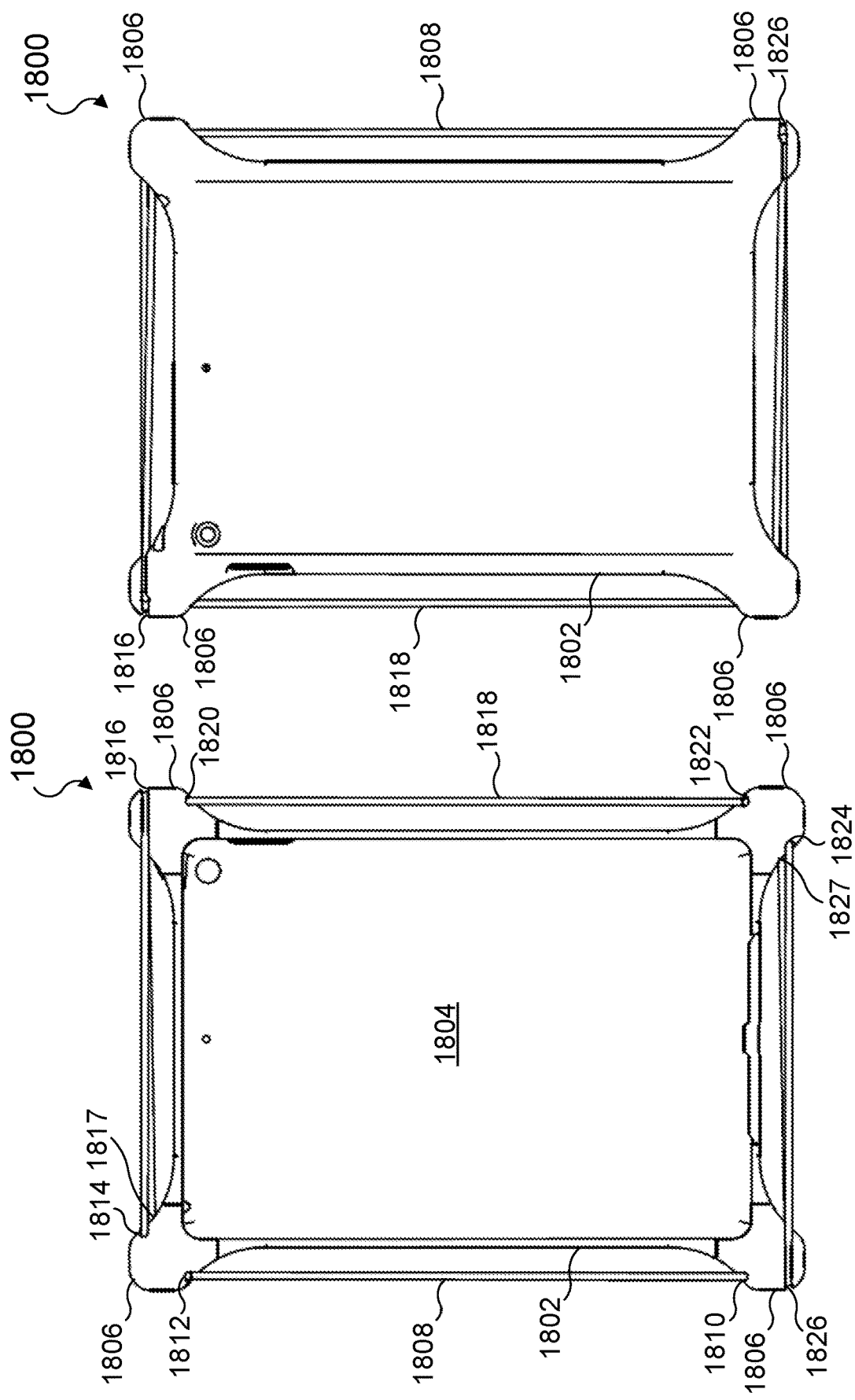
FIG. 18A illustrates a front view of a wearable device case in a handheld configuration in accordance with various embodiments of the present disclosure.
FIG. 18B illustrates a rear view of a wearable device case in a handheld configuration in accordance with various embodiments of the present disclosure.
Figure 18C:
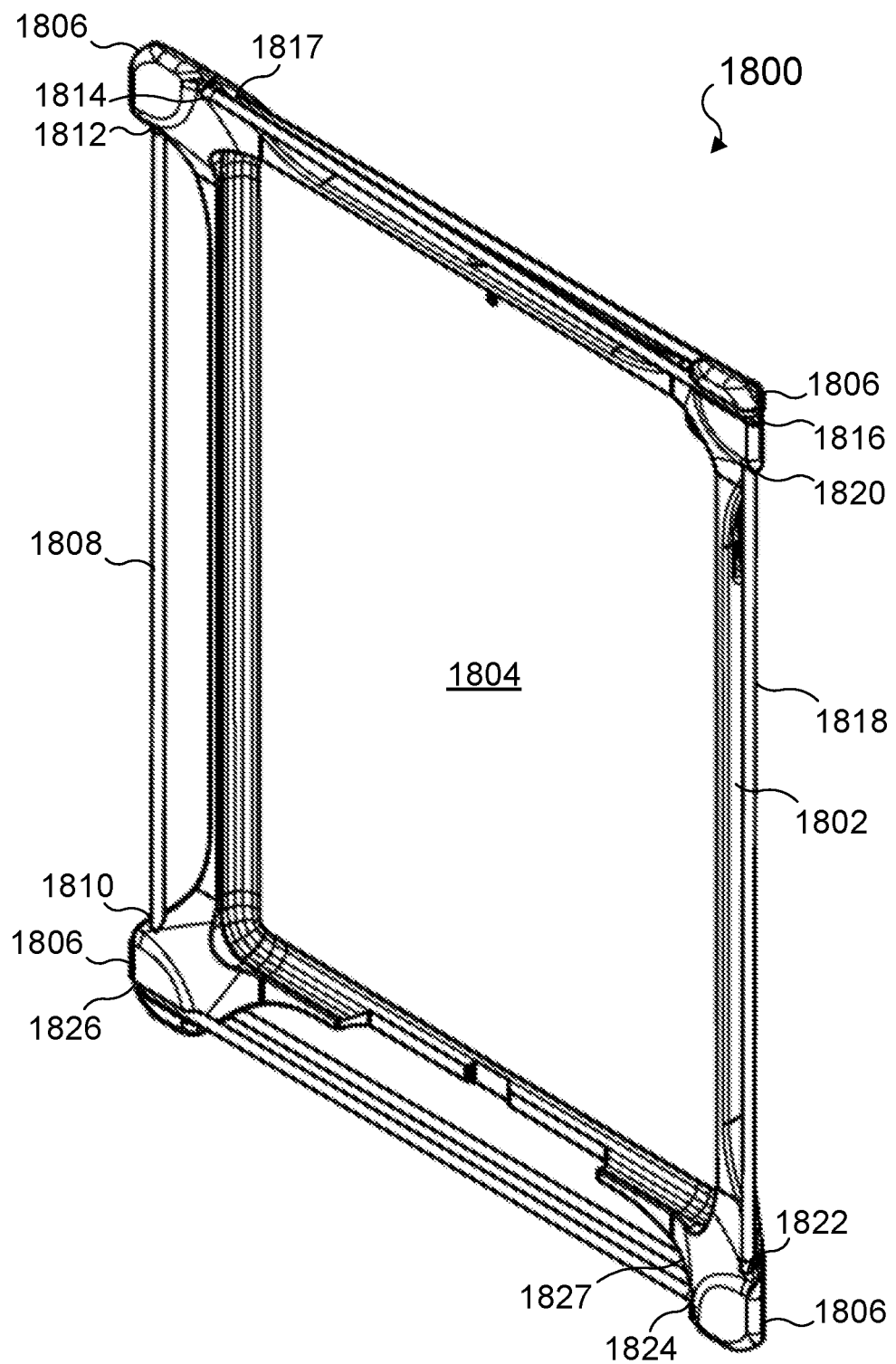
FIG. 18C illustrates a front perspective view of a wearable device case in a handheld configuration in accordance with various embodiments of the present disclosure.
Figure 18D:
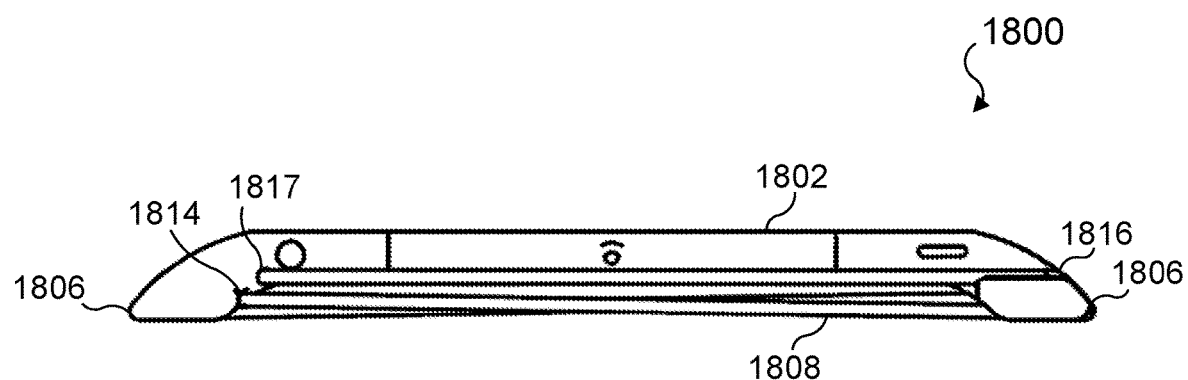
FIG. 18D illustrates a top view of a wearable device case in a handheld configuration in accordance with various embodiments of the present disclosure.
Figure 18E:
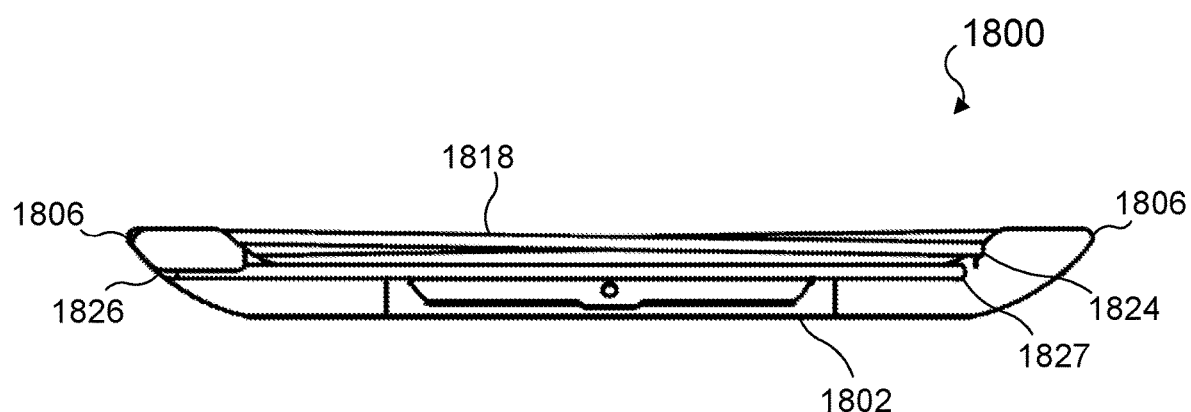
FIG. 18E illustrates a bottom view of a wearable device case in a handheld configuration in accordance with various embodiments of the present disclosure.
Figure 18G:
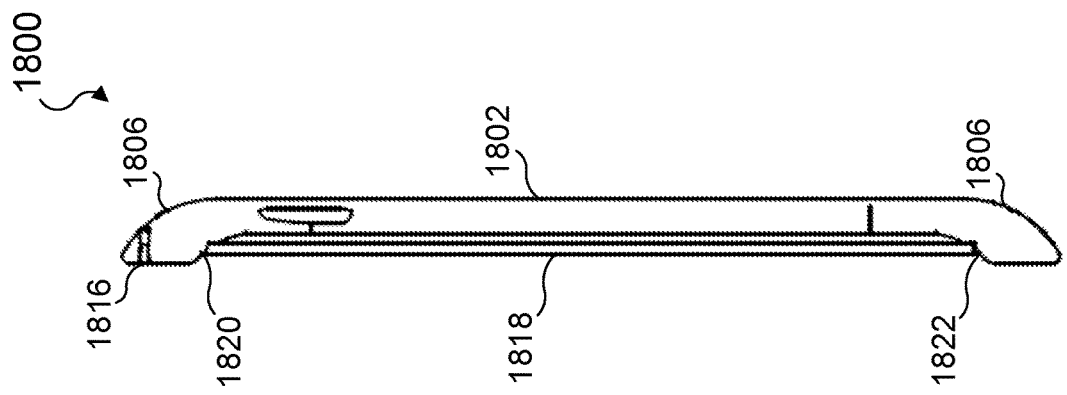
FIG. 18G illustrates a right side view of a wearable device case in a handheld configuration in accordance with various embodiments of the present disclosure.
Figure 18F:
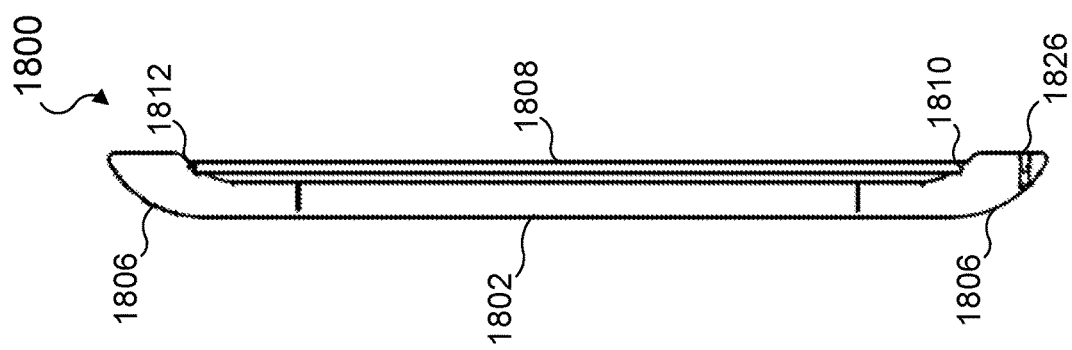
FIG. 18F illustrates a left side view of a wearable device case in a handheld configuration in accordance with various embodiments of the present disclosure.

Referring now to FIGS. 18A-18G, there are illustrated various views of another embodiment of a mobile device case 1800 in a handheld configuration. FIG. 18A illustrates a front view of the case 1800, FIG. 18B illustrates rear view of the case 1800, FIG. 18C illustrates a front perspective view of the case 1800, FIG. 18D illustrates a top view of the case 1800, FIG. 18E illustrates a bottom view of the case 1800, FIG. 18F illustrates a left side view of the case 1800, and FIG. 18G illustrates a right side view of the case 1800.

The case 1800 includes a rectangular body 1802 having a recessed portion 1804 capable of receiving a mobile device. The case 1800 further includes corner body portions 1806 positioned on the outside of each of the four corners of the body 1802. A first flexible member 1808 is connected at one end in a slot 1810 in one of the corner body portions 1806 disposed at a bottom-left corner of the body 1802, when viewed from the front of the case 1800 as in FIG. 18A. The first flexible member 1808 extends from the slot 1810, in which it is connected, vertically across a left side of the body 1802, and travels through a slot 1812 at one of the corner body portion 1806 disposed at a top-left of the body 1802, such that a portion of the first flexible member 1808 resides within an interior of the top-left corner body portion 1806. The first flexible member 1808 exits the interior of that top-left corner body portion 1806 via another slot 1814, and extends across a top side of the body 1802. The first flexible member is removeably coupled to another one of the corner body portions at a top-right corner of the body 1806 via a first groove 1816. The first flexible member 1808 is looped around and pressed into the first groove 1816 and to hold the second flexible member in place. Another end of the first flexible member 1808 is coupled to the case 1800 in another slot 1817 of the top-left corner body portion 1806. The first flexible member 1808 can then be removed from the first groove 1816 when the case 1800 is converted to a wearable configuration, as described herein, while the first flexible member 1808 remains attached to the case 1800 at one end secured within the slot 1810 of the corner body portion 1806 disposed at the bottom-left corner of the body 1802, and the other end secured within the slot 1817 of the corner body portion 1806 disposed at the top-left corner of the body 1802.

The case 1800 also includes a second flexible member 1818. The second flexible member 1818 is connected at one end in a slot 1820 in one of the corner body portions 1806 disposed at a top-right corner of the body 1802, when viewed from the front of the case 1800 as in FIG. 18A. The second flexible member 1818 extends from the slot 1820, in which it is connected, vertically across a right side of the body 1802, and travels through a slot 1822 at one of the corner body portion 1806 disposed at a bottom-right corner of the body 1802, such that a portion of the second flexible member 1818 resides within an interior of the bottom-right corner body portion 1806. The second flexible member 1818 exits the interior of that bottom-right corner body portion 1806 via another slot 1824, and extends across a bottom side of the body 1802. The second flexible member 1818 is removeably coupled to another one of the corner body portions at a bottom-left corner of the body 1806 via a second groove 1826. The second flexible member 1818 is looped around and pressed into the second groove 1826 to hold the second flexible member 1818 in place. Another end of the second flexible member 1818 is coupled to the case 1800 in another slot 1827 of the bottom-right corner body portion 1806. The second flexible member 1818 can then be removed from the second groove 1826 when the case 1800 is converted to a wearable configuration, as described herein, while the second flexible member 1818 remains attached to the case 1800 at the other end secured within the slot 1820 of the corner body portion 1806 disposed at the top-right corner of the body 1802, and the other end secured within the slot 1827 of the corner body portion 1806 disposed at the bottom-right corner of the body 1802.

Referring now to FIGS. 19A and 19B, there are illustrated various views of the mobile device case 1800 with a mobile device 1902 installed. FIG. 19A illustrates a front view of the case 1800 with the mobile device 1902 installed, and FIG. 19B illustrates a front perspective view of the case 1800 with the mobile device 1902 installed. The recessed portion 1804 of the case 1800 is configured to receive the mobile device 1902, and the mobile device 1902 can also be removed from the recessed portion 1804.

Figure 20A:
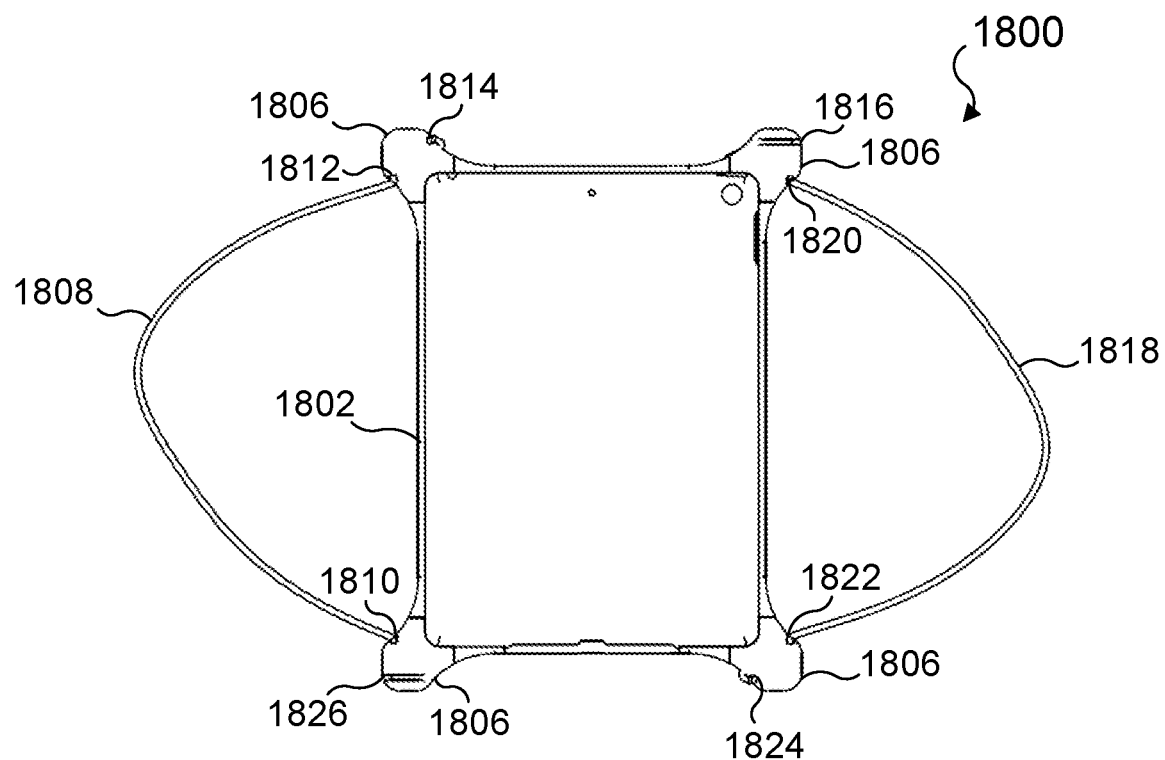
Figure 20B:
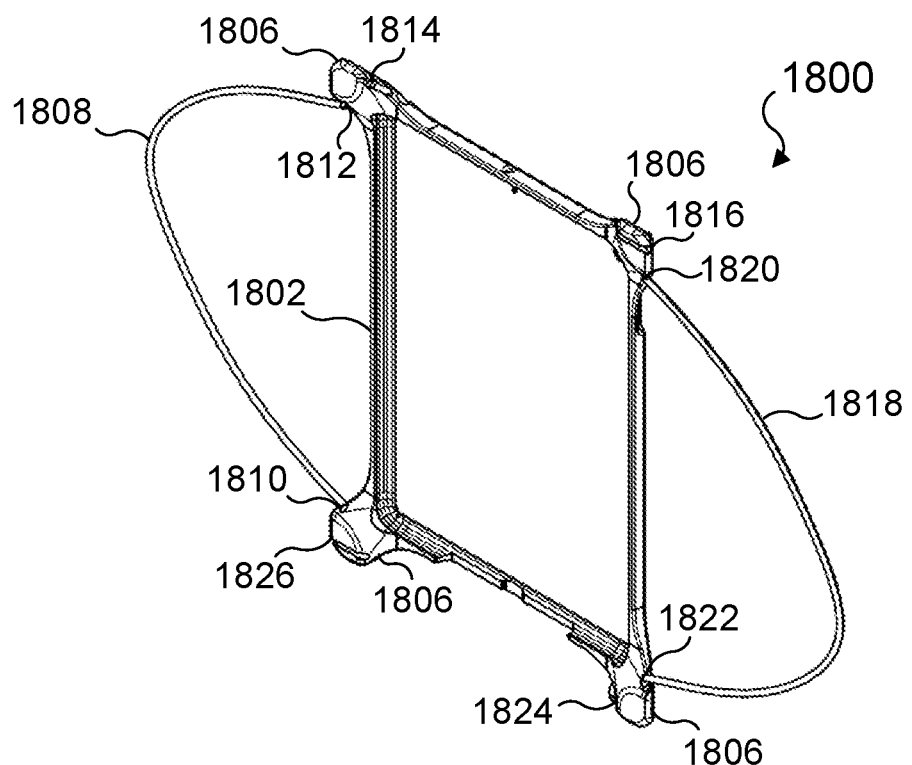

Referring now to FIGS. 20A and 20B, there are illustrated various views of the mobile device case 1800 in a wearable configuration. FIG. 20A illustrates a front view of the case 1800 in a wearable configuration, and FIG. 20B illustrates a front perspective view of the case 1800 with in a wearable configuration. To convert the mobile device case to the wearable configuration, the first flexible member 1808 and the second flexible member 1818 are removed from the first groove 1816 and the second groove 1826, respectively, allowing the ends that were connected within the grooves to be pulled to an adjacent corner body portion 1806, extending the flexible members 1808 and 1818 out from the left and right sides of the body 1802, respectively, allowing the flexible members 1808 and 1818 to be used as straps to wear the mobile device case 1800 on the body of a user. The ends of the first and second flexible members that are connected within the slots 1817 and 1827 hold these ends so that the flexible members cannot be pulled through the slots 1814 and 1824.

Figures 21A, 21B:
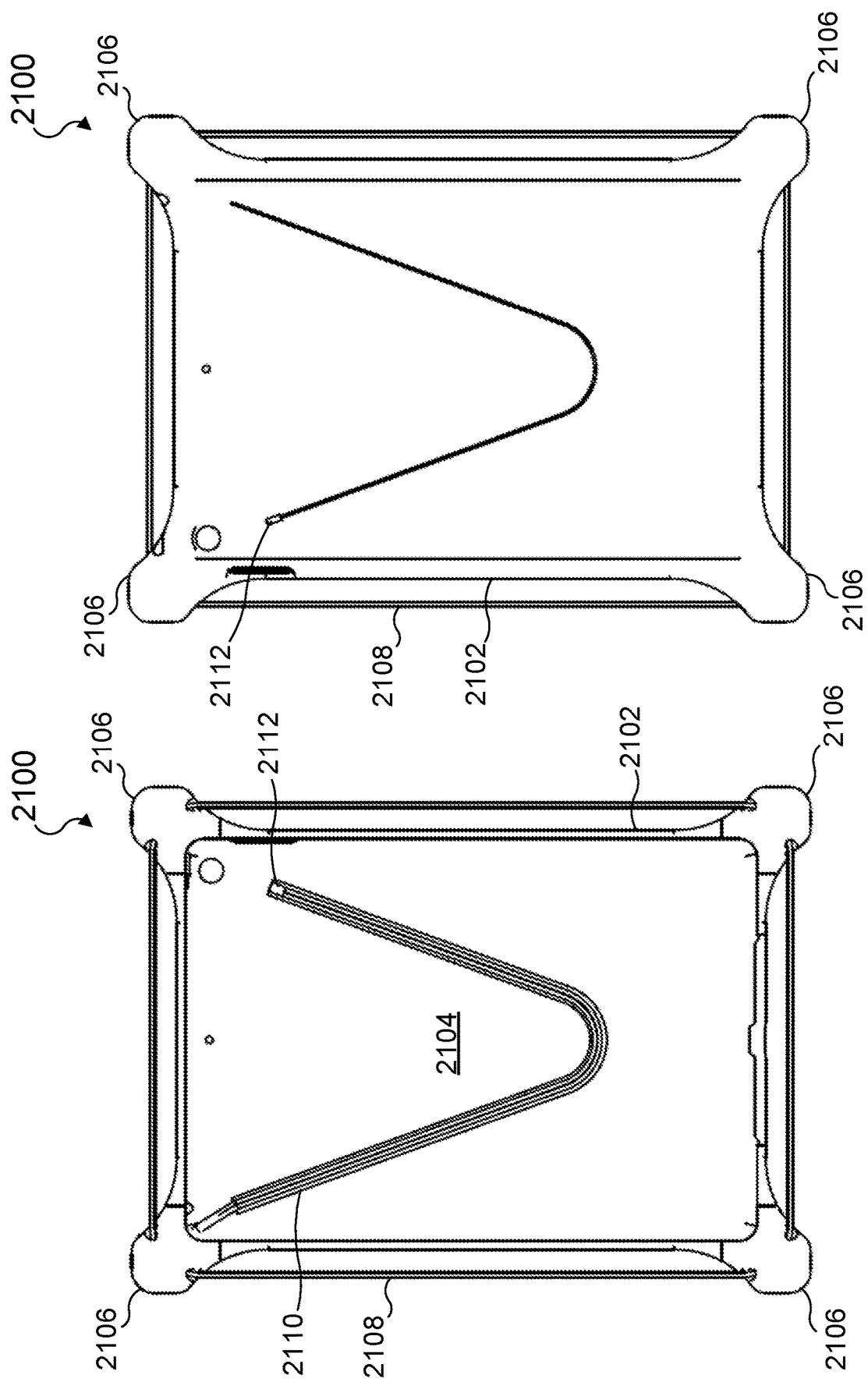
Figure 21D:
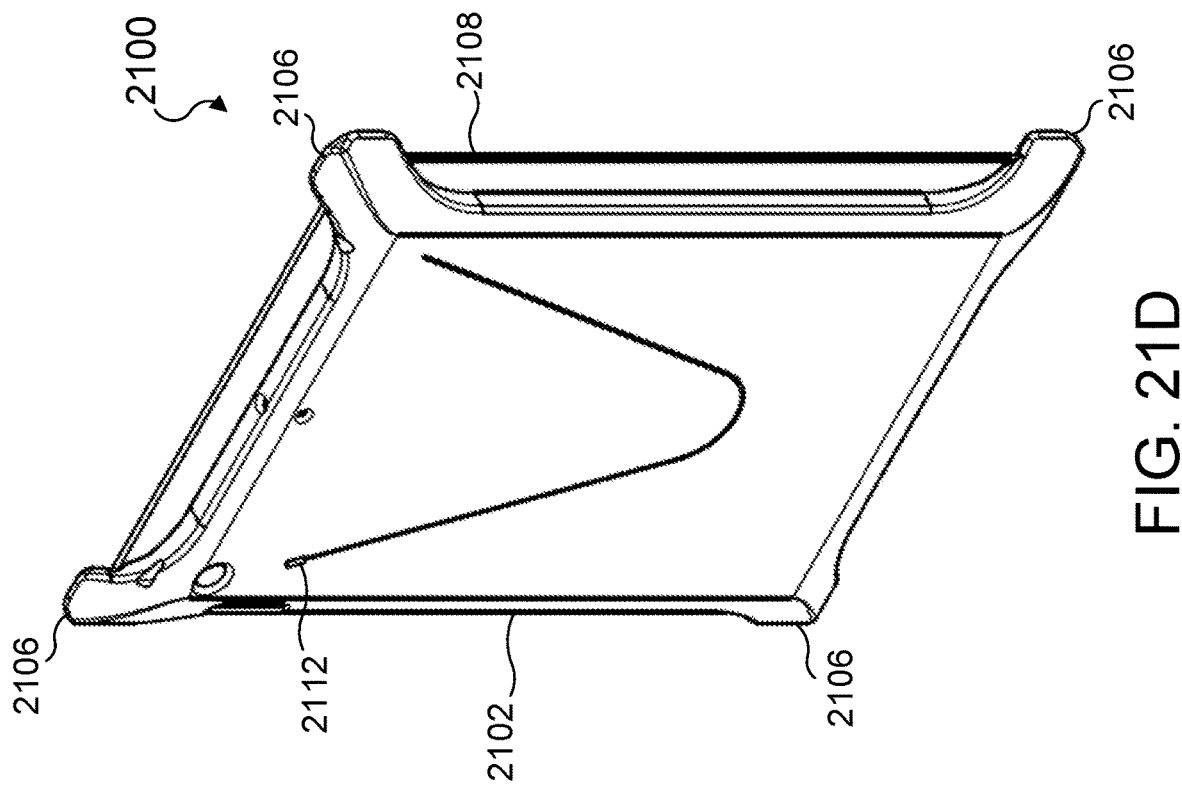
Figure 21C:
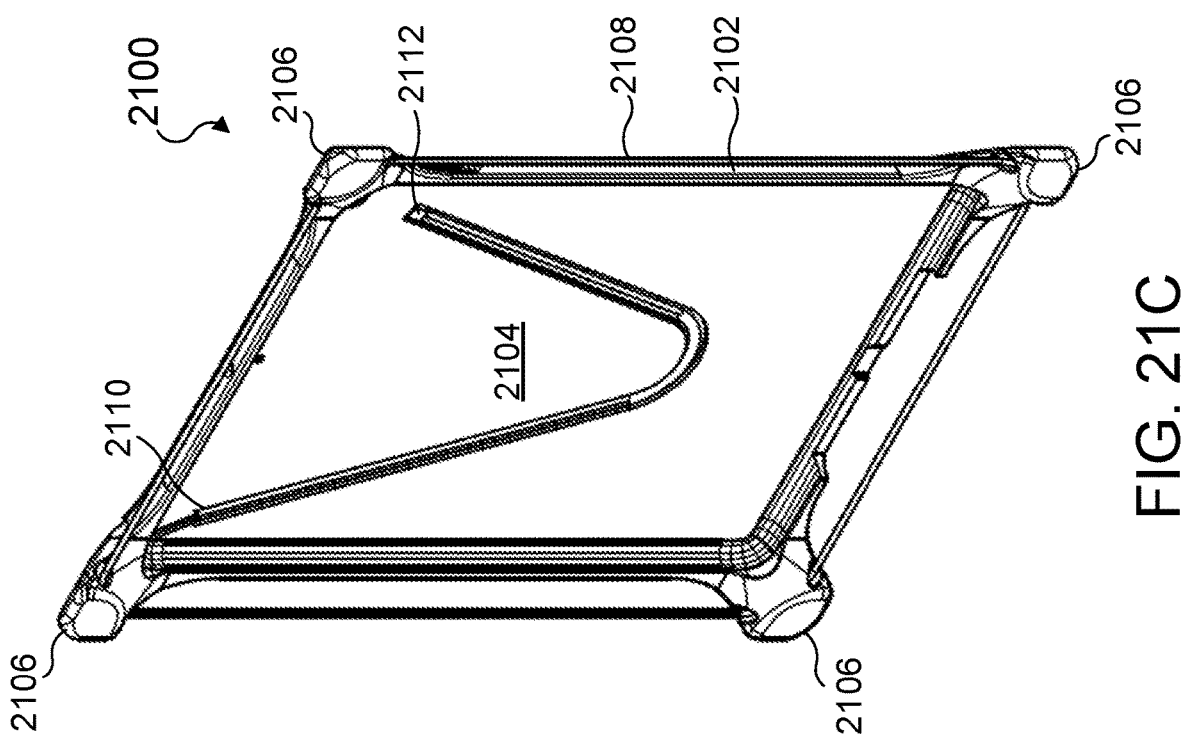
Figure 21E:
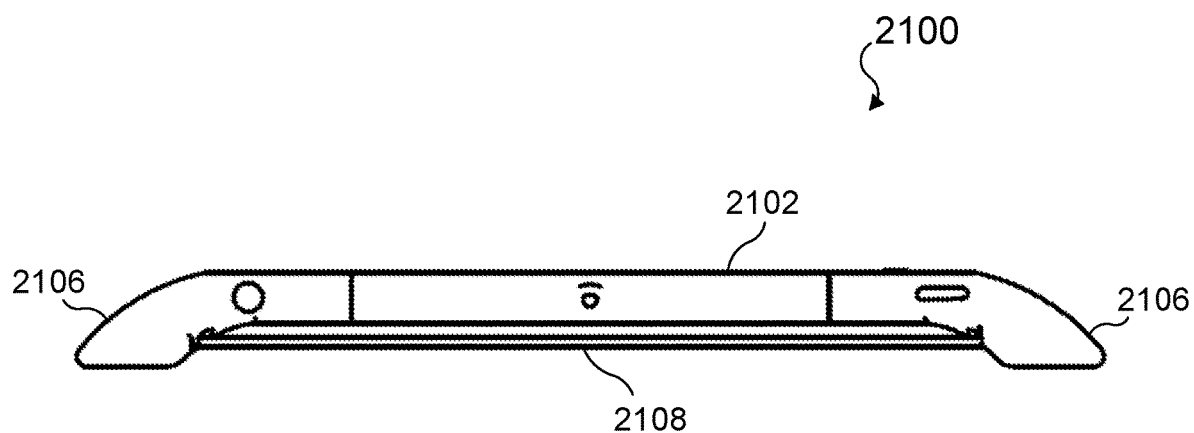
Figure 21F:
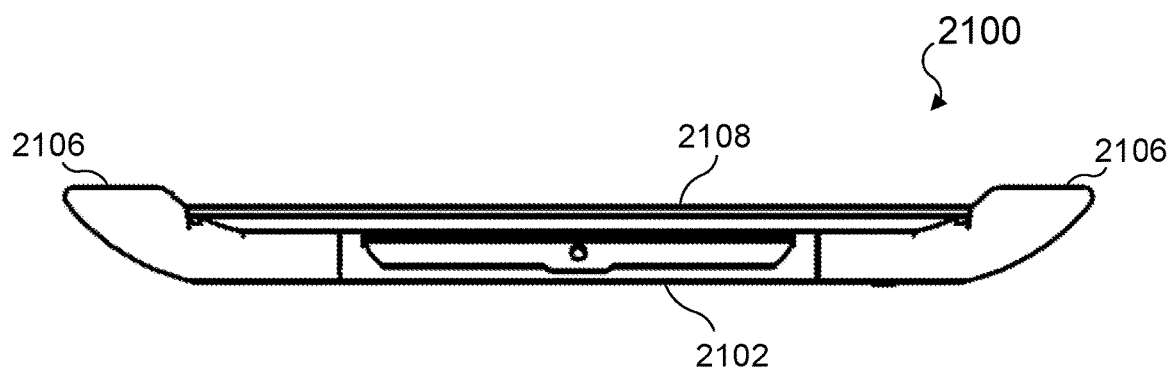
Figure 21H:
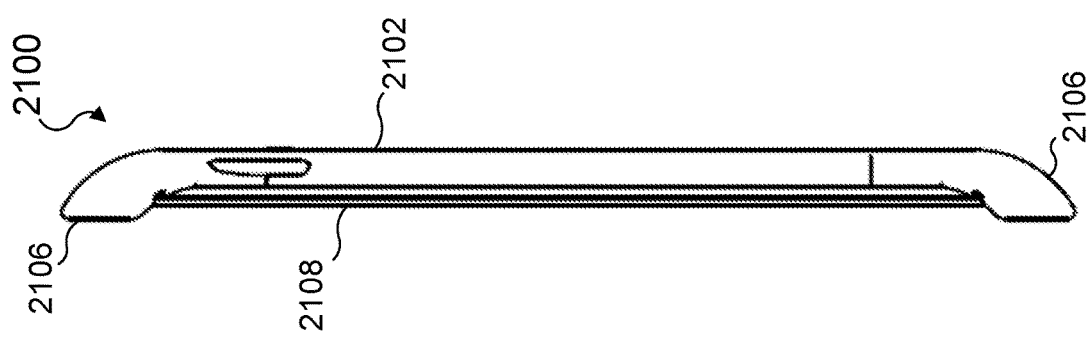
Figure 21G:
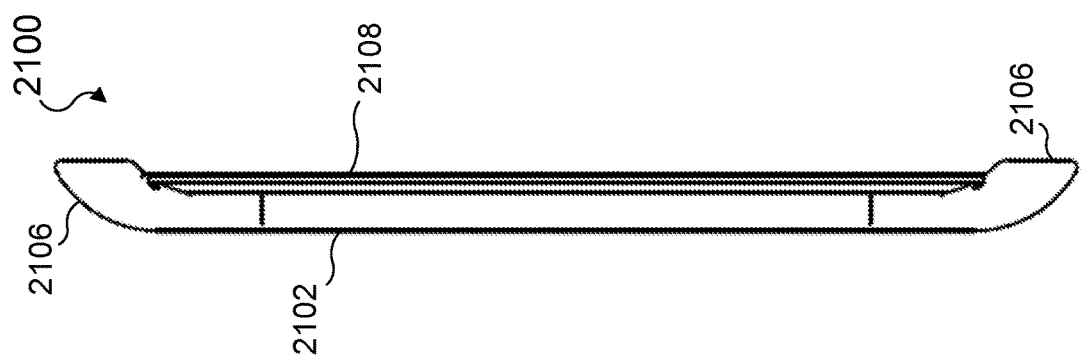

Referring now to FIGS. 21A-21H, there are illustrated various views of another embodiment of a mobile device case 2100 in a handheld configuration. FIG. 21A illustrates a front view of the case 2100, FIG. 21B illustrates rear view of the case 2100, FIG. 21C illustrates a front perspective view of the case 2100, FIG. 21D illustrates a rear perspective view of the case 2100, FIG. 21E illustrates a top view of the case 2100, FIG. 21F illustrates a bottom view of the case 2100, FIG. 21G illustrates a left side view of the case 2100, and FIG. 21H illustrates a right side view of the case 2100.

The case 2100 includes a rectangular body 2102 having a recessed portion 2104 capable of receiving a mobile device. The case 2100 further includes corner body portions 2106 positioned on the outside of each of the four corners of the body 2102. At least one flexible member 2108 is disposed at one end in an interior path 2110 of the body 2102. This interior path may be enclosed within the back wall of the case and not visible. The flexible member 2108 includes a stopper 2112 at an internal end of the path 2110. The flexible member 2108 extends along the path 2110 and exits the path in an interior portion of one of the corner body portions 2106 disposed at the top-left of the body 2102 when the case 2100 is viewed as shown in FIG. 21A. The flexible member 2108 then extends around the body 2102, entering and exiting each of the circular body portions 2106 via slots or apertures disposed thereon. The flexible member 2108 may be secured within one of the circular body portions 2106 to prevent the flexible member 2108 from being removed from the case 2100.

Referring now to FIGS. 22A-22C, there are illustrated various views of the case 2100 in a wearable configuration. FIG. 22A illustrates a front view of the case 2100 in a wearable configuration, FIG. 22B illustrates rear view of the case 2100 in a wearable configuration, and FIG. 22C illustrates a front perspective view of the case 2100 in a wearable configuration. To transition the case 2100 into a wearable configuration, the flexible member 2108 can be pulled at the left and right sides of the body 2102, causing the portion of the flexible member 2108 disposed in the path 2110 to be pulled from the path, into the corner body portion 2106 disposed at the top-left of the body 2102, and around the body 2102, extending out from the body on the left and right sides of the body 2102. When the flexible member is pulled from the path 2110, the stopper 2112 contacts the exit to the path at the top-left corner body portion 2106, preventing the flexible member 2108 from being completely removed, while providing enough slack in the flexible member 2108 at the left and right sides of the case 2100 to be worn on the body of the user.

Referring now to FIGS. 23A and 23B, FIG. 23A illustrates a front perspective view of a mobile device case 2300 including a lock button 2302, and FIG. 23B illustrates an enlarged view of the lock button 2302 disposed at a corner of the mobile device case 2300. The case 2300 may be similar in design to the cases 1800 and 2100 disclosed herein. It will also be understood that the lock button 2302 may be incorporated into the design of any of the mobile device cases disclosed herein. The lock button 2302 is disposed such that it interfaces with a lock button of a mobile device, allowing a user to press the lock button 2302 to also press a corresponding lock button on the mobile device to lock or unlock the mobile device, which may also turn off and turn on the display of the mobile device. In some embodiments, the lock button 2302 has a gapped space 2304 that is filled with a flexible material to prevent water and/or dust from entering the case 2300 while still allowing the lock button 2302 to move. In some embodiments, the lock button 2302 can also be used for other buttons such as volume buttons, a mute button, or other buttons.

Referring now to FIGS. 24A-24D, there are illustrated various views of another embodiment of a mobile device case 2400 in a handheld configuration. FIG. 24A illustrates a rear view of the case 2400, FIG. 24B illustrates left side view of the case 2400, FIG. 24C illustrates a rear perspective view of the case 2400, and FIG. 24D illustrates a bottom perspective view of the case 2400.

The case 2400 includes a rectangular body 2402 having a recessed portion capable of receiving a mobile device. The case 2400 further includes corner body portions 2406 positioned on the outside of each of the four corners of the body 2402. At least one flexible member 2408 is secured at one end 2410 at a first side of a rear exterior of the body 2402. The flexible member 2408 extends from the first side across the exterior of the body 2402 and enters the mobile device case 2400 at a point 2412 of the exterior of the body 2402. The point 2412 may include an aperture or other means for allowing the flexible member 2408 to enter an interior of the mobile device case 2402. The flexible member 2408 extends within the interior of the mobile device case 2402 into an interior portion of one of the corner body portions 2406. The flexible member 2408 exits the interior portion of the one of the corner body portions 2406 and extends around the body 2402, entering and exiting each of the circular body portions 2406 via slots or apertures disposed thereon. The flexible member 2408 may be secured within one of the circular body portions 2406 to prevent the flexible member 2408 from being removed from the case 2400. When the mobile device case 2400 is in the handheld configuration, the flexible member 2408 is wrapped around a pin 2414 on the rear exterior of the body 2402 to secure the flexible member 2408 and keep the flexible member 2408 tight around the body 2402. The pin 2414 has a head to prevent the flexible member 2408 from slipping off the pin. The flexible member 2408 may be removed from the pin 2414 to convert the case 2400 into a wearable configuration.

Referring now to FIGS. 25A and 25B, FIG. 25A illustrates a rear view of the case 2400 in a wearable configuration and FIG. 25B illustrates a bottom perspective view of the case 2400 in a wearable configuration. To transition the case 2400 into a wearable configuration, the flexible member 2408 is removed from the pin 2414 and then be pulled at the left and right sides of the body 2402, causing the portion of the flexible member 2408 disposed on the rear exterior of the body 2402 to be pulled up to a horizontal orientation extending from the one end 2410 secured at the first side of the exterior of the body 2402 to the point 2412 to allow for more of the flexible member 2408 to enter the exterior. This allows the flexible member to be pulled out from the corner body portions 2406, while the flexible member 2408 is prevented from being completely removed by the secured one end 2410. The flexible member 2408 can be pulled out to provide enough slack in the flexible member 2408 at the left and right sides of the case 2400 to be worn on the body of the user.

It will be understood that dashed lines in the drawings refer to surfaces or edges hidden within that particular view and are shown for the purpose of facilitating understanding of the function and placement of the components of the various embodiments disclosed herein. Although the preferred embodiment has been described in detail, it should be understood that various changes, substitutions and alterations can be made therein without departing from the spirit and scope of the disclosure as defined by the appended claims.

What is claimed is:

1. An apparatus for housing a mobile device and convertible into a backpack, comprising:
   a body including a recessed portion configured to receive the mobile device;
   a plurality of corner body portions each extending diagonally from a corner of the body, wherein the plurality of corner body portions are configured to couple to and enclose around corner edges of a mobile device; and
   one or more flexible members each coupled to at least one of the plurality of corner body portions, wherein the one or more flexible members are capable of retracting to a first position and capable of expanding to a second position,
   wherein, in the first position, the one or more flexible members are secured to the body of the apparatus to allow a user to operate the mobile device in a handheld configuration, wherein, in the handheld configuration, the apparatus is not worn by the user, and
   wherein, in the second position, the one or more flexible members are expanded from the body of the apparatus to allow the user to insert arms of the user between the one or more flexible members and the body of the apparatus to wear the apparatus on a back of the user.

2. The apparatus of claim 1, wherein the flexible members are coupled to a rear of the body.

3. The apparatus of claim 2, wherein a first end of at least one flexible member of the flexible members is secured to the rear of the body at a first position on the body.

4. The apparatus of claim 3, wherein, when the at least one flexible member is in the first position, a second end of the at least one flexible member is removeably coupled at a second position on the body.

5. The apparatus of claim 4, wherein the second end of the at least one flexible member is coupled to a link, and wherein, when the at least one flexible member is in the first position, the link coupled to the second end of the at least one flexible member is removeably coupled to a hook disposed at the first position on the body.

6. The apparatus of claim 4, wherein, when the at least one flexible member is in the second position, the second end of the at least one flexible member is decoupled from the second position on the body and the at least one flexible member is extended from the body.

7. The apparatus of claim 6, wherein, to move the at least one flexible member to the second position, the at least one flexible member slides through a slot at a third position of the body.

8. The apparatus of claim 7, wherein the first position and second position are disposed at diagonally opposite corners of the body, and wherein the third position is disposed at another corner of the body adjacent to the first position and the second position.

9. The apparatus of claim 1, wherein at least a part of each of the flexible members is disposed within a portion of the body when in the first position.

10. The apparatus of claim 9, wherein the flexible members are configured to be pulled from within the portion of the body to extend the flexible members to the second position.

11. The apparatus of claim 10, wherein the at least a part of each of the flexible members is wrapped around one of a plurality of spools each disposed within one of the plurality of corner body portions.

12. The apparatus of claim 1, wherein the body includes two or more separate portions that each couple to the mobile device at different positions on the mobile device.

13. The apparatus of claim 12, wherein the two or more separate portions are adhesively coupled to the mobile device.

14. The apparatus of claim 1, further comprising a pouch coupled to a rear of the body.

15. The apparatus of claim 1, further comprising a harness coupled to a rear of the body configured to receive a toy.

16. A method for operating an apparatus for housing a mobile device and convertible into a backpack, comprising:
   expanding one or more flexible members each coupled to at least one of a plurality of corner body portions of a body of the apparatus from a first position to a second position, wherein the plurality of corner body portions each extend diagonally from a corner of the body,
      wherein the body of the apparatus includes a recessed portion configured to receive the mobile device,
      wherein the plurality of corner body portions are configured to couple to and enclose around corner edges of the mobile device,
      wherein, in the first position, the one or more flexible members are secured to the body of the apparatus to allow a user to operate the mobile device in a handheld configuration, and
      wherein, in the handheld configuration, the apparatus is not worn by the user;
   inserting, when in the second position, arms of the user between the expanded one or more flexible members and the body of the apparatus; and
   positioning the body of the apparatus on a back of the user.

17. The method of claim 16, wherein expanding the one or more flexible members from the first position to the second position includes sliding the one or more flexible members through a slot disposed at a position of the body.

18. The method of claim 16, further comprising:
   returning the one or more flexible members to the first position, including:
      retracting the one or more flexible members; and
      securing the one or more flexible members to the body of the apparatus.

19. The method of claim 18, wherein securing the one or more flexible members to the body of the apparatus includes coupling one end of each of the one or more flexible members to one or more snaps.

* * * * *